US008206475B2

(12) United States Patent
Walkinshaw

(10) Patent No.: US 8,206,475 B2
(45) Date of Patent: Jun. 26, 2012

(54) ENTRAINMENT AIR FLOW CONTROL AND FILTRATION DEVICES

(75) Inventor: Douglas Stuart Walkinshaw, Ottawa (CA)

(73) Assignee: Veft Aerospace Technology Inc., Ontario (CA)

( * ) Notice: Subject to any disclaimer, the term of this patent is extended or adjusted under 35 U.S.C. 154(b) by 516 days.

(21) Appl. No.: 12/306,296

(22) PCT Filed: Jun. 26, 2007

(86) PCT No.: PCT/CA2007/001125
§ 371 (c)(1),
(2), (4) Date: Aug. 19, 2009

(87) PCT Pub. No.: WO2007/147259
PCT Pub. Date: Dec. 27, 2007

(65) Prior Publication Data
US 2009/0311951 A1   Dec. 17, 2009

Related U.S. Application Data

(60) Provisional application No. 60/805,672, filed on Jun. 23, 2006.

(51) Int. Cl.
*B01D 46/00* (2006.01)
(52) U.S. Cl. ............ 55/385.2; 55/413; 55/415; 55/418; 55/471
(58) Field of Classification Search .......... 55/385.2, 55/471, 472, 473, 385.1, 418, 419, 361; 454/187, 454/230, 232, 237, 246, 248
See application file for complete search history.

(56) References Cited

U.S. PATENT DOCUMENTS

| 3,895,567 | A  | * | 7/1975  | Paul .................................. 454/264 |
| 5,922,095 | A  | * | 7/1999  | Hustvedt et al. ............. 55/385.1 |
| 6,004,204 | A  |   | 12/1999 | Luxton et al. |
| 6,375,719 | B1 | * | 4/2002  | Hustvedt et al. ................ 95/273 |
| 6,626,971 | B1 | * | 9/2003  | Forbert et al. ................ 55/385.2 |
| 7,000,688 | B2 |   | 2/2006  | Horttanainen et al. |
| 7,291,194 | B2 | * | 11/2007 | Snyder ............................ 55/418 |
| 7,332,006 | B2 | * | 2/2008  | Kim et al. .................... 55/385.2 |
| 7,468,084 | B2 | * | 12/2008 | Bauer et al. ................... 55/385.2 |

(Continued)

FOREIGN PATENT DOCUMENTS

WO   2007/134443   11/2007

OTHER PUBLICATIONS

International Search from PCT/CA07/001125 dated Nov. 15, 2007.

(Continued)

*Primary Examiner* — Duane Smith
*Assistant Examiner* — Minh-Chau Pham
(74) *Attorney, Agent, or Firm* — Calfee, Halter & Griswold LLP

(57) ABSTRACT

Ejector devices and systems are provided, that entrain ambient air within a primary stream of pressurized air, for use in a variety of applications including aircraft, buildings and other stationary structures. The ejector draws ambient air through an air treatment means such as a filter before its entrainment within the primary stream. The combined streams are then delivered to a ventilation system, an air curtain or other suitable recipient of treated, thermally conditioned air. The systems include diffusers, air curtain systems and variable air volume ventilation systems for aircraft and other vehicles.

25 Claims, 48 Drawing Sheets

U.S. PATENT DOCUMENTS

| | | | |
|---|---|---|---|
| 7,591,867 B2 * | 9/2009 | Choi et al. | 55/385.2 |
| 8,066,802 B2 * | 11/2011 | Kristensson et al. | 95/273 |
| 2001/0049927 A1 * | 12/2001 | Toepel | 55/385.2 |
| 2004/0003580 A1 * | 1/2004 | Avery | 55/385.1 |
| 2004/0211161 A1 * | 10/2004 | Avery | 55/385.1 |
| 2006/0276120 A1 * | 12/2006 | Cherry et al. | 454/56 |
| 2008/0099606 A1 | 5/2008 | Horstman et al. | |

OTHER PUBLICATIONS

List of related cases.

* cited by examiner

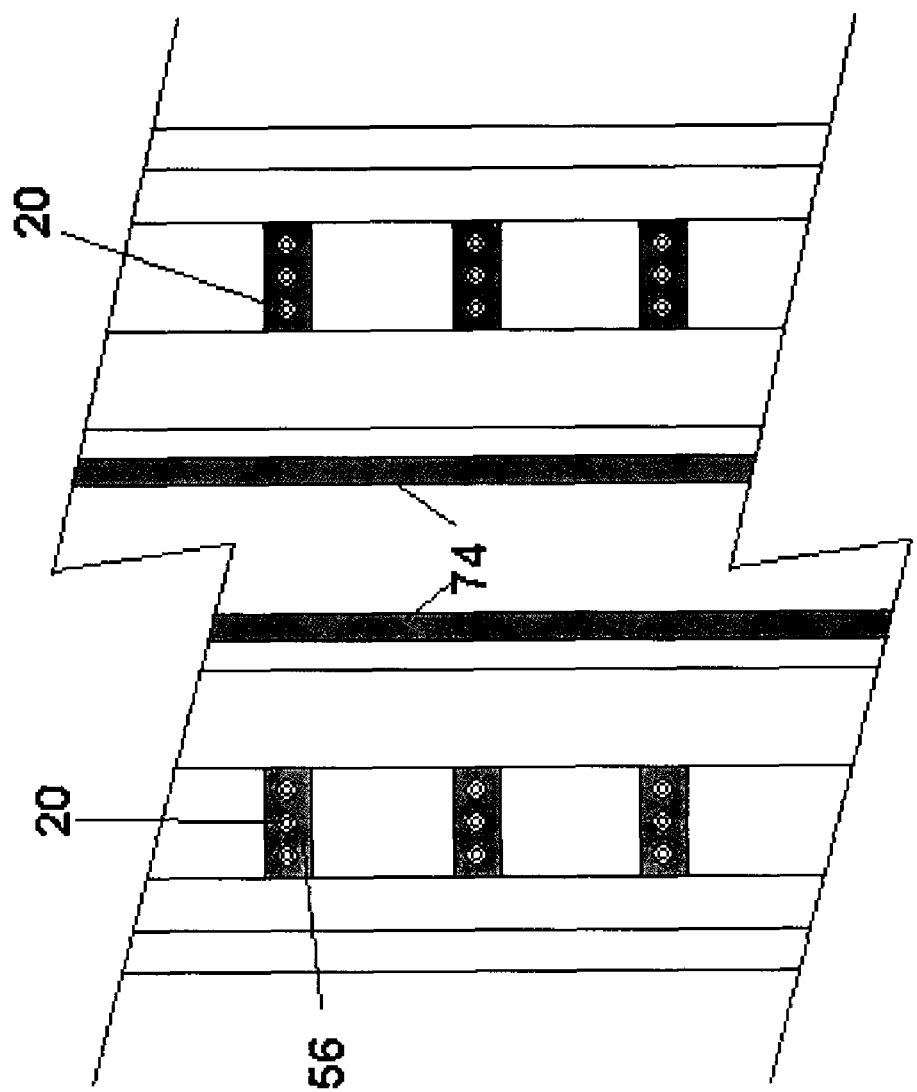

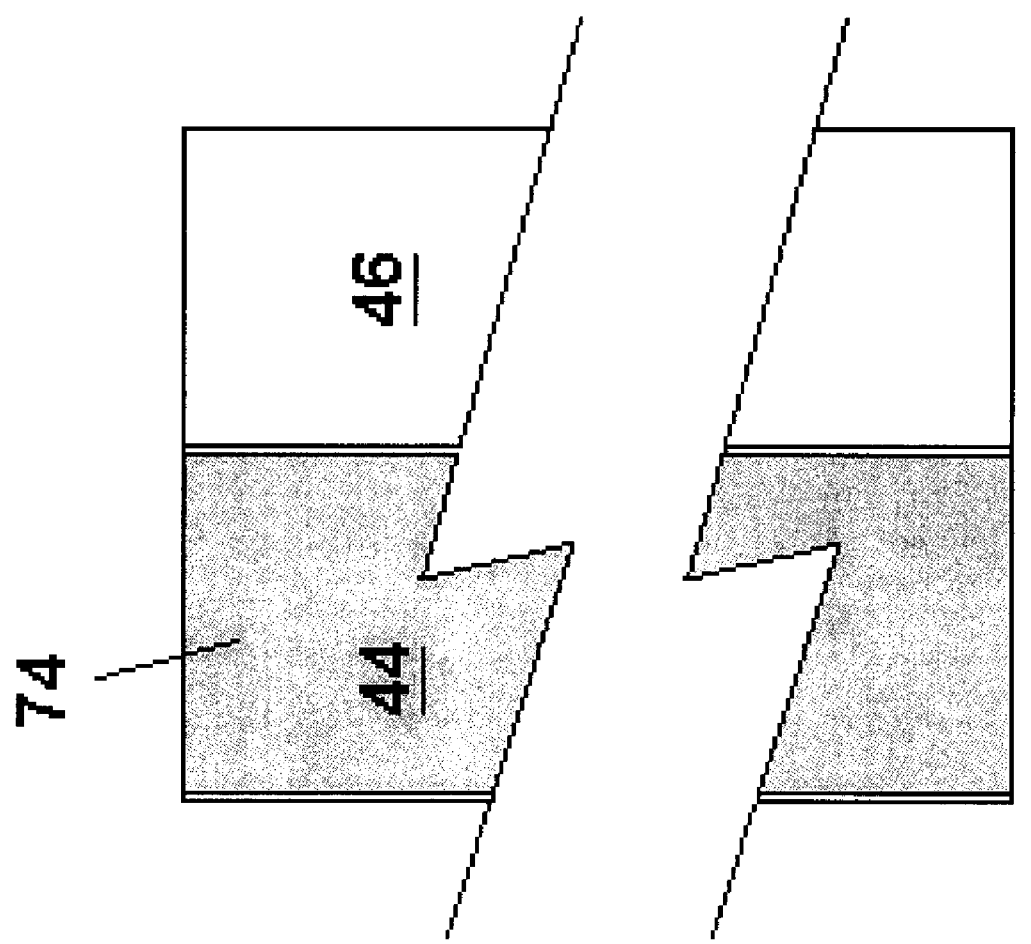

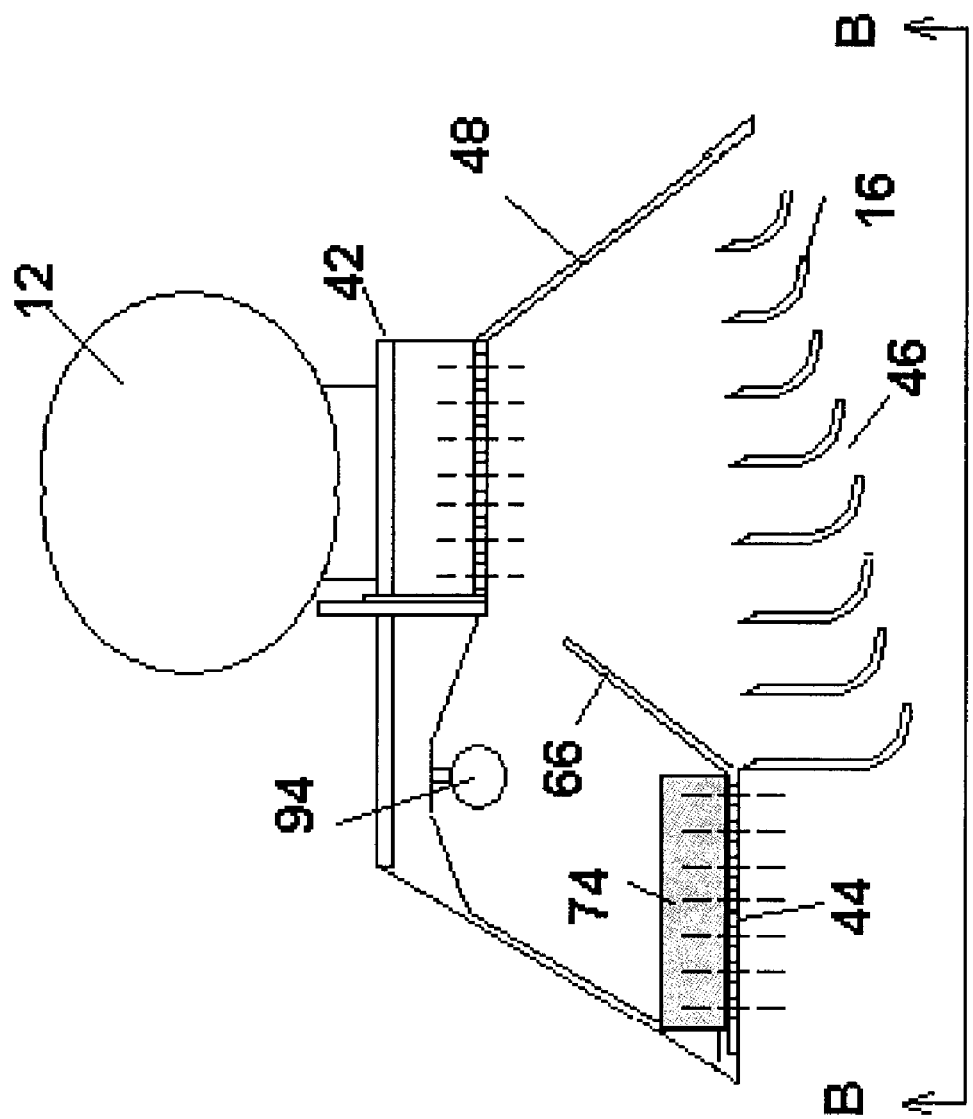

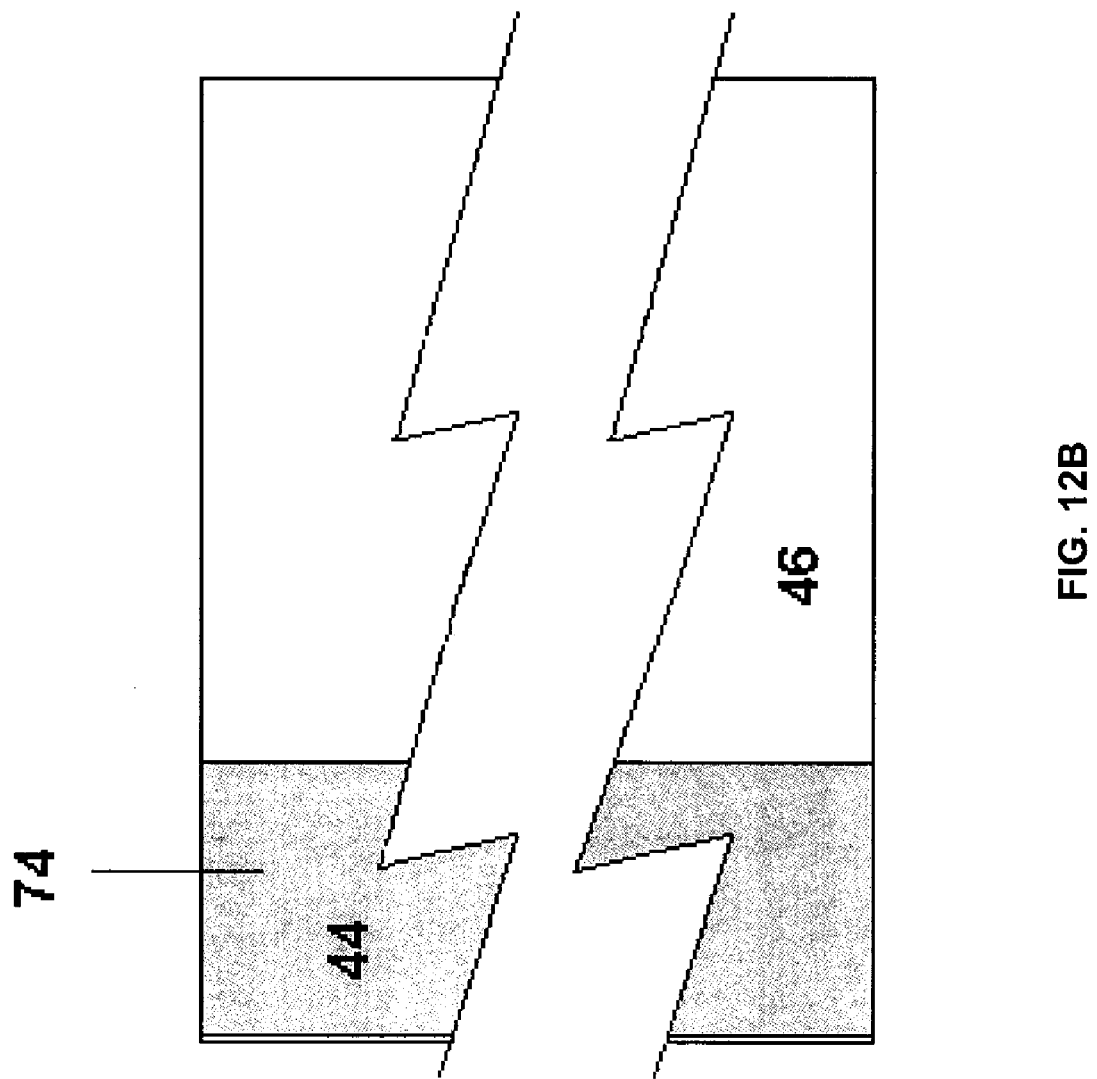

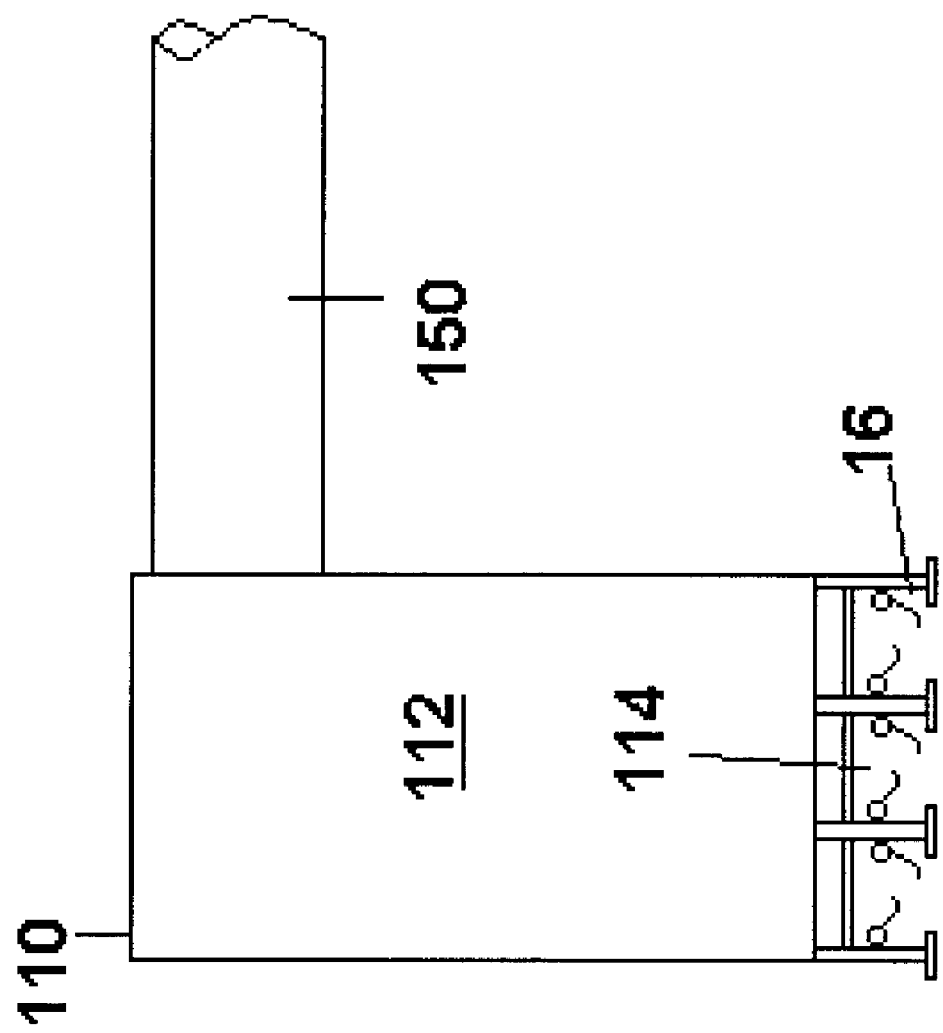

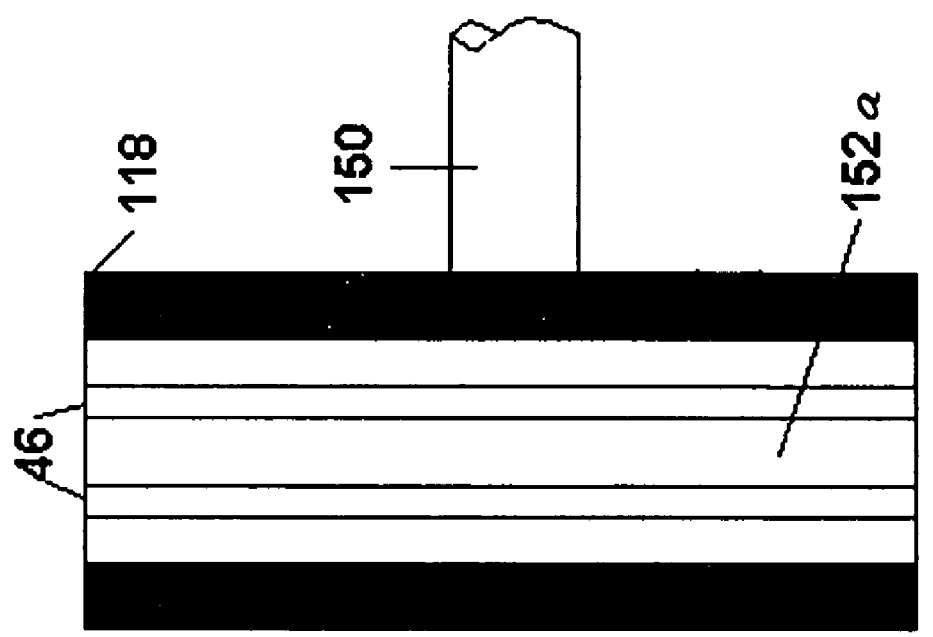

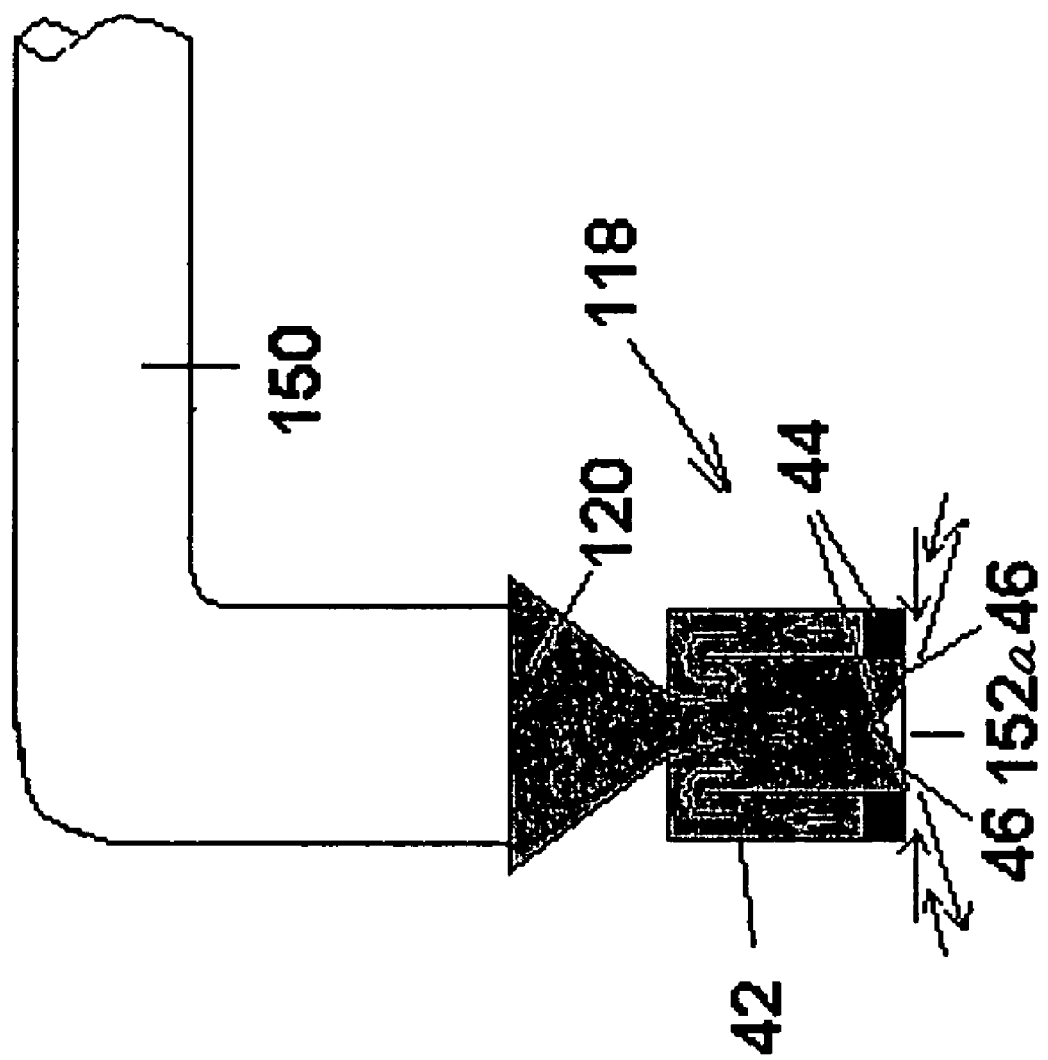

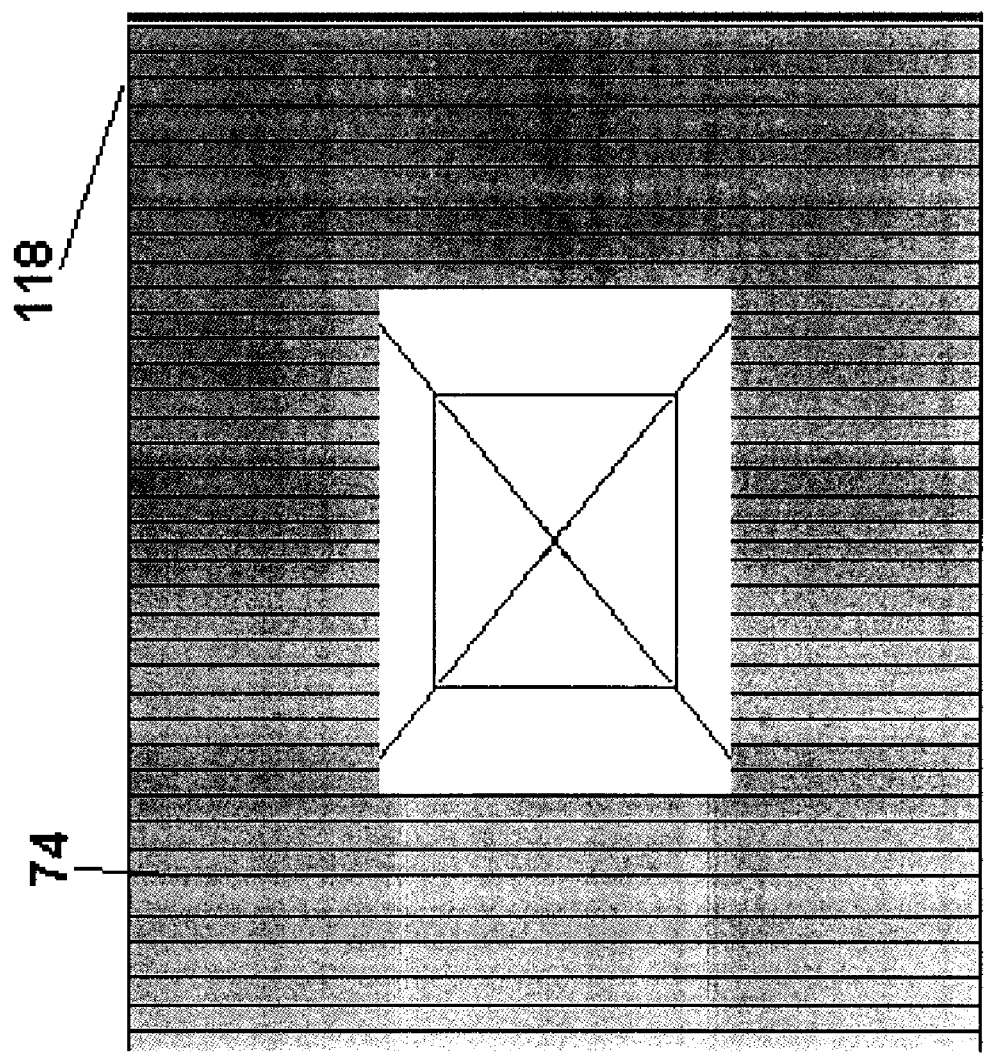

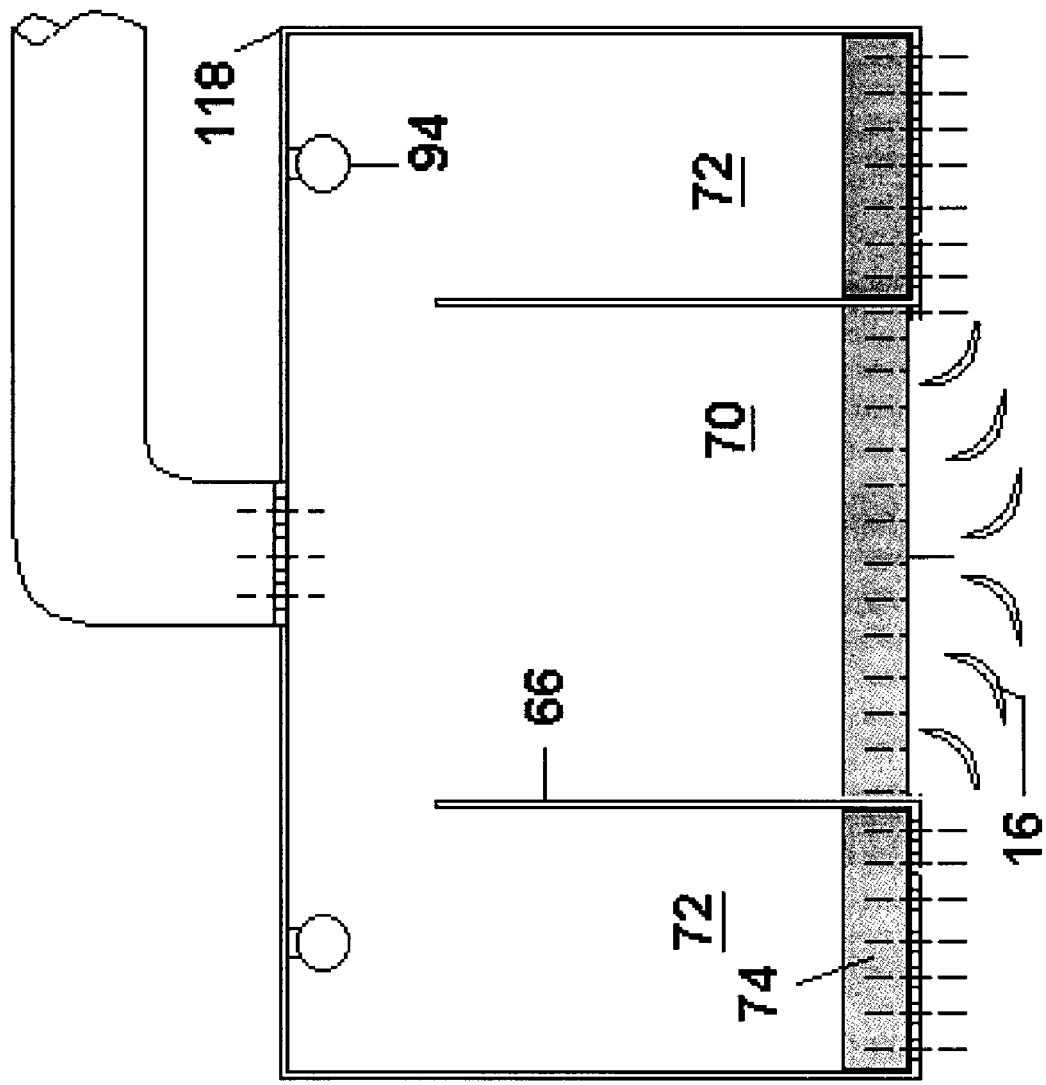

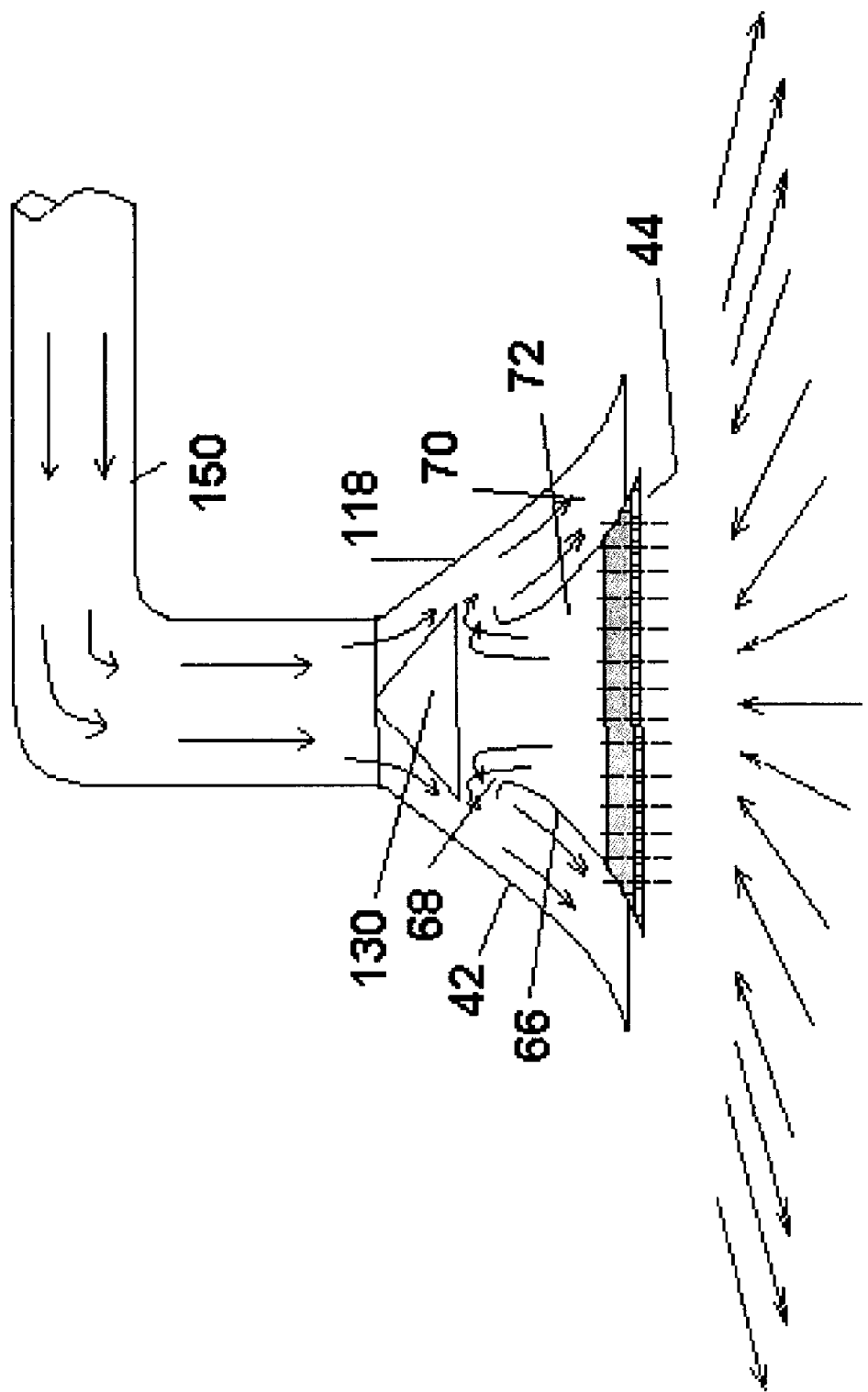

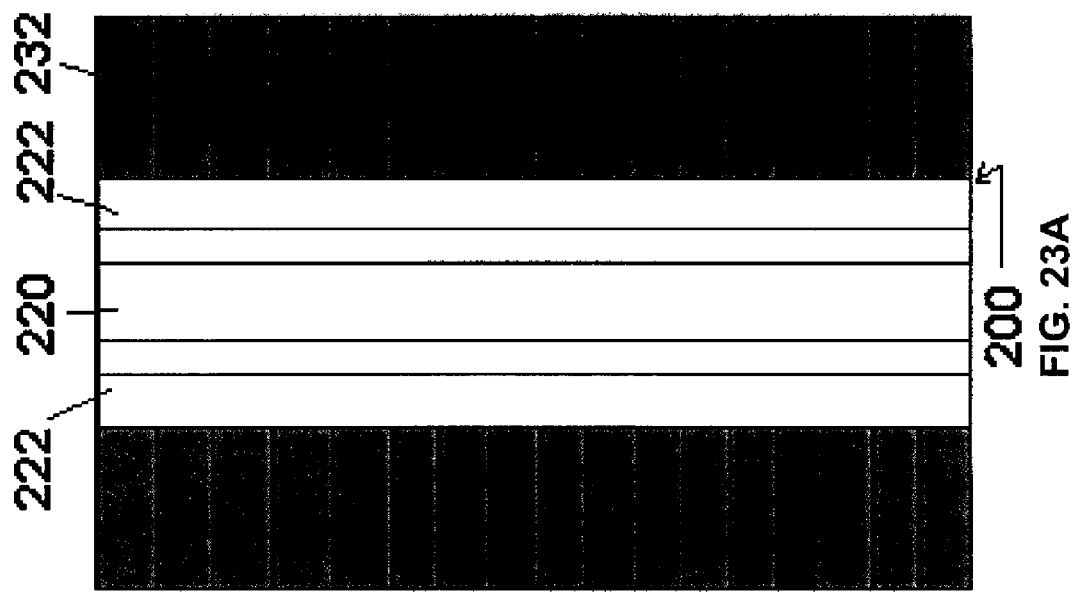

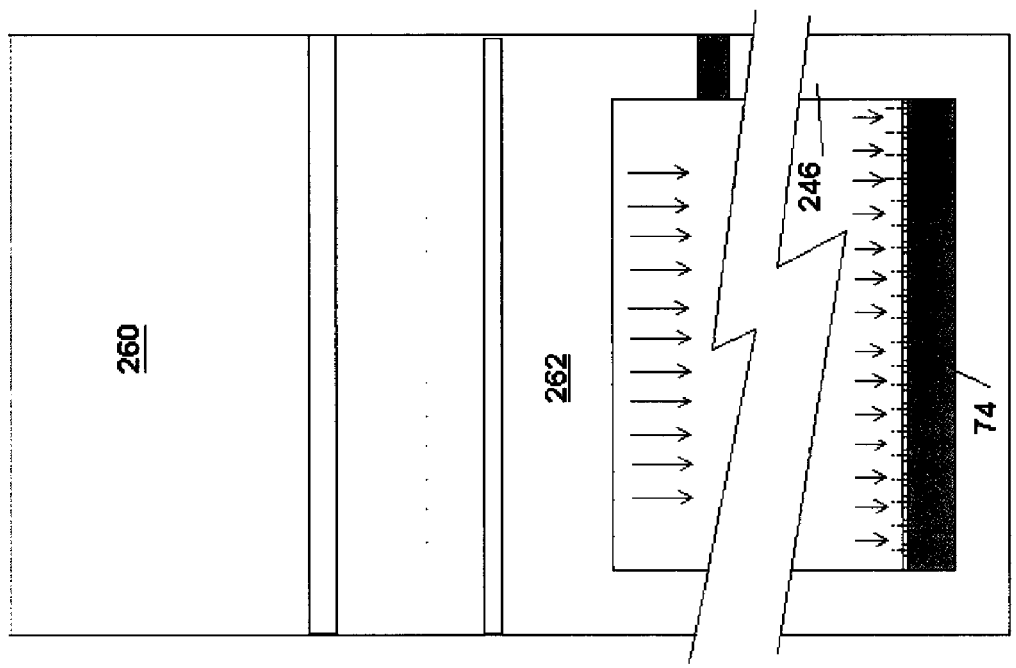

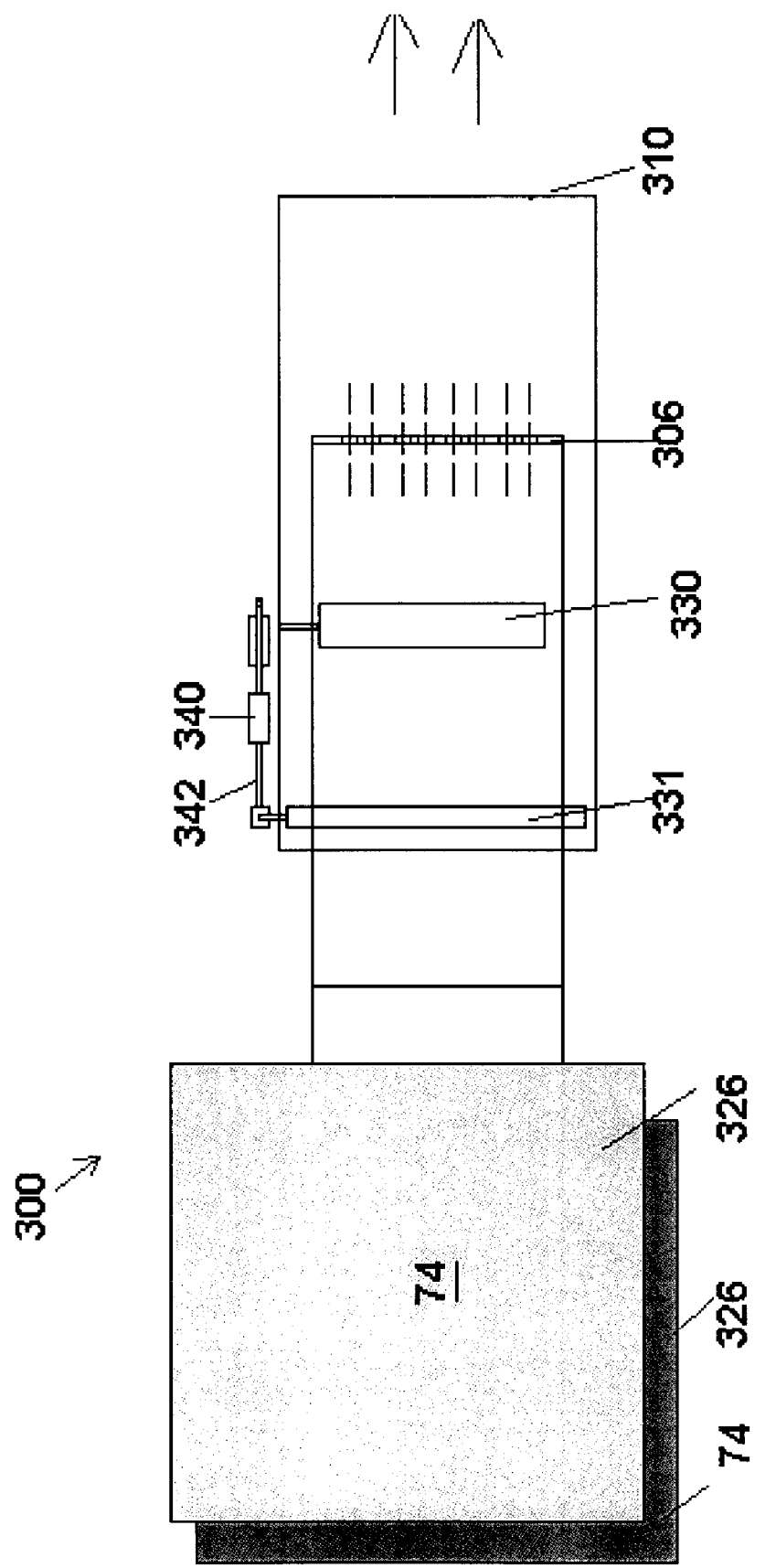

ENTRAINMENT AIR FLOW CONTROL AND FILTRATION DEVICES

This application is the U.S. national phase entry of PCT/CA2007/001125, with an international filing date of Jun. 26, 2007, which claims the Convention Priority benefit of U.S. Patent application No. 60/805,672 filed on Jun. 23, 2006, which is incorporated in its entirety herein by reference.

FIELD OF THE INVENTION

The present invention relates to air ventilation, filtration, purification, cleaning, thermal, humidity and pressure conditioning. It relates more particularly to apparatus for attachment to or use with an air supply system, such as an airplane, automobile or building ventilation system, or an air curtain system.

BACKGROUND OF THE INVENTION

Spaces where occupancy density and consequently the potential for human pathogen spread is high, or where processes create air pollutants such as dust, gases are prime candidates for local ventilation entrainment and recirculation, filtration, air purification and air cleaning. Such spaces where occupant generated pathogens and irritants are a concern include aircraft passenger cabins, conference rooms, trains, trains, buses, subways, submarines, street cars, cars, classrooms, theaters, auditoriums and animal feed lots/barns. Moving sufficient air through central heating, ventilation and air-conditioning (HVAC) systems to dilute these air contaminants to safe levels can be costly, as can the extensive use of portable air cleaners.

Air contaminants such as chemicals and pathogenic organisms, and ventilation air supply thermal and humidity gradients, particularly in high occupancy enclosed spaces such as in transportation vehicles, can present health and comfort concerns due to the limitations of existing ventilation systems using conventional air flow controllers and outlet diffusers to deliver air cleaned centrally. Existing systems may filter, purify and/or clean the air delivered and thus provide a limited amount of local dilution of air contaminants but they have limitations: pathogens and air contaminants, for example, can still be circulated locally by the airflow patterns introduced by the diffusers, by occupant movement and other forces, travelling laterally between occupants before being returned to a central air cleaner and conditioner system.

Ventilation air and air curtain air boundary layers can entrain contaminants (including dust and insects), causing them to enter the occupant breathing zone or space being protected.

In buildings, aircraft, trains, buses and the like, or other environments, ventilation air is typically provided by a central environmental control system (ECS) or heating, ventilation and air-conditioning (HVAC) system. The system typically delivers a supply of thermally conditioned and filtered, purified and/or cleaned air through ducting to room air diffusers and in the case of aircraft and other passenger vehicles, to cabin air diffusers and gaspers or personal air outlets (PAOs).

One problem lies in part in the entrainment into the ventilation air of localized air pathogens, dust, odours, or insects as it passes on its way from the diffusers to the occupant breathing zones.

Ventilation systems do not adequately address direct person-to-person air contaminant and pathogen spread. Prior flow controller and diffuser designs do not filter out air contaminants in the local space, which is where many air contaminants are generated. These pathogens, dust and odours are drawn into the air supply as it passes to the occupant-breathing zone by the airflow turbulent boundary layer. Hence, even personal ventilation devices such as gaspers can actually increase rather than decrease the spread of airborne disease.

Existing ventilation systems also suffer from other drawbacks and there is a need for improved and more effective ventilation systems and components thereof.

The present inventor has previously described in PCT patent application no PCT/CA2007/000889, devices which when used with an aircraft gasper or Personal Air Outlet, takes advantage of the air supply momentum imparted by the existing ventilation system to entrain local air, filter and clean it as desired, provide a supply of filtered, purified and/or cleaned air to passengers and crew, mitigate against air contaminants emanating from neighbouring occupants and equipment, and improve local thermal conditioning and comfort.

SUMMARY OF THE INVENTION

The invention relates to air movement and filtration devices for use by designers, manufacturers and installers of ventilation systems, recirculation systems, air cleaner devices, and air curtains to supply ventilation air which is higher volume, cleaner and more effectively and/or energy efficiently distributed than is achieved with current heating, ventilation and air-conditioning (HVAC) systems, air curtains, and other air process systems. The invention may be installed as add-on or integral with HVAC systems, aircraft ECS (environmental control systems), air curtains and other air process systems.

It is an object of the present invention to provide improved devices, components and systems for use with heating, ventilating and air-conditioning systems, air curtain systems, and air circulation systems. It is a further object to provide such devices, components and systems which may provide one or more of improved device performance, energy savings, elimination of recirculation systems, and local air cleaning, purification and/or filtering, without using local fans or compressors.

According to one aspect, the invention relies upon the momentum of a relatively high velocity stream of air to serve as a primary flow to entrain a secondary flow of air from a nearby a remote space and to filter or clean or purify (or any combination thereof) this entrained secondary air, and to supply the combined air flows to the system supply destination. Such velocities are generally obtained with HVAC/ECS systems producing 1 or more inches of water pressure at the flow controller or a diffuser although lower pressure applications can also be practicable. This high velocity air stream is contained within the apparatus. By enclosing the primary air supply within a housing and directing the high speed airflow into a mixing chamber, one may harness the entraining depressurization effect so as to create a reduced pressure suction in a region of the housing interior, referred to as the entrainment section of the housing, and entrain ambient air from outside the housing, which enters the housing through one more inlets. The entrained airflow can originate near occupants and other air contaminant sources. It can contain pathogens, metabolic gases, clothing and skin particulate matter from the occupants as well as contaminants from other sources. According to other aspects, ambient air can be entrained which originates from locations remote from the air supply outlet, which may tend to be at more desirable temperatures, humidity or air quality, and be combined with the supply air stream. The incoming ambient air may be treated prior to or subsequent to entering the entrainment chamber. For this purpose, treatment may comprise filtering, cleaning and/or purifying of the entrained air contaminants. The entrainment of ambient air is achieved by generating a region of reduced air pressure within the housing which may be used to draw the ambient air through a filter, purifier, and/or cleaner. The air entrainment section and the mixing chamber and outlet diffuser section can include:

a) Air cleaners and oxidizers to remove irritating and toxic contaminant gases,
b) Air purifiers to kill and/or disable pathogens, and/or
c) Media and/or electronic filters to remove aerosols including pathogens.

The above are referred to herein generally as air treatment systems or means.

The combined entrained or secondary air and the primary air supply from ventilation ducting, from an air supply control device such as a VAV box, or from a diffuser air supply, are combined in a mixing chamber and then discharged back into the ventilation system ducting or to the space being served by the diffuser. The discharge velocity can be tailored as wished to be, for example, at a sufficiently low velocity when the outlet air is being diffused into a space to reduce subsequent entrainment in the space. In various aspects the invention may increase air circulation to occupants and treat air contaminants in the ambient air it entrains and if desired also in the primary airflow. In another aspect the mixing of the entrained ambient air with the primary air flow in the mixing chamber may reduce the thermal and humidity gradients that otherwise exist between the air exiting an air outlet and the air in the space being served. It can entrain warm or cool air locally which will thermally condition the air being supplied to the space. The device can be designed to control the combined air flow so as supply a relatively constant volume of air even when the primary air supply modulates higher or lower.

The invention lends itself to the use of relatively large media filter areas. This is advantageous as the larger the air filter surface area for the space or number of persons being served, the lower the pressure loss across the filter, the longer the air passage time in the filter or purifier, the higher the filter efficiency in removing air contaminants and the higher the filtered entrainment ventilation flows to the area and occupants being served. The ambient air entrainment section (a pipe or plenum) provides the fluid connection to the mixing pipe or chamber (mix chamber). The high velocity injection airflow enters the mix chamber through a nozzle with one or more jet or orifice outlets. This nozzle preferably directs air towards the mix chamber and not toward the entrainment pipe or plenum. The momentum of the high velocity airflow draws ambient air into the mix chamber via the connected entrainment section.

The momentum of the airflow injected into the mix chamber through the ejector nozzle creates suction in the entrainment section drawing in an airflow rate of several times or more (depending upon supply air, device outlet and ambient air pressures, and device dimensions) that of the injection airflow. The combined entrained plus injection airflows are delivered to the ventilation ducting system or to the space through a mix chamber outlet or diffuser. The system housing is reconfigured according to the various applications.

This ventilation, recirculation and filtration technology system provides additional clean ventilation air without the use of local fans/blowers or compressors.

As well, it will be seen that although the invention is described primarily by reference to its application in buildings and aircraft, the invention may readily be used in many other applications, including without limitation mines, trains and other vehicles, spacecraft, watercraft and stationary uses.

According to one aspect, the invention relates to a device for use with a high speed primary air flow comprising a mixing chamber having an entrance, a nozzle directed towards the mixing chamber entrance, an entrainment chamber, a connection between the entrainment chamber and the mixing chamber, and an air outlet from the mixing chamber to the ventilation system ducting, a diffuser or other air control device. The entrainment chamber preferably contains a filter subcompartment with a filter, air purifier, and/or a gaseous sorber/converter. According to another aspect, the nozzle comprises an array of at least four jets, and said mixing chamber has a length to inside diameter ratio that approximates unity as a minimum. It has been found that the use of a nozzle comprising four or more jets permits use of a mixing chamber having this minimum length to diameter ratio, which in turn permits a relatively short length structure. By way of example, a mixing tube may have a length and inside diameter of about two inches to permit a relatively compact mixing chamber.

According to another aspect, the mixing chamber comprises two or more side walls which diverge towards the air outlet. The walls may diverge by one or more of the walls being sloped by between 0 and 25 degrees from the vertical when the chamber is in a vertical orientation. It has been found that this configuration tends to enhance entrainment and can be helpful in increasing occupant comfort by reducing the velocity of air exiting the mixing chamber.

According to one aspect, the invention relates to an ejector flow controller for use within a ventilation system comprising a housing having first and second opposed ends, an ejector conduit for delivering a primary stream of pressurised air, said ejector conduit entering into said housing at said first end, an outlet at said second end, a nozzle with one or more jet outlets at an end of said conduit within said housing to direct a stream of said pressurised air towards said outlet at said second end, at least one inlet into said housing for a secondary stream of ambient air configured for entraining said secondary stream within said primary stream, a filter compartment having an inlet to admit ambient air into the filter compartment and an outlet to permit release of treated ambient air from the filter compartment, an air treatment means within said filter compartment to treat ambient air prior to its entrainment within the primary stream, and a fluid connection between said filter compartment outlet and said housing inlet for said secondary stream to travel from said filter compartment to said housing. Preferably, there are provided multiple filter compartments at least one of which is remote from said housing.

Preferably, there is also provided at least one adjustable damper positioned in the path of said primary stream or said secondary stream or both, and an actuator to adjust said damper to control the flow of one or both of the primary or secondary air streams. Preferably dampers are provided for both the primary and secondary streams and the dampers may be either independently actuated or actuated in tandem by a single actuator, with mechanical linkages to the dampers.

According to another aspect, the invention relates to an aircraft ventilation system comprising a source of pressurised air for delivering a primary stream of air, a first conduit for conducting said primary stream, an ejector as defined above, wherein said first conduit comprises said ejector conduit, at least one of said filter compartments being mounted at an overhead location within said aircraft, and a diffuser in fluid connection with said housing outlet of said ejector. Preferably, at least one filter compartment is mounted at one or more of a position overhead of passenger seats and overhead of the passenger aisle. The filter compartment(s) can comprise one or more filter compartments in fluid communication with a common duct leading to said ejector housing. Said filter compartments being in fluid communication with a common duct leading to an ejector housing.

According to another aspect the invention relates to a linear slot or louver diffuser outlet for a ventilation system, comprising:
  a housing having opposing side walls, a base and a top defining an interior space,
  at least one barrier within said interior space extending upwardly from said base, said barrier having an upper rim spaced to leave a gap between said rim and top, said barrier defining first and second communicating compartments within said interior space,
  a source of pressurized air,
  a first opening into said housing through said top to admit said pressurized air into said first compartment as a primary stream of pressurized air,
  at least one discharge opening within said base opposed to said first opening positioned to permit said primary stream to flow into said first compartment where it entrains ambient air and mixes with this entrained air and the combined two air flows exit through said slot or louver,
  a second opening within said base into said housing to admit a secondary stream of ambient air into said second compartment, wherein said secondary stream flows through said second compartment, over said barrier, and is entrained within said primary stream to generate a region of reduced pressure within said housing, and
  air treatment means within said second compartment for treating said secondary stream before entrainment within said primary stream.

The diffuser may include an air inlet plenum formed by an internal wall within said housing, said source of pressurized air opening into said plenum, said first opening comprising multiple openings within said internal wall entering into said first compartment to generate said primary stream as multiple air streams.

The diffuser housing may include therein a pair of spaced apart barriers defining three compartments including a central first compartment flanked by two second compartments, said second opening comprising an opening into each of said second compartment. The mixing chamber may be inter alia parallelepiped, truncated cone, truncated pyramid, or truncated helical in shape.

The ejector diffuser mixing chamber may have various configurations including a linear elongate structure, or rectangular or oval in shape with one or more louvers. It may contain directional vanes that are fixed or adjustable. Said second compartment may surround said first compartment, or vice-versa.

The diffuser may be adapted for use in an aircraft or other vehicle, or a building. It may be adapted for overhead, wall or floor mount.

The diffuser may be adapted for use in an air curtain system, said discharge opening configured to supply an airflow as an air curtain, said diffuser in one embodiment further comprising a receiving inlet opposed to said discharge opening to receive said air curtain and at least one air return duct to channel said discharged air from said receiving inlet to said secondary inlet. The receiving inlet comprises a recess within a surface opposed to said housing, said recess being covered with a protective grill. A filter may be provided within said recess to filter said discharged air prior to return via said return duct.

According to another aspect, the invention relates to a diffuser for a building ventilation system, comprising:
  a first housing having opposing side walls, a base and a top defining an interior space,
  a source of pressurized air,
  a first opening into said housing through said top to admit said pressurized air into said first compartment as a primary stream of pressurized air,
  at least one secondary opening within said base opposed to said first opening positioned to permit said primary stream to flow in a generally linearly fashion through said first compartment to exit through said exit opening,
  a third opening into said housing to admit a secondary stream of ambient air into housing, wherein said secondary stream is entrained within said primary stream to generate a region of reduced pressure within said housing;
  a second housing remote from said first housing, said second housing having sides, a base and a top,
  at least opening within said second housing to admit said ambient air into said second housing,
  a conduit in fluid communication between said first and second housings to transmit said ambient air from said second to said first housing, and
  air treatment means within said second housing for treating said ambient air before entrainment within said primary stream.

According to another aspect, the invention relates to a diffuser for a ventilation system, comprising:
  a first housing having a wall and first and second opposing ends, the interior of said first housing comprising a substantially enclosed interior space,
  an inlet conduit entering said housing at said first end, said inlet conduit having a first end to receive a primary stream of pressurized air and an opposed open second end to deliver said primary stream into the interior of said first housing,
  a first adjustable damper within the interior of said conduit for controlling the flow of said primary stream,
  at least one air discharge opening within the second end of said first housing generally opposed to the second end of said conduit, said second end being spaced apart from said second end of said conduit,
  an ambient air inlet into said first housing to admit a secondary stream of ambient air into said first housing interior for entrainment within said primary stream,
  a second housing separate from said first housing and locatable at a position remote from said first housing, the interior of which is in fluid communication with said ambient air inlet, said second housing having at least one opening to admit ambient air into the interior thereof, and
  air treatment means within said second housing for treating said ambient air prior to entering said first housing.

The ambient air inlet may be positioned to admit said secondary stream into said first housing at a position downstream of said second end of said conduit.

The diffuser may include a gap between the exterior of said inlet conduit and said housing within which it is positioned.

Preferably, the second end of said conduit comprises a high velocity nozzle to discharge said primary stream as at least one narrow high velocity air stream.

Preferably, a second adjustable damper is provided to control the flow of ambient air. Both dampers respond to thermal requirements, air pressure and optionally other conditions.

According to another aspect, the invention relates to an air recirculation apparatus for recirculating air within a space comprising a manifold, at least one air outlet leading from said manifold, a source of pressurized air, a source of ambient air from within said space and an entrainment and mixing chamber in fluid communication with said manifold and said first and second sources for entraining streams of air from said second source within air from said first source and discharging said combined air streams into said manifold or to ventilation system ducting, or to a diffuser or a group of diffusers. The first may source comprises external air from outside of said space.

Preferably, there are at least two of said chambers each associated with at least one of said first and second sources.

Preferably, the chamber includes an opening leading into said manifold, ducting or diffusers, said first source comprises a nozzle extending partway into the interior of said chamber and directed towards said opening to generate a primary air stream from said first source in a linear path from said nozzle into said opening, said second source comprising an opening into said chamber adjacent to said nozzle for entraining air from said second source within said primary air stream.

These and other aspects of the invention will now be described by way of a non-limiting description of various embodiments of the invention. This description is intended by way of illustration and example only and is not intended to limit the scope of the invention, which is more fully described in this patent specification as a whole including the claims.

In the patent specification herein, directional references and dimensions are unless otherwise specified, provided by way of example only or for convenience of description. It will be understood that the elements described herein may be oriented otherwise than as described or stated, and may have shapes, dimensions and configurations which depart from those stated herein.

The term "ventilation" as used herein includes air distribution, circulation, re-circulation, introducing of fresh air or exhausting of ambient air.

The term "ambient" as used herein refers to air which is in the general vicinity of a component or element described herein, which is unless otherwise specified not supplied under pressure but originating from the interior of a space, and also referring to air within the interior of a space.

The term "building" as used herein refers to any stationary structure having an interior space in need of ventilation.

The term "aircraft" as used herein refers to any type of air or spacecraft. It will be seen that with modifications that are within the skill of an person skilled in the relevant art, the systems and devices described herein may be used with essentially any vehicle, watercraft and the like that includes an enclosed cabin or compartment in need of ventilation.

BRIEF DESCRIPTION OF THE DRAWINGS

FIG. 10B is a plan view at line B-B of FIG. 10A.

FIG. 11B is a plan view at line B-B of FIG. 11A.

FIG. 12A is a cross-sectional schematic view of a fifth embodiment of a diffuser according to the invention.

FIG. 12B is a plan view at line B-B of FIG. 12A.

FIGS. 17A and 17B are schematic plan and side elevational views of a prior art diffuser for a building.

FIGS. 18A and 18B are schematic plan and cross sectional views of a diffuser for a building according to a ninth embodiment of the invention.

FIGS. 19A and 19B are schematic plan and cross sectional views of a diffuser for a building according to a tenth embodiment of the invention.

FIGS. 20A and 20B are schematic plan and cross sectional views of a diffuser for a building according to an eleventh embodiment of the invention.

FIGS. 23A and 23B are schematic plan and cross sectional views of a diffuser for an air curtain system according to a fourteenth embodiment of the invention.

FIG. 25B is a side elevational view of the embodiment of FIG. 25, viewed from line B-B of FIG. 25.

FIGS. 26A and 26B are schematic side sectional and plan views of a VAV ejector flow control box according to a sixteenth embodiment of the invention.

DETAILED DESCRIPTION

Figure 1:
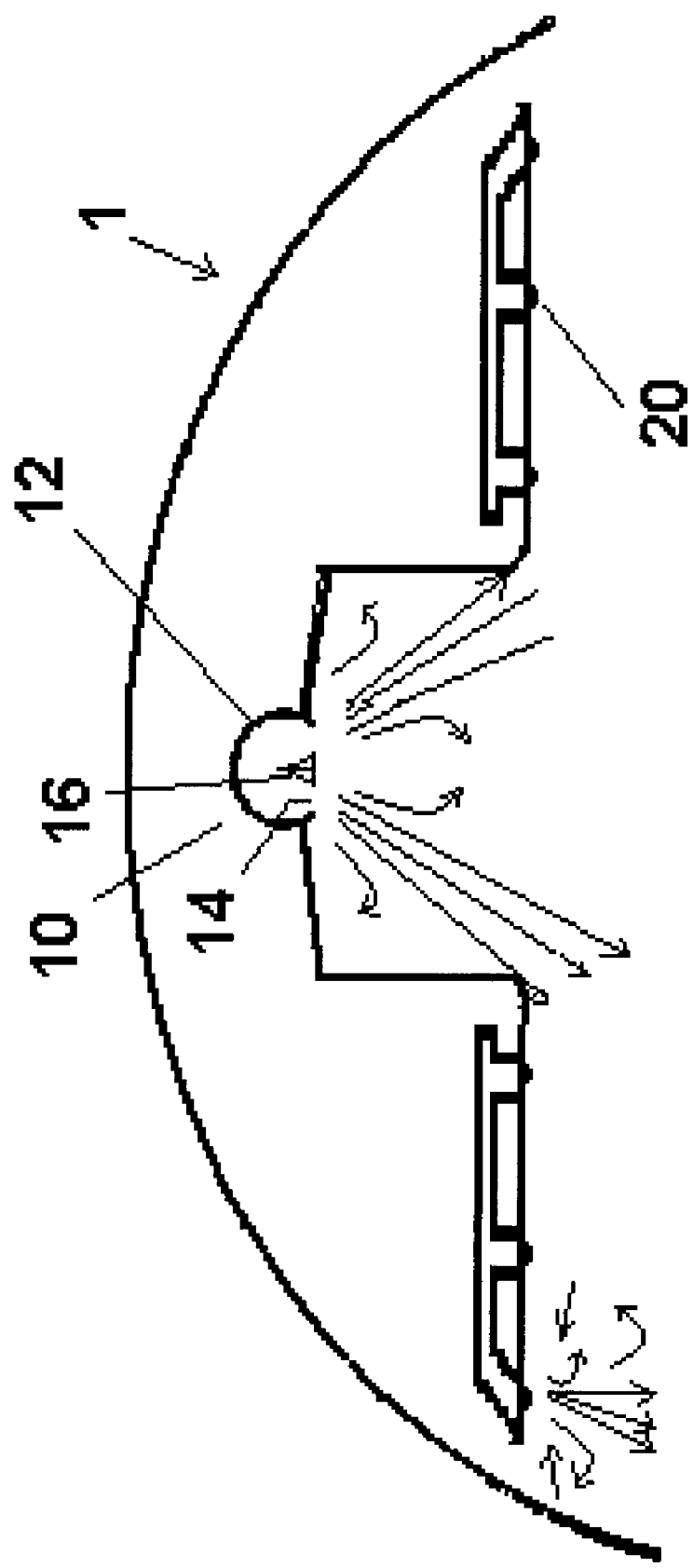
FIG. 1 is a cross-sectional schematic view of a prior art main cabin air supply diffuser system installed within an aircraft cabin.
Figure 1B:
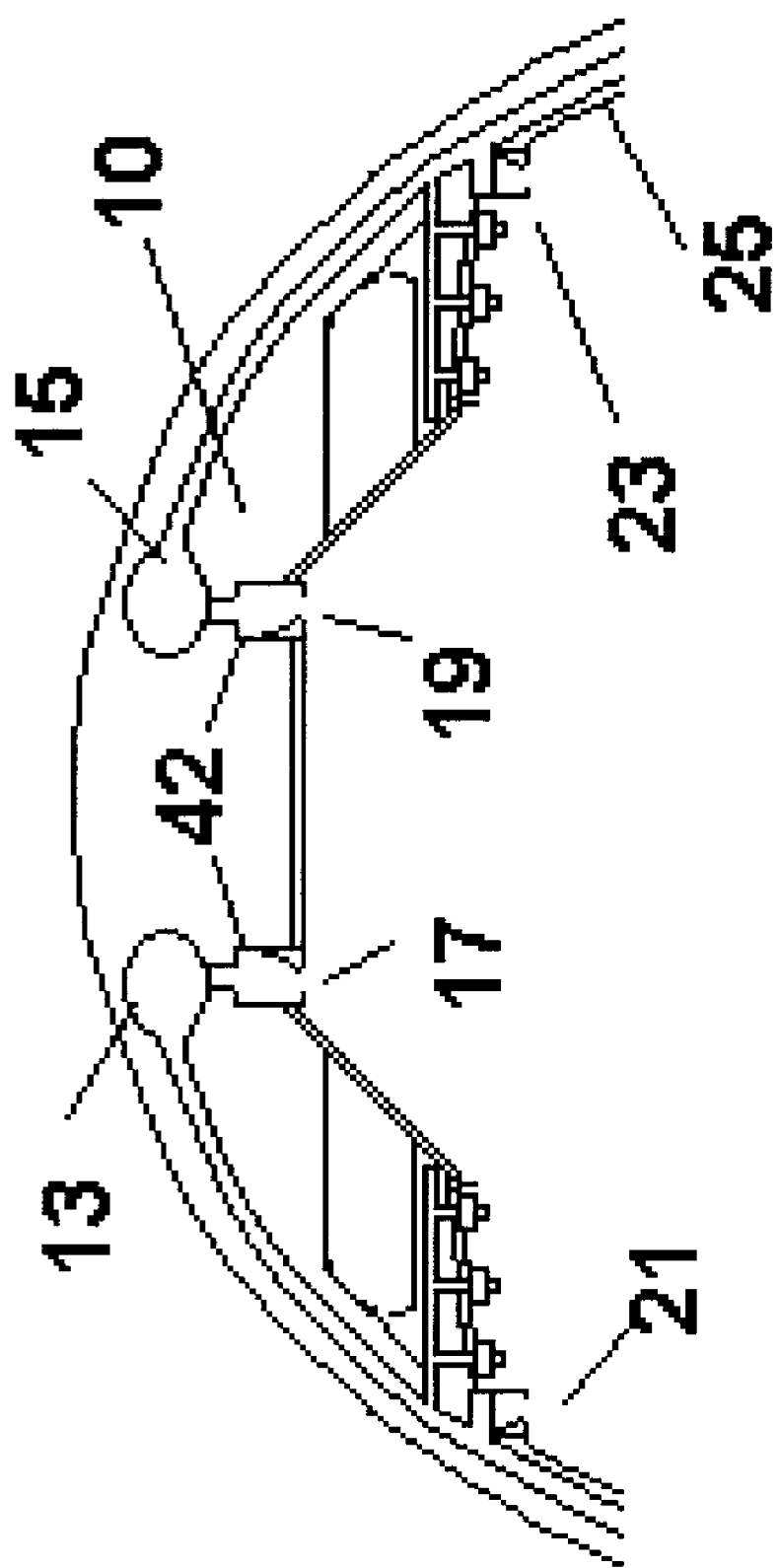
FIG. 1B is a cross-sectional schematic view of another prior art main cabin air supply diffuser system installed within an aircraft cabin.
Figure 2:
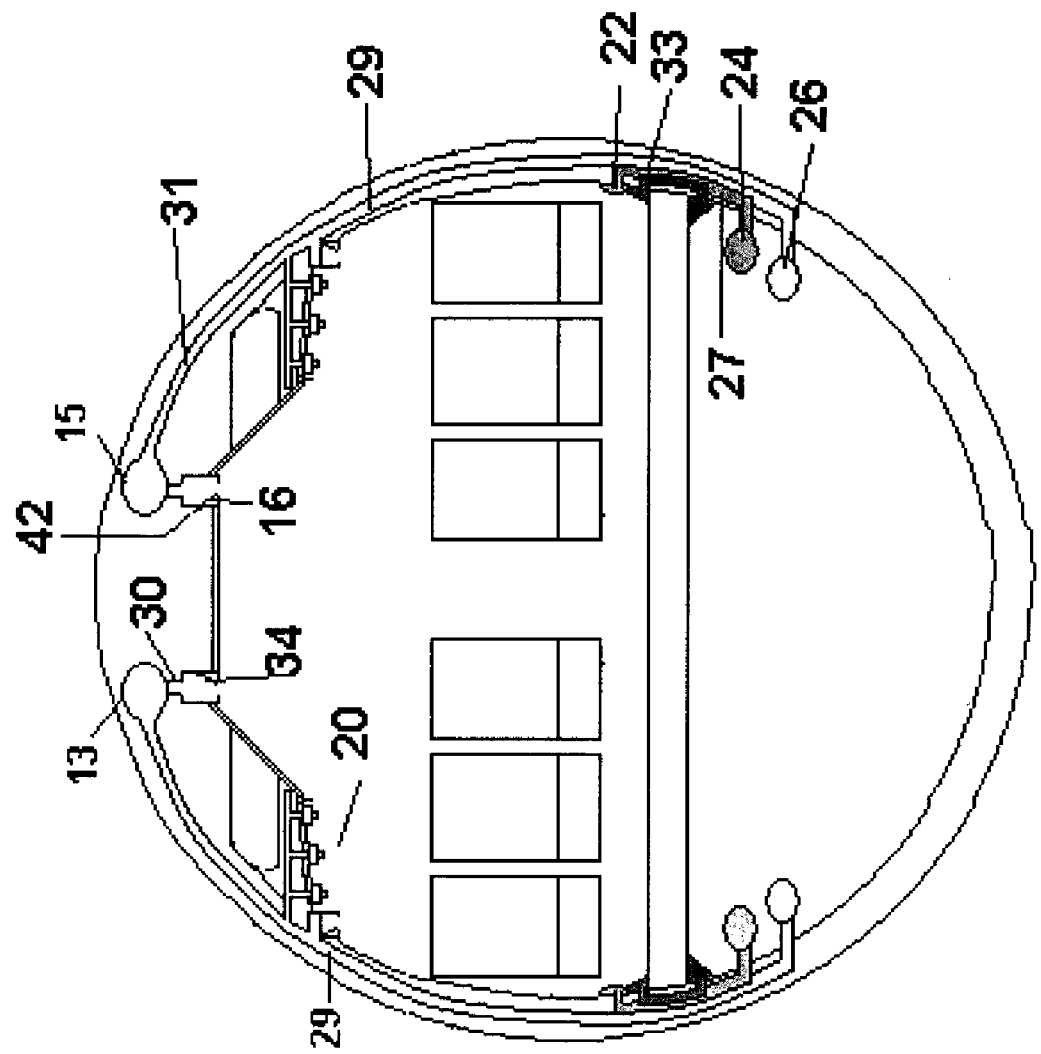
FIG. 2 is a further cross-sectional schematic view of a different prior art diffuser system installed within an aircraft cabin.

In a first embodiment, a diffuser for a ventilation system is provided which is particularly suited for aircraft and other similar enclosed cabins such as trains and buses. Although referred to generally herein as an aircraft or aircraft-type diffuser, persons skilled in the art will understand that numerous applications of this system are possible with suitable modifications. FIGS. 1, 2, 3 and 5 illustrate various prior art systems installed within a generally conventional passenger aircraft fuselage 1. FIG. 1 is a cross-sectional schematic view of a prior art aircraft ventilation system 10 comprising a central duct 12 running substantially the length of the cabin, having a two slots 14 for diffusing airflow into the cabin interior. Typically, the slots direct air generally laterally along the ceiling, with the two slots being oriented in opposing directions. Directional vanes 16 may be provided, which direct the airflow in a desired direction or if vanes slanted in opposing directions are provided, the airflow may be effectively split into different directions to spread the airflow. The central air supply duct typically provides the primary supply of ventilation air into the cabin. A secondary supply is delivered by a series of individual gaspers 20, which are positioned generally above each passenger seat. The gaspers supply a relatively narrow and directed airflow, which is controllable by the individual passenger pointing the nozzle in a desired direction. FIG. 1B shows another prior art aircraft ventilation system. This system has two separate ducts 13 and 15 feeding two separate overhead central diffusers 17 and 19 and two separate wall wash diffusers 21 and 23 by the stowage bins at the cabin liner 25. FIG. 2 illustrates a similar system, with additional airflow provided by dual opposing foot-level vents 22 provided on opposing sides of the aircraft cabin fuselage. The foot vents 22 comprise a series of individual vents just above the cabin exhaust air outlet grilles 33. In either case, each side is fed an air supply by a duct 24 below the floor. Air is ducted to the floor vents ducts, the wall wash ducts and the overhead ducts by riser ducts 29. Foot vents of this type are provided, for example, in at least some models of Bombardier™ aircraft. The gaspers are fed by dedicated ducts 26. The central diffusers are provided an air supply from ducts 13 and 15 by vertical ducts, which feed a diffuser housing 42 through vertical ducts 30 that convey ventilation air from the central ducts 13 and 15 to the slot diffuser housing 42. The slot has directional vanes 34 which direct the air laterally towards the seating areas.

Figure 3:
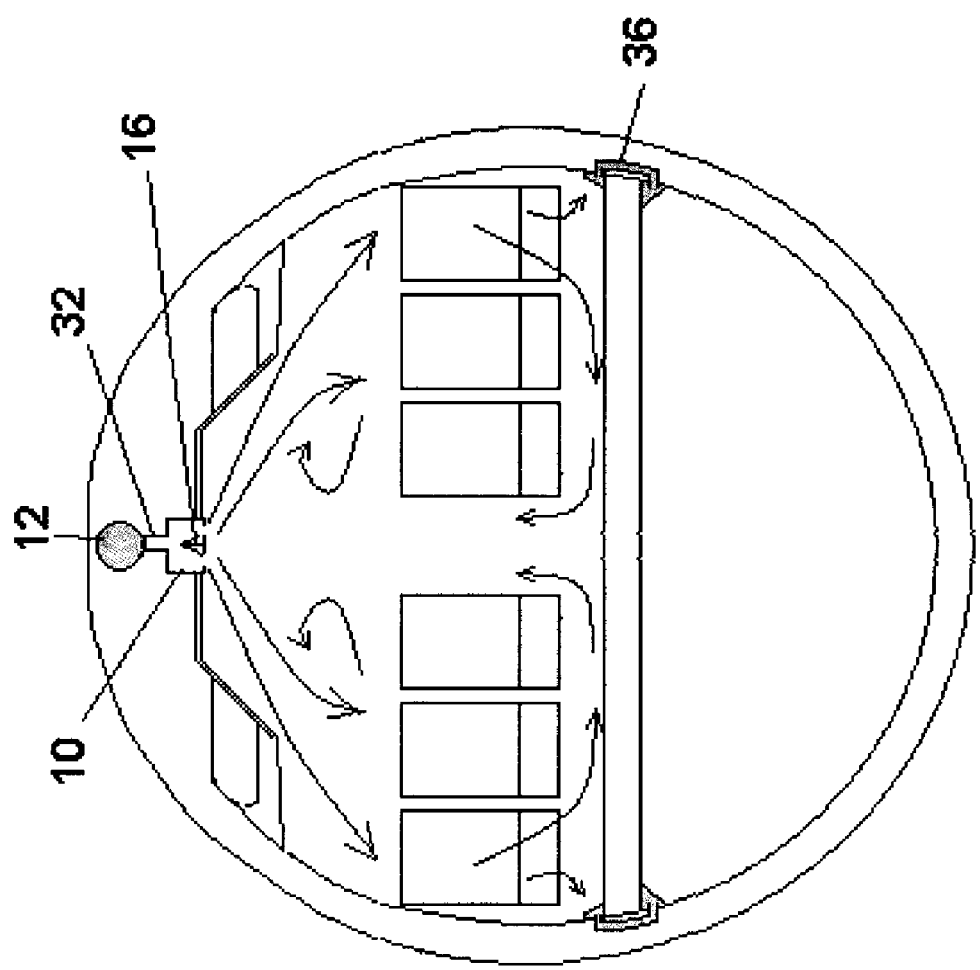
FIG. 3 is a cross-sectional schematic view of a prior art diffuser system installed within an aircraft cabin, showing approximate airflow patterns.
Figure 5:
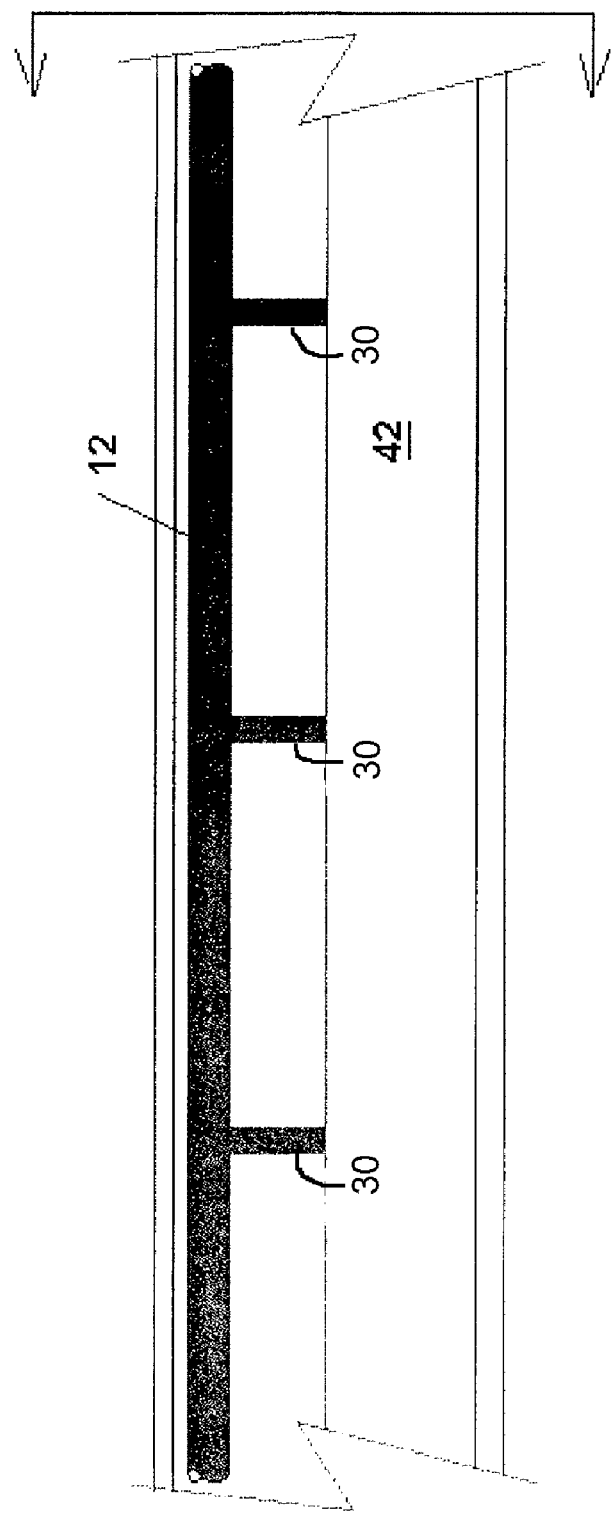
FIG. 5 is a schematic side elevational view of a prior art system.

FIG. 3 is a further illustration of a prior art system, with the arrows indicating what are believed to be the approximate airflow patterns generated during typical operation of the system. An overhead diffuser 10 is similar to that shown in FIG. 2. Floor level openings 36 permit air circulation to pass below the floor drawn by the recirculation fan, where it either exits the plane by the outflow valve or is recirculated back to the cabin. Typically 40 to 50% of the cabin air is recirculated. FIG. 5 shows an array of pressurised air take off ducts 30 extending vertically downwardly from the duct 12 spaced approximately 12 inches apart. The take off ducts 30 direct pressurised airflow from the duct 12, into the linear slot diffuser 42.

Figure 4:
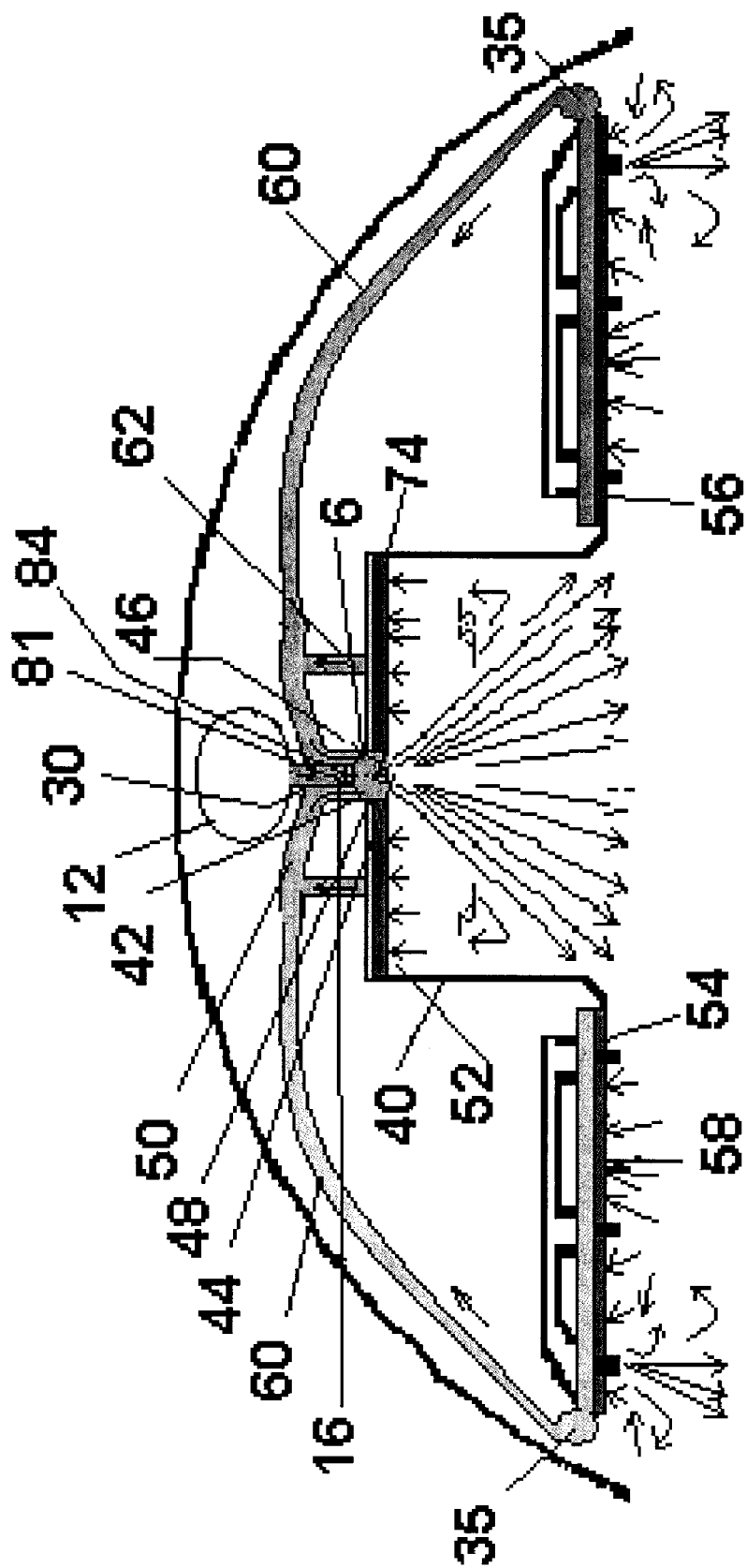
FIG. 4 is a cross-sectional schematic view of a first embodiment of a diffuser system according to the invention installed within an aircraft cabin.

Turning to FIG. 4, a first embodiment of the present invention is shown, consisting of the existing central air supply 12 flanked by lateral ambient air inlets overhead the aisle and optionally the passenger seating. An ejector mix tube/diffuser 42 is provided above the cabin ceiling 40. Those skilled in the art will recognize that one or more such diffusers may be provided, depending on the size of the aircraft cabin and its ventilation requirements. For example, diffusers may be paired within the cabin, or overhead of the seated passengers, or alongside the fuselage walls to provide an air wash skirting the interior wall. Two slot outlets 46 are illustrated, configured to discharge ventilation air downwardly and laterally from a central location.

The existing take-off ducts 30 discharge pressurised air from the duct 12 into the ejector 42 via a nozzle 81 with one or more jet openings 84 directed at the mix chamber. The ejector 42 comprises an elongate entrainment and mixing chamber having a generally open base 44 which forms two slots 46. The housing comprises opposing side walls 48 defining an interior space. Vanes 16 direct the air flow from the mixing chamber in opposing directions. With reference to FIG. 4, ventilation air is discharged under pressure through the ducts 30 and enters the housing as a primary stream at a relatively high velocity. The primary stream entrains ambient air from within the housing interior, and it is believed that all or most of this entrainment occurs at the boundary layer of the primary stream as it passes through the housing. It is believed that entrainment of ambient air occurs within the upper region of the mix chamber housing, and mixing of the entrained air and primary stream occur in the lower region of the housing 42. The entrainment of ambient air generates a region of reduced pressure within the interior of the housing 42, which draws in cabin air through inlet ducts 50 from filters 74 either side of the mix chamber. Optional filter 54 entrainment air intakes are also shown surrounding the gaspers. These would be installed if gasper entrainment devices were not installed. The incoming ambient air passes through an array of air filters 74 mounted within inlet housings 52 that are positioned in the cabin ceiling flanking either side of the mixing plenum.

Optional additional inlet housings 54 are mounted along the sides of the cabin generally over the passenger seats, on the underside of the passenger service units (PSU's). The ambient air filters 56 may be hidden behind grills 58, which serve to protect the filters. Conveniently, the filters 56 and 74 comprise any suitable air filter, such as a paper filter capable of filtering a wide array of micro-organisms and particulates from the cabin air. Incoming air passing through the filters is channelled towards the housing, through an array of inlet air ducts which collect the incoming ambient air from the respective filters. The inlet air duct network 50 consists of branch ducts 60 which feed opposing trunk manifolds 62 on either side of the cabin. Optionally, this configuration also includes entrainment intakes above the heads of passengers. Branch riser suction ducts 60 take off periodically lengthwise from longitudinal ducts 35, which are connected to filter 54 assemblies, placed over passenger seat rows. Each trunk manifold feeds into the housing such that the incoming ambient air is entrained within the primary air stream and discharged through the central opening or openings, as seen schematically in FIG. 4. Ambient air is drawn through the inlet air duct network by the reduced pressure generated within the housing as ambient air is entrained within the primary air stream. The arrows in FIG. 4 illustrate the approximate airflow patterns believed to result from operation of the system, although this may differ in practice from the actual airflow patterns.

In operation, air is drawn upwardly through the filters 56 and 74 and into the duct network 50, by the pressure reduction generated within the housing 42. This occurs because the momentum of air passing through housing 42 entrains ambient air within the boundary layer surrounding the primary airflow, thereby reducing pressure within the neighbouring trunk manifold 60 and drawing air through the branching entrainment manifolds 62.

It will be seen that some or all of the air filters may be supplemented or replaced by other treatment means such as air purifiers or cleaners, and/or gaseous and particle filters and sorbants. The treatment means consist of any suitable air treatment means known to the art.

Figure 6:
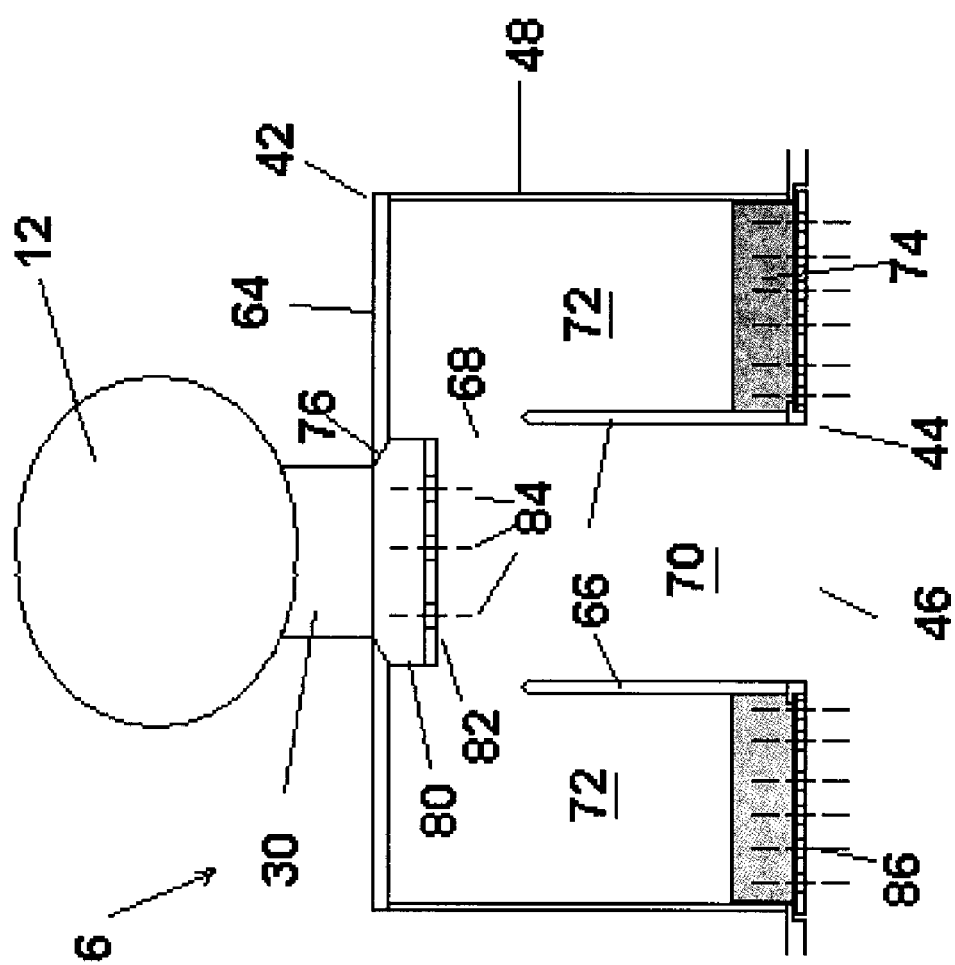
FIG. 6 is a cross sectional schematic view of a second embodiment of a diffuser according to the invention.
Figure 7:
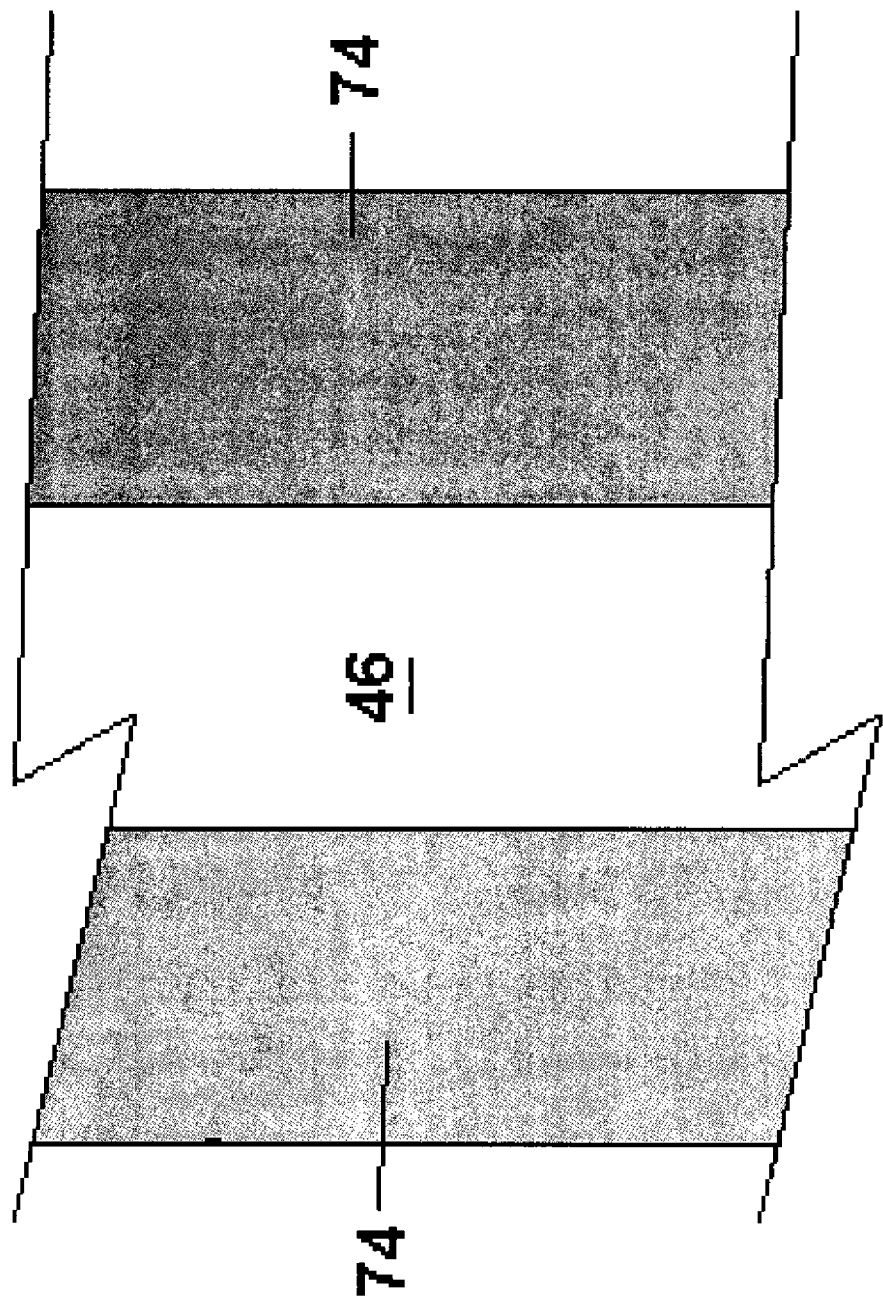
FIG. 7 is a schematic plan view from below of the diffuser of FIG. 6.

FIGS. 6 and 7 illustrate a further embodiment of an ejector filter diffuser 6. In this version, the ejector diffuser 6 comprises an elongate housing 42 having sides 48, a partially open base 44 and a top 64. The base 44 includes a central slot 46 which discharges the combined primary and entrained air streams. Internally, the housing 42 is divided into three regions or subcompartments by internal barriers 66 which extend upwardly from the base. The subcompartments extend lengthwise within the housing in side by side relation. The barriers 66 do not extend fully to the top of the housing but leave a gap 68 to permit the internal subcompartments to communicate with each other. A central subcompartment consists of a mixing region 70, and the flanking subcompartments on either side thereof are entrainment/filter compartments 72 for treating the ambient air with a filter or any other suitable air treatment. As will be discussed below, airflow within the housing 42 travels upwardly within the entrainment/filter compartments 72 and reverses course to travel downwardly and outwardly in the mixing compartment 70. The main air supply duct 12 is overhead of the housing 42, and feeds pressurized ventilation air into the housing via spaced supply conduits 30 through openings 76 within the top of the housing 42, as in the previous embodiment. An elongate central plenum 80 within the housing 42 receives the pressurized air supply. The plenum 80 includes a floor 82 having openings or jets 84 positioned directly above the central slot 46 within the housing base, to transmit multiple streams of primary airflow, preferably at a relatively high velocity to entrain ambient air. Entrainment of ambient air occurs through the filters into the region of the housing above the barriers 66 where it combines with the pressurized high velocity air supply and enters the mixing chamber. Further mixing occurs throughout the mixing tube and for full entrainment should be complete before it reaches the end of region 70 of the housing 42. Ambient air is drawn upwardly through the flanking subcompartments 72, as in the previous embodiment, which permits such air to enter through an open grill 86 within the base 44 at these regions, and pass through filters 74 which can be seen more fully in FIG. 7.

Figure 8:
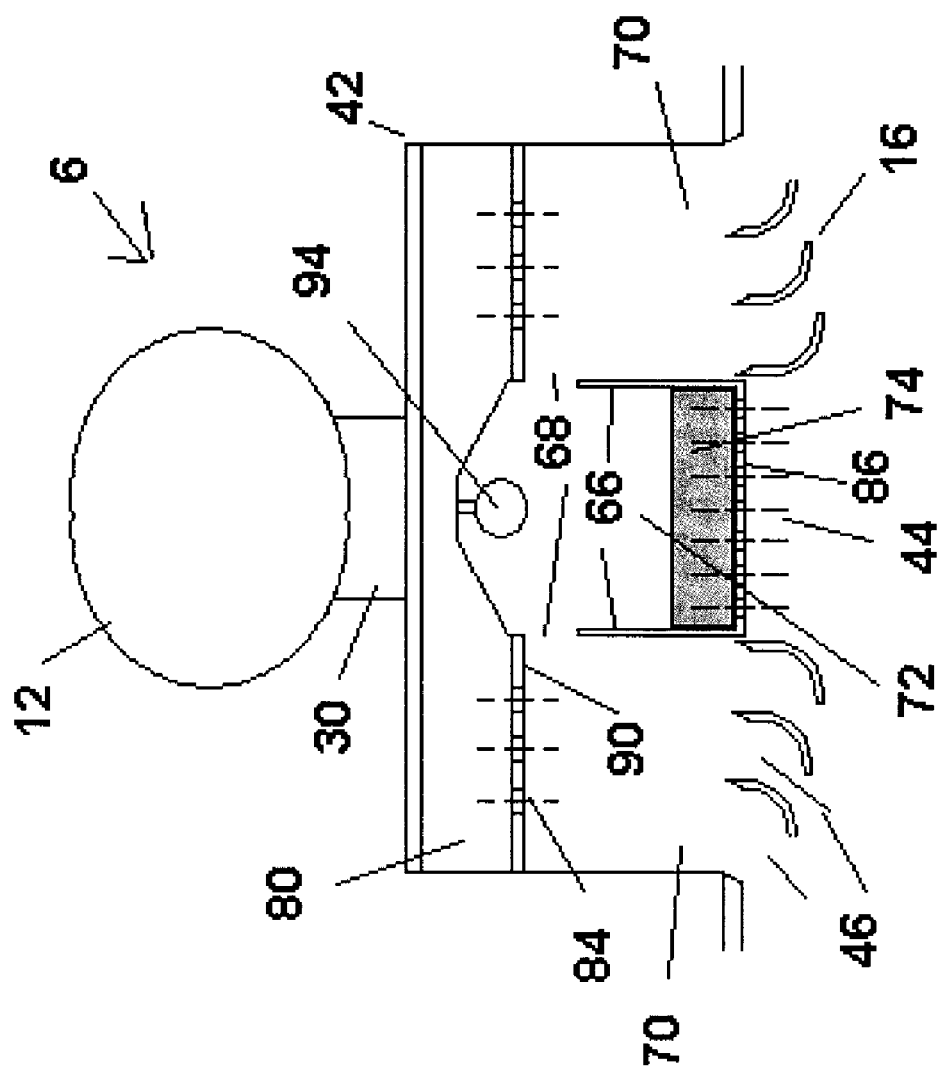
FIG. 8 is a cross-sectional schematic view of a third embodiment of a diffuser according to the invention.

FIG. 8 illustrates an alternative embodiment of the aircraft ejector filter ventilator 6. In this version, the housing 42 includes a plenum 80 within the interior of the housing and fully spanning the interior of the housing. The plenum 80 encloses the upper portion of the housing 42 and is formed by a horizontal divider or plenum floor 90 spanning the housing interior near the top of the housing. Multiple ducts 30 discharge pressurized ventilation air into the plenum 80 from the overhead ventilation air supply duct 12. The floor 90 of the plenum has an array of openings 84 therein for discharging a plurality of primary air streams downwardly into the interior of the housing 42. The openings 84 are positioned within the flanking regions of the floor, with the central region being free of openings. Within the interior of the housing, a pair of spaced apart internal barriers 66 extend upwardly from the base of the housing, in a similar fashion as the previous embodiment, effectively dividing the housing interior into three communicating regions extending lengthwise along the housing. Air flow is permitted between the regions, since the walls do not extend the full height of the housing and a gap 68 exists between the upper rim of each barrier and the top of the housing. The flanking regions comprise mixing subcompartments 70, which receive primary air streams from the openings 84 within the plenum floor which are positioned to direct primary streams directly downwardly into these flanking regions 70. The flanking regions have open bases comprising slots 46 extending lengthwise along the base of the housing to permit air to exit these regions. The middle region forms the filter subcompartment 72 and has a perforated base 44 which supports a filter 74 and permits ambient cabin air to enter the housing 42.

The primary streams exiting the plenum 80 entrain and then mix ambient air from within the interior of the housing 42 as they travel downwardly at a relatively high velocity through the housing. Upon entering the flanking subcompartments 70, the combined ambient and primary airstreams undergo mixing before exiting through the slots 46. Ambient cabin air is drawn upwardly through the central region 72, for entrainment within the primary air streams. A filter 74 or other air treatment means is mounted within the central subcompartment 72, so as to treat the incoming ambient air. It will be seen that the embodiment described in FIG. 8 may replace or supplement the diffusers shown within the cabin ventilation systems illustrated in other embodiments described herein.

Optional vanes 16 partially obstruct the flanking slots to direct the flow of downwardly moving air. The base of the central region 72 comprises a grill 86 which permits ambient cabin air to flow freely into the interior of the central region 72.

FIG. 8 illustrates a UV light 94 mounted below the plenum floor to purify the incoming ambient air.

Figure 9A:
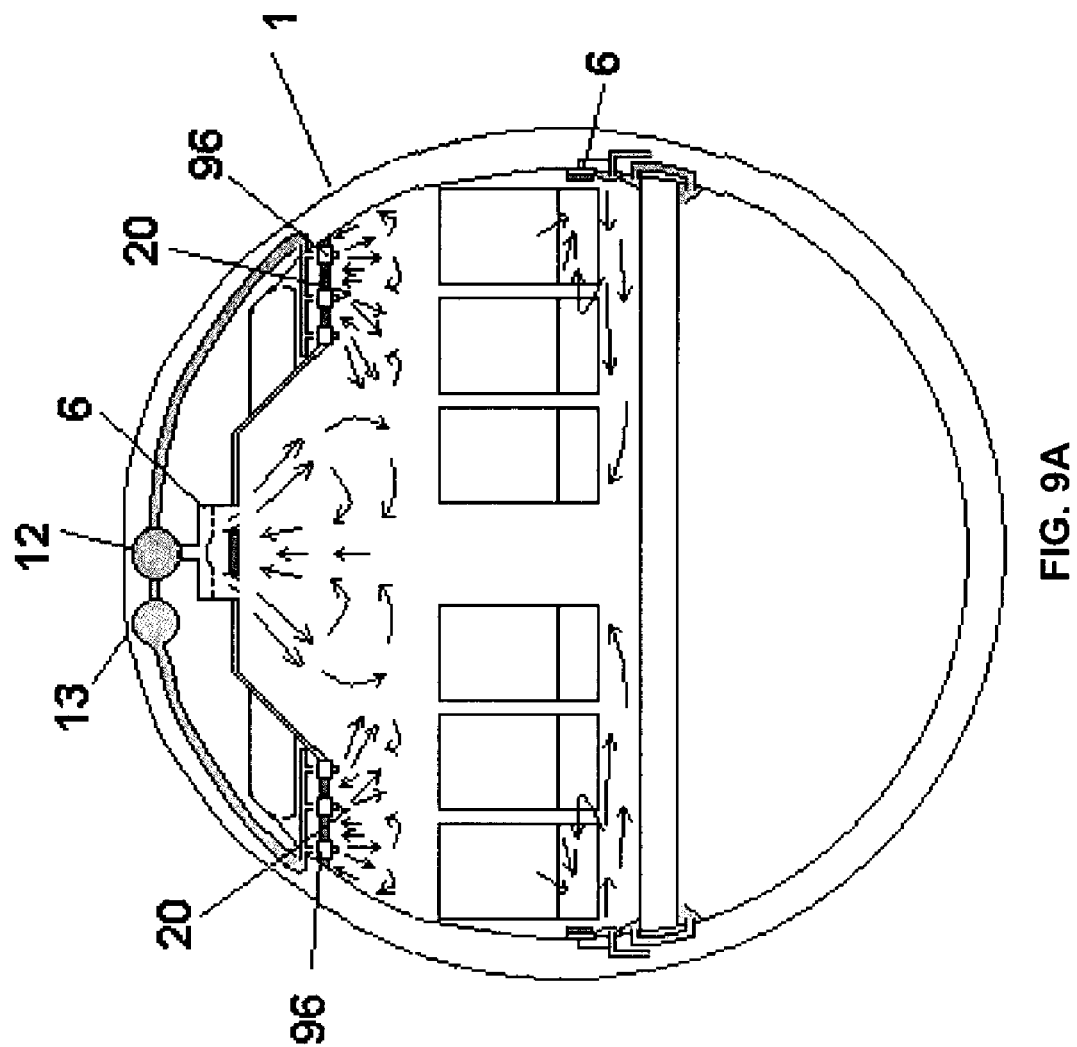
FIG. 9A is a cross-sectional schematic view of the third embodiment installed within an aircraft cabin in a first configuration showing approximate airflow patterns.
Figure 9B:
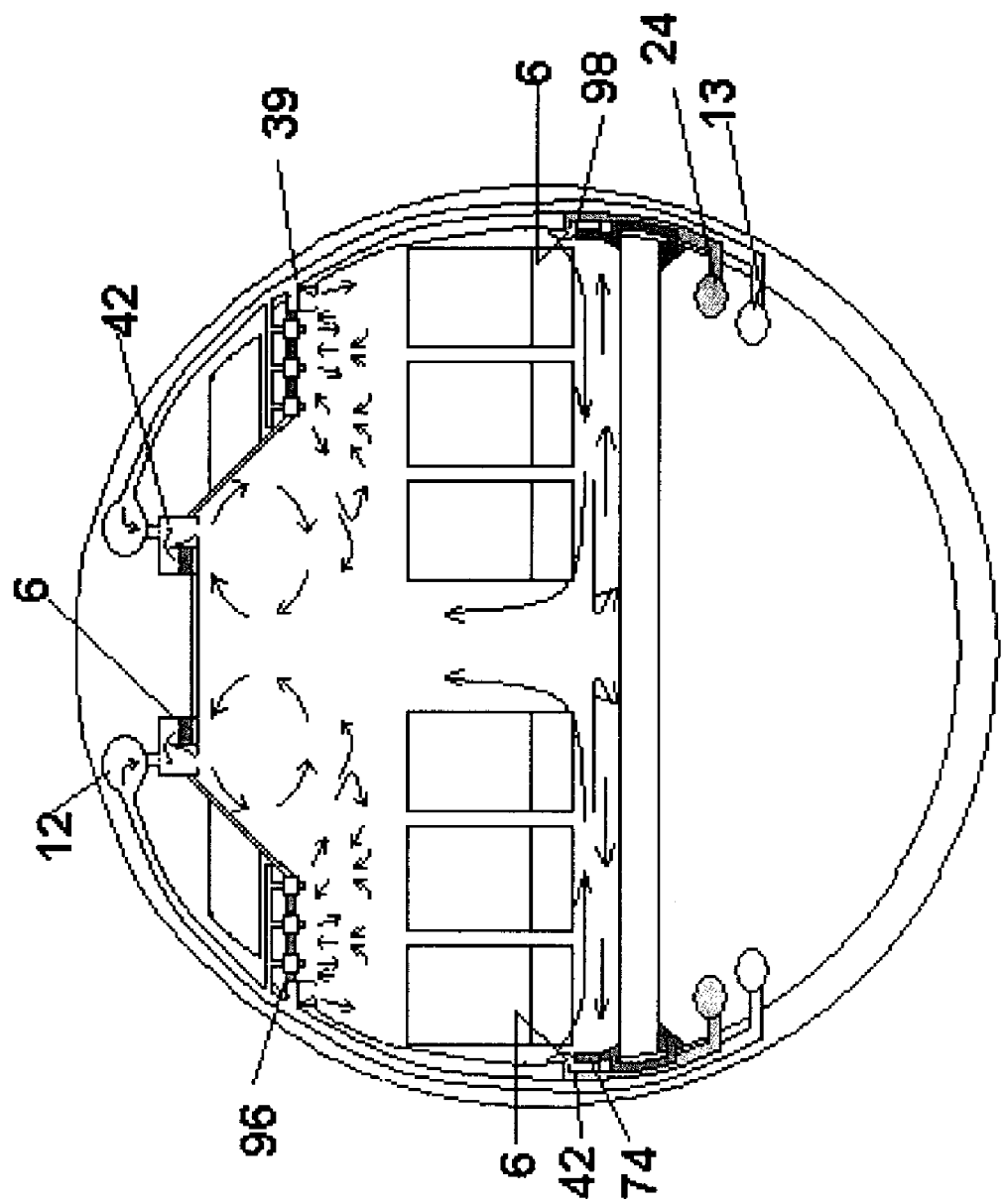
FIG. 9B is a cross-sectional schematic view of the third embodiment and a fourth embodiment installed within an aircraft cabin in a second configuration showing approximate airflow patterns.

FIGS. 9A and 9B illustrates an embodiment in which an aircraft main cabin air supply diffuser 6 of the type described in connection with FIG. 8 is installed centrally in a cabin 1. Additional ventilation air is supplied to individual gaspers 20 located over the passenger seats, and the gaspers are also supplied with individual entrainment devices 96 such as the devices described in the inventor's patent application no. PCT/CA2007/000889. FIG. 9A illustrates a version with two overhead air supply ducts 12 and 13. In FIG. 9B, the central ejector diffuser 6 uses supply duct 12, while supply duct 13 supplies air to the gaspers located along the sides of the cabin.

Figure 10A:
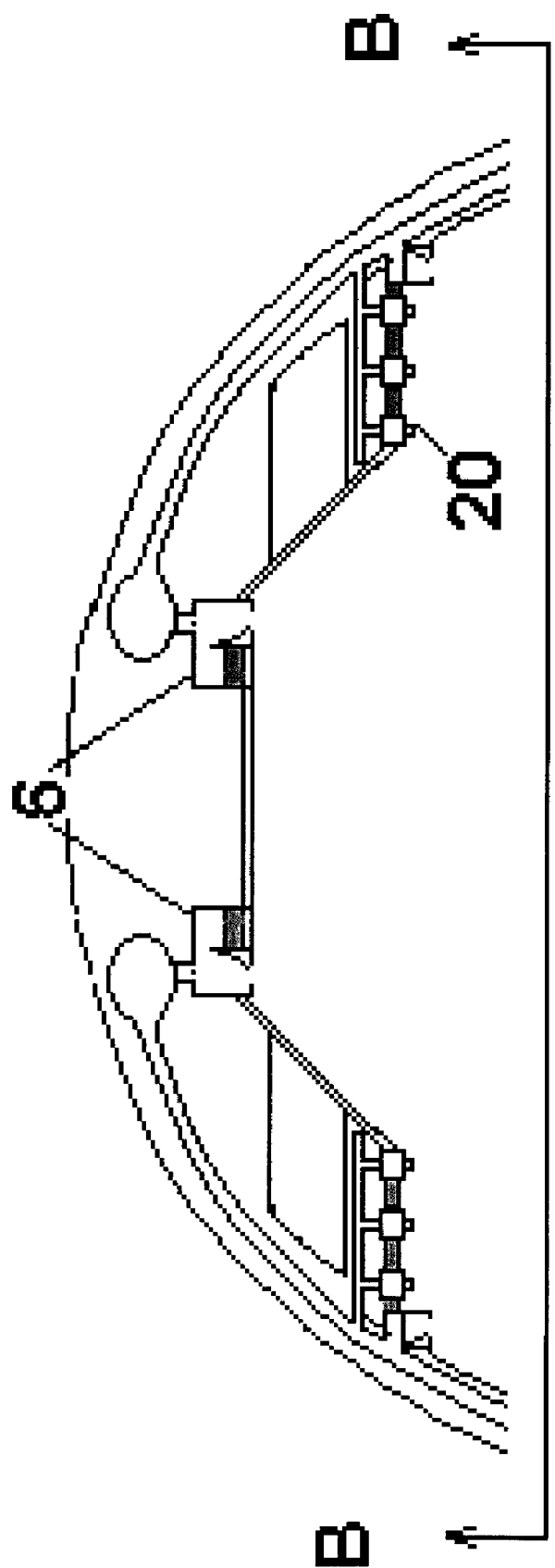
FIG. 10A is a cross-sectional schematic view of the third embodiment installed within an aircraft cabin in a third configuration.

FIG. 9B also illustrates a further optional feature, wherein a similar ejector diffuser system 6 may be provided along each side of the aircraft within the cabin wall, at foot level replacing the standard floor diffusers, and the overhead diffuser system consists of two separate slot ejector diffusers replacing the standard diffusers. This floor ejector diffuser is intended for installation within aircraft that include foot-level air ducts, for example certain Bombardier aircraft. In this aspect, the system is positioned generally horizontally rather than the downwardly-facing vertical orientation described above. The existing air supply duct 24 feeds pressurised ventilation air into an entrainment housing 42 in the same fashion as the central overhead system, except that the foot-level housings project the airflow in a horizontal direction, into the cabin interior from the side walls of the cabin at passenger foot level. Positioned adjacent to each entrainment housing is an air entrainment grille 98 to receive ambient cabin air, with the slot being covered by a filter 74 or other air treatment means. The intake grille 98 communicates with the entrainment housing 42, such that air passing through the intake grille is entrained within ventilation air exiting the entrainment housing, in a similar fashion as the overhead system described above. In FIG. 9B, there is shown the existing air supply ducts 24 below the floor which supply the foot-level diffusers. A conventional wall wash diffuser 39 is also illustrated in this figure. This diffuser also may comprise an ejector entraining and filtering diffuser. FIG. 10A illustrates a close up of the entrainment devices in FIG. 9B. Both ceiling diffusers are fitted with entrainment devices 6, as are the gaspers 20. The gaspers 20 include entrainment devices as described in PCT application PCT/CA2007/000889. FIG. 10B illustrates the ejector gaspers surrounded by their individual filters 56 and the ejector diffuser filters 74 running parallel to the slot outlets.

Figure 11A:
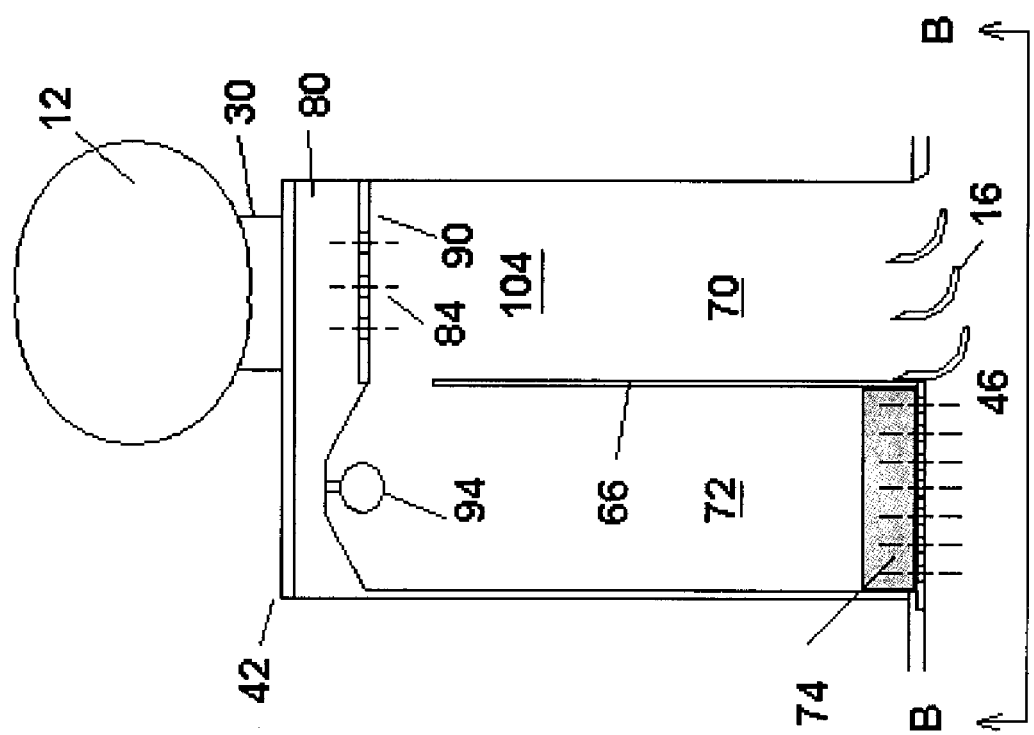
FIG. 11A is a cross-sectional schematic view of a fourth embodiment of a diffuser according to the invention.

FIGS. 11A and 11B illustrate a further embodiment of the entrainment housing 42. FIG. 11A is cross section view and FIG. 11B is a bottom view of the ejector diffuser. In this version, to optimize entrainment rate in a parallelepiped chamber at ratio of height to width of about 8 is provided, although ratios of less than this are also contemplated in this aspect. Also provided in this embodiment are multiple nozzle jets 84 which are believed to provide improved entrainment. The entrainment housing comprises upper and lower compartments 80 and 104 divided by a substantially horizontal floor 82. The upper compartment comprises a plenum which receives pressurized air from the main air duct 12, through multiple takeoff ducts 30. This incoming ventilation air exits the plenum 80 through multiple openings 84 within the floor 82. The openings 84 direct pressurised primary air flow streams into the lower compartment 104. The openings 84 are all located along one lateral side of the plenum. The lower compartment 104 is subdivided into two communicating regions extending lengthwise along the plenum, divided by an upstanding barrier 66. A first region 70 comprises an entrainment and mixing subcompartment, and the primary air flow exiting the plenum through the openings passes directly into this region. The second region forms an ambient air entrainment and filtration subcompartment 72, with ambient cabin air entering into this region, for subsequent entrainment within the primary air flow. An optional supplement air treatment means such as a UV lamp 94 or other air purifier may be provided within the second region. Optionally, directional vanes 16 are provided at the base of the mixing subcompartment, for directing air flow partially laterally as it exits the housing 42 through the slot 46.

FIGS. 12A and 12B, cross section and plan views, respectively, illustrate a variation on the embodiment of FIGS. 11A and 11B, in which the housing walls 48 angle inwardly and upwardly, such that the housing a cross-sectional configuration resembling a truncated pyramid. The barrier 66 is angled so as to be generally parallel to the adjacent housing wall such that the entrainment region has a parallelogram configuration in section. The mixing region thus has a relatively broad base to increase the cross-section area of the open slot 46 for outflow of the combined primary and entrained ambient air streams. This shape is believed to increase entrainment rate for short mixing chambers and reduce exit velocity from the mixing chamber.

Figure 13:
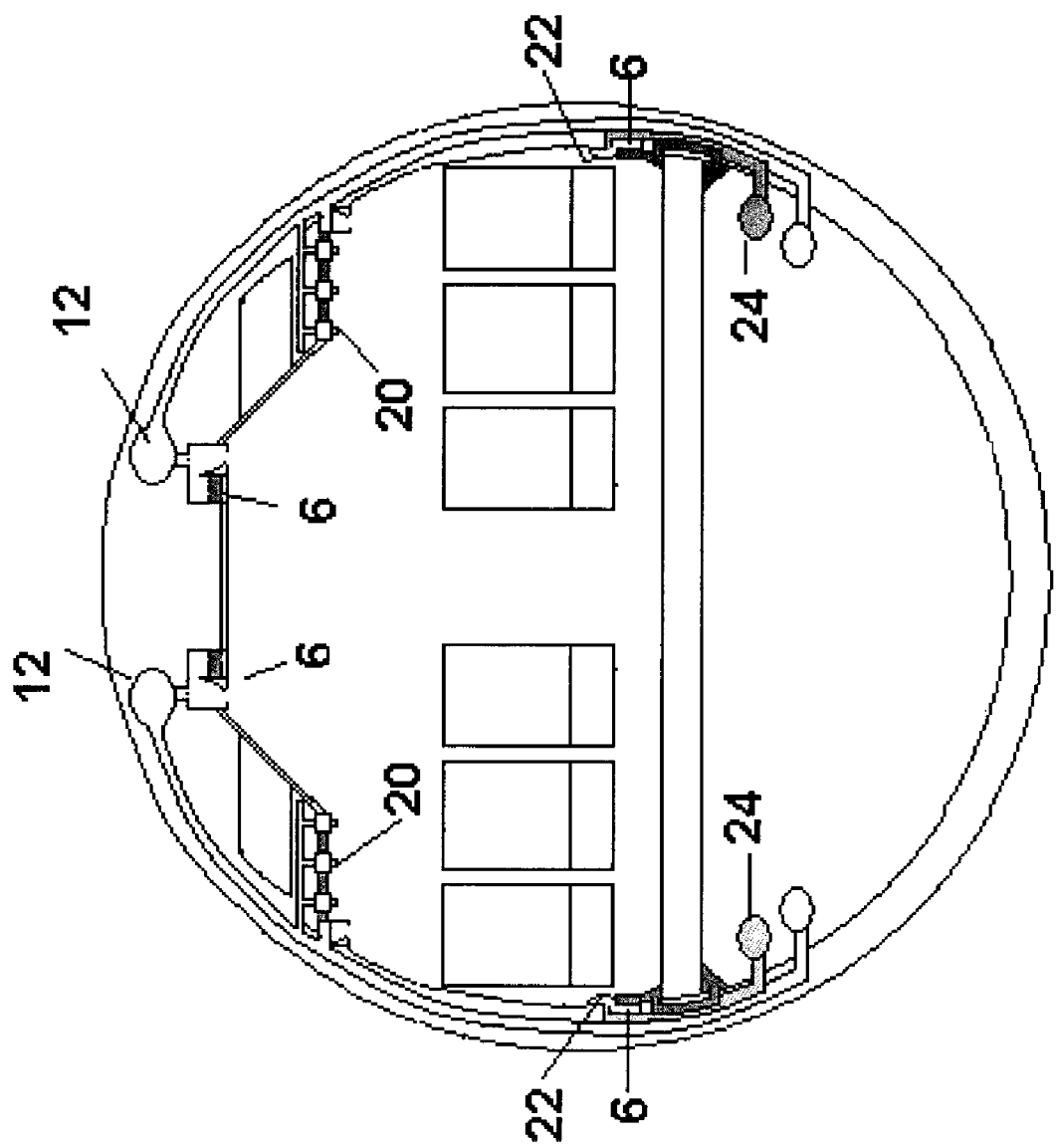
FIG. 13 is a cross-sectional schematic view of the fifth embodiment installed within an aircraft cabin in a first configuration.
Figure 14:
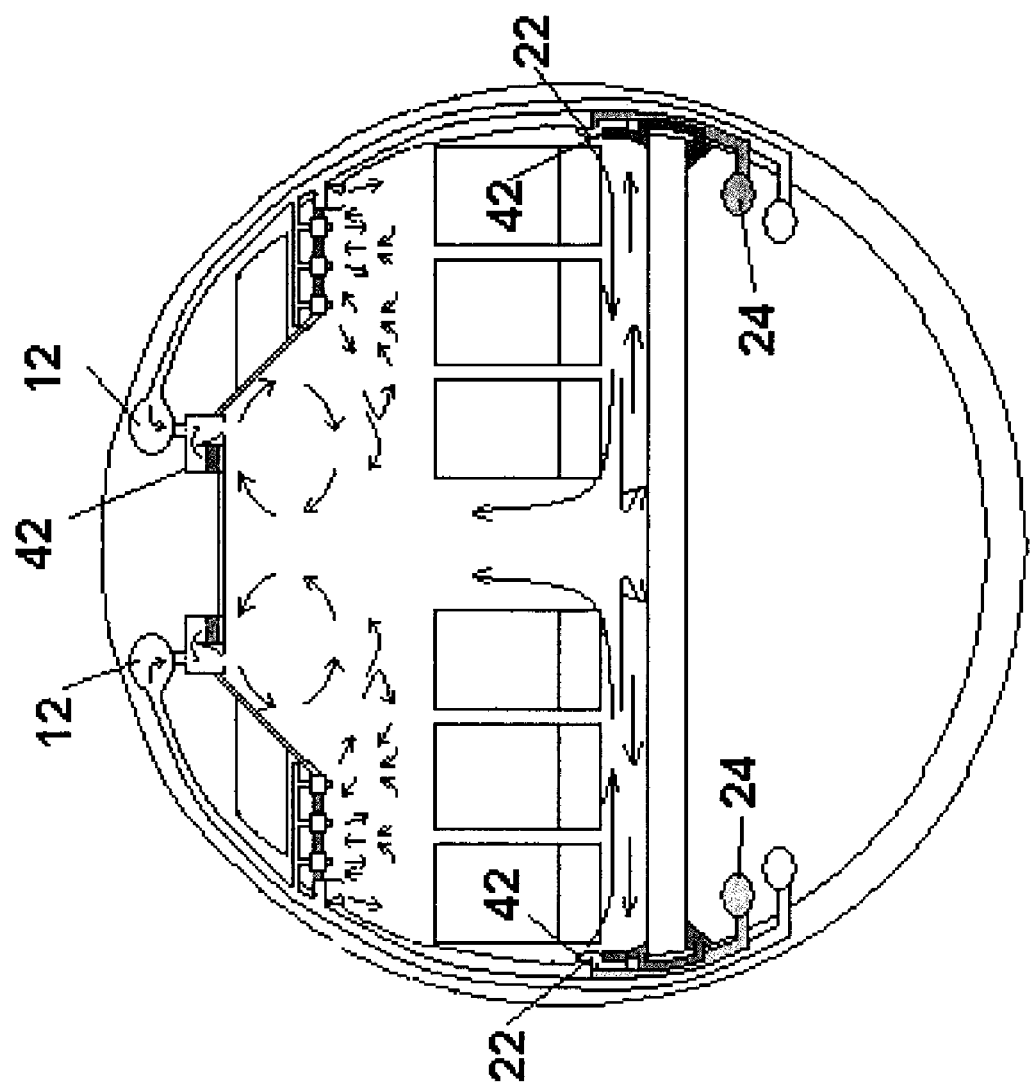
FIG. 14 is a cross-sectional schematic view of the fifth embodiment installed within an aircraft cabin in a first configuration showing approximate airflow patterns.

FIGS. 13, 14 and 15 illustrate an embodiment in which a pair of ejector diffusers 6 is provided on the ceiling adjacent to the stowage bins along opposing sides of an aircraft cabin in place of the standard diffuser there. A second set of similar entrainment diffusers is also provided in place of the standard floor vents, these diffusers 6 may comprise any of the above versions, but illustrated herein is a single diffuser similar to FIG. 11. Existing dual supply ducts 12 and 24 are used, each of which supplies one of the ejector diffusers. FIG. 14 illustrates what is believed to be a typical airflow pattern generated by operation of this system.

Figure 15A:
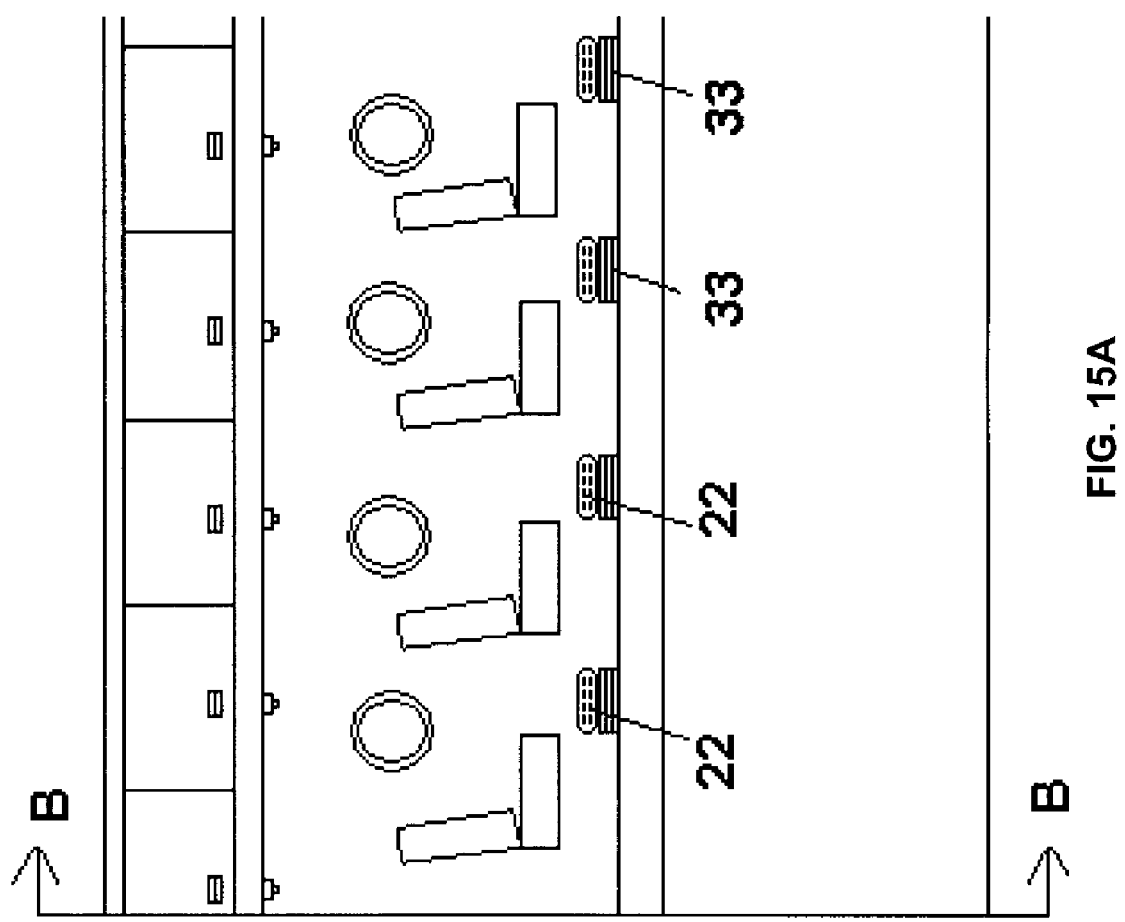
FIG. 15A is a side-sectional schematic view of a sixth embodiment installed within an aircraft cabin showing foot-level diffusers.
Figure 15B:
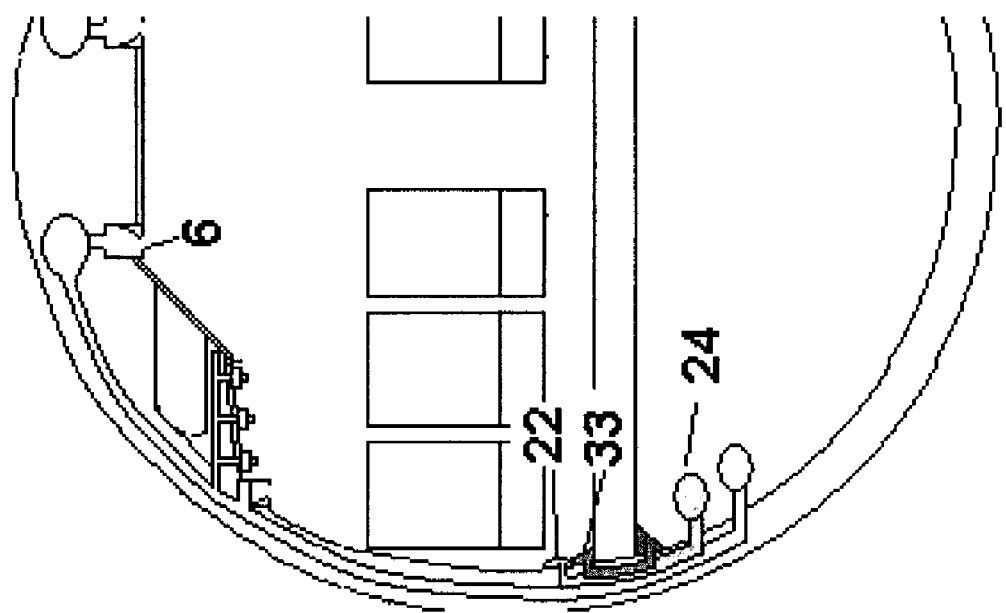
FIG. 15B is a cross-sectional view along line B-B of FIG. 15A.

FIGS. 15A and 15B, wall and cabin cross section views, respectively, are schematic views showing the existing floor-level vents 22, and the existing cabin air outlet grilles 33 when seen from a side elevation. It will be seen that ejector diffusers may be provided in place of the vents at each seat.

Figure 16A:
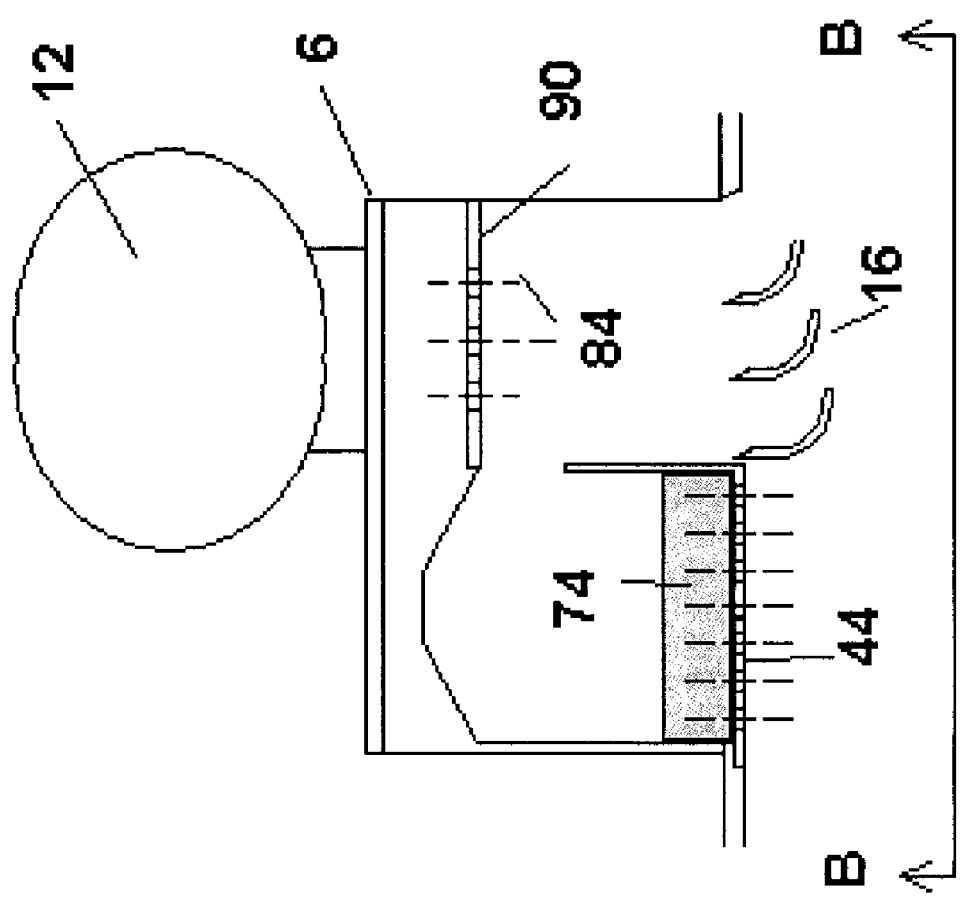
FIG. 16A is a cross-sectional schematic view of a seventh embodiment of a diffuser according to the invention.
Figure 16B:
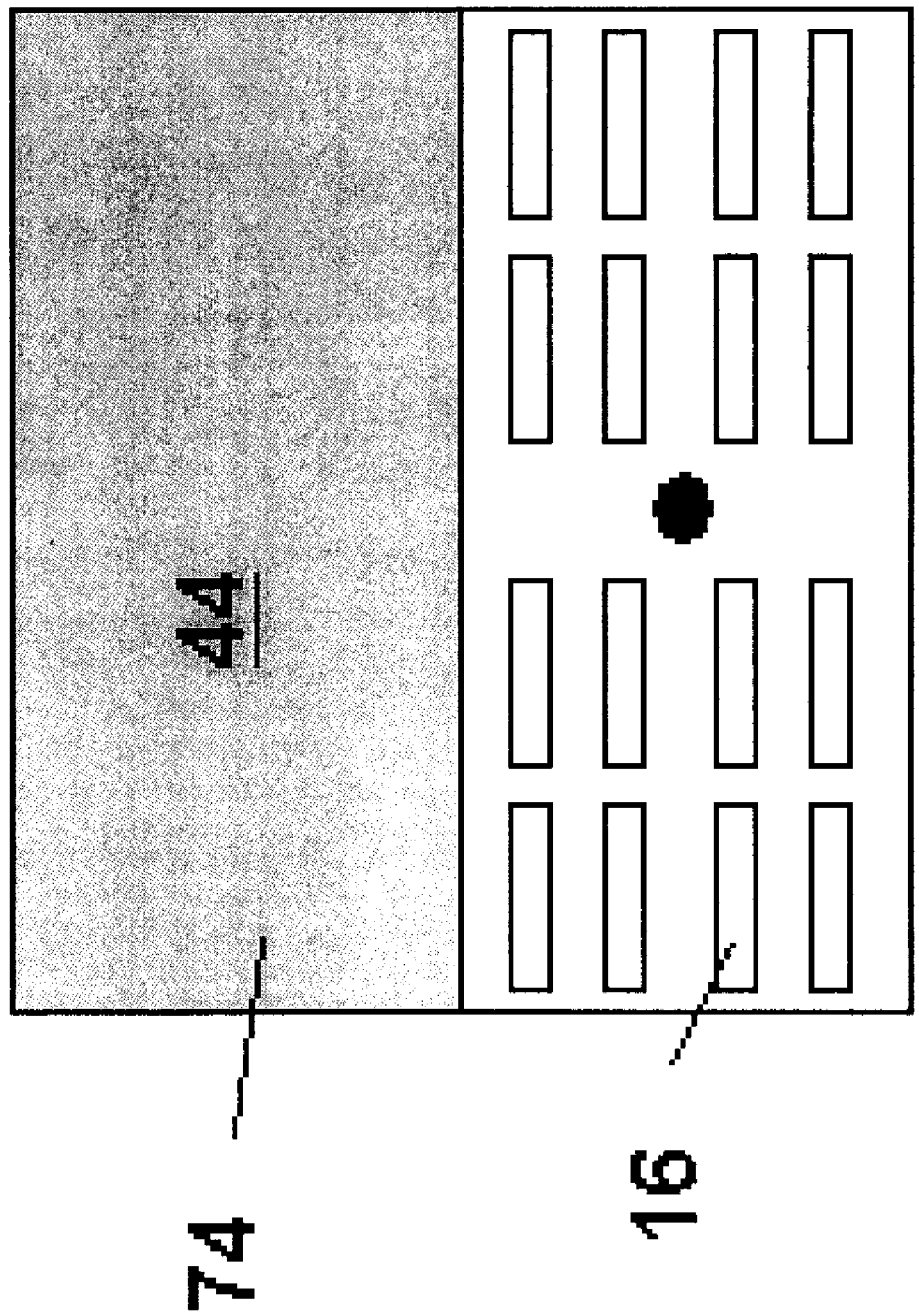
FIG. 16B is a plan view along line B-B of FIG. 16A.

FIGS. 16a and 16b, cross section and plan views, respectively, illustrate an embodiment of a rectangular ejector diffuser 6 intended for a floor vent system, of the type shown in FIG. 15. FIG. 16a is illustrated in a vertical orientation, for comparison with similar systems described and illustrated above. In this version, the components are substantially as shown in FIG. 11. However, in this version the optional purifier is omitted and the housing may have a relatively lower height (or shallower depth when oriented horizontally) to better fit within the confines of a cabin wall. To enable better entrainment for a short mixing chamber, the number of nozzle jets 84 can be increased.

Figure 17A:
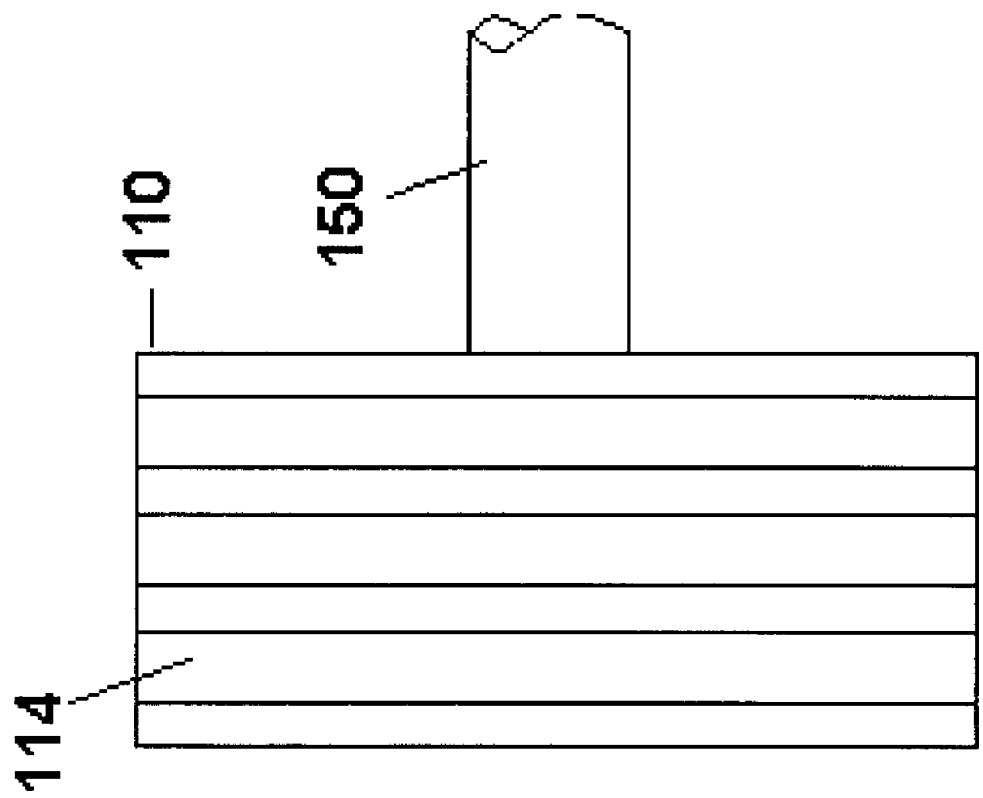
Figure 17C:
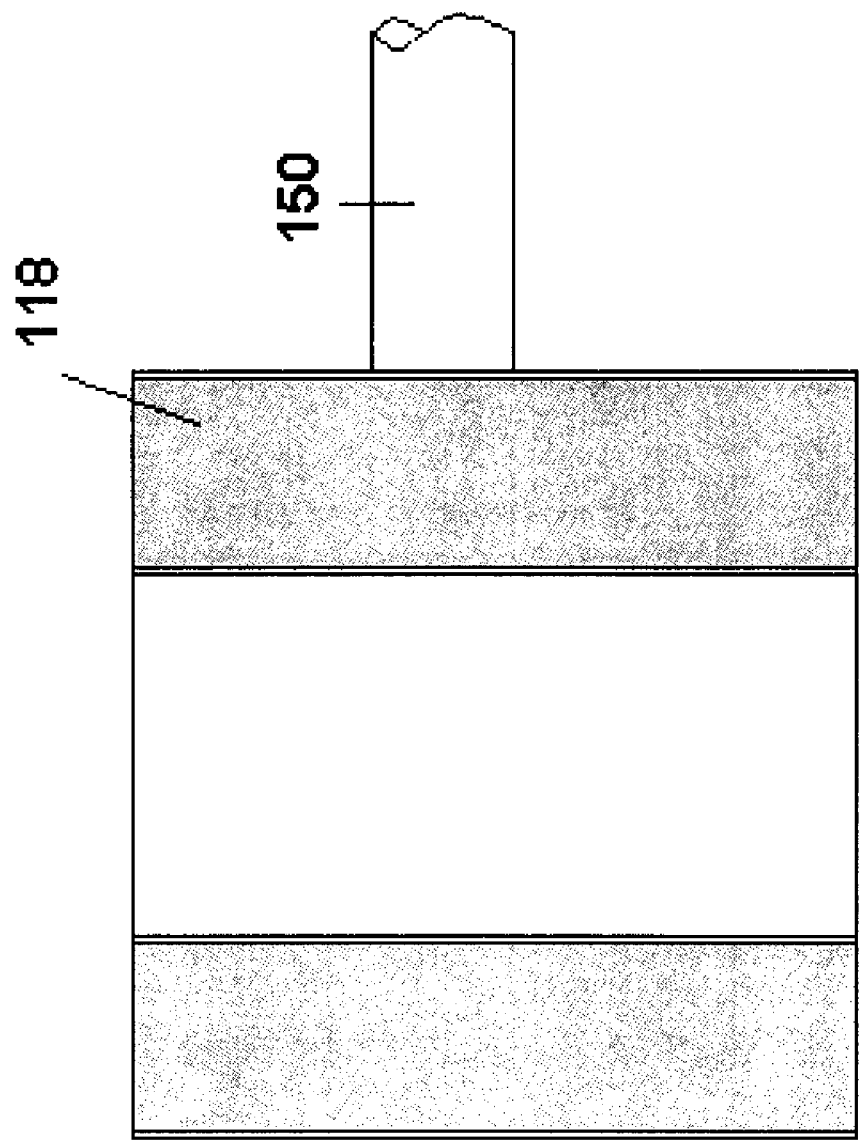
FIGS. 17C and 17D are schematic plan and cross sectional views of a diffuser for a building according to an eighth embodiment of the invention.
Figure 17D:
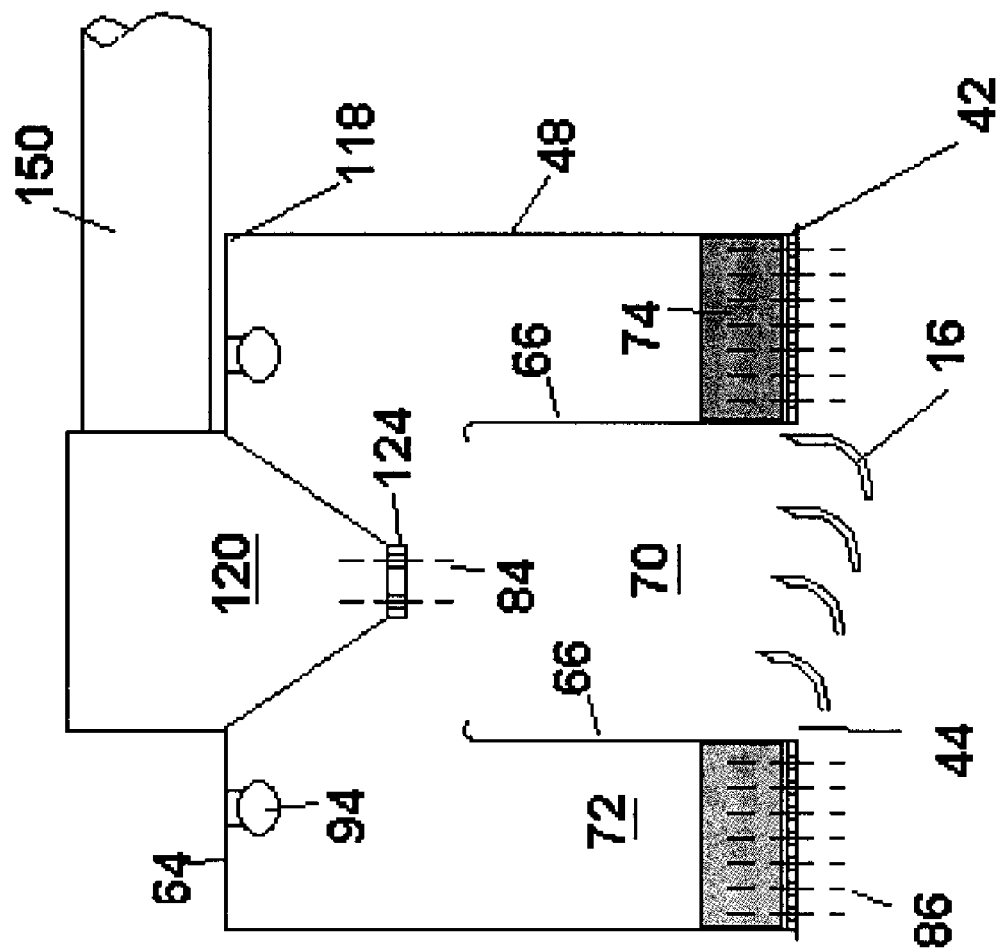

FIGS. 17A through 17D illustrates a further embodiment, intended for use in a ventilation system for a building or other permanent structure which includes a ducted ventilation system for delivery of ventilation air. FIGS. 17A and 17B illustrate a prior art diffuser 110, comprising an air duct 150 for a supply of ventilation air, and a generally vertically oriented plenum 112, which receives air from the duct 150, discharging same through slots 114 in the floor of the plenum 112. Flow diverters such as vanes 16 impart a horizontal vector to the air exiting the slots. FIGS. 17C and 17D illustrate an embodiment of an ejector diffuser 118 according to the present invention, in which air enters through a duct 150, and enters into an elongate plenum 120, the lower region of which is generally hopper-shaped. The lower end of the plenum terminates in an end cap 124 containing multiple openings 84, for directing multiple relatively high velocity primary air streams downwardly from the plenum. The plenum 120 communicates with a housing 42, which comprises side walls 48, a top 64 and a base 44. The plenum protrudes downwardly into the interior of the entrainment housing, extending through the upper wall.

The entrainment housing is subdivided into three communicating internal regions, by spaced apart internal barriers 66. The plenum 120 is centrally disposed in the housing 42, such that air exiting the openings 84 directly enters into the central region 70 of the housing 42 which comprises a mixing subcompartment. As the discharged air travels downwardly, it effectively entrains and then mixes with ambient air from the interior of the housing 42. Ambient air enters the interior of the housing 42, through perforations 86 within the base 44 of the housing 42, at the side regions or subcompartments 72 thereof. Each of the side regions 72 includes a filter 74 and/or other treatment medium or media covering the base, such that air entering into these regions 72 passes through the filters and is treated. The combined air stream, consisting of entrained ambient air and the primary air stream, is directed downwardly through the central compartment 70, exiting through the open floor thereof. Optionally, adjustable or non-adjustable directional vanes 16 are provided for directing at least some of the air flow exiting the entrainment housing, in a lateral direction.

FIG. 17D also illustrates optional supplemental air purification means, such as UV lights 94 located within the interior of the entrainment housing, to provide additional air treatment.

FIGS. 18A and 18B illustrate a further embodiment of a building diffuser 118, showing a two slot ejector diffuser system. This embodiment is similar to that shown in FIG. 17. However, the central region includes a central rib 152a formed by two turning vanes, so as to divide the lower opening 44 thereof into a pair of spaced apart elongate slot outlets 46. The rib has a substantially triangular cross-sectional shape, for imparting a horizontal vector to the downward air flow.

FIGS. 19A and 19B illustrate a further embodiment, which is similar to FIG. 17. However, in place of an elongate diffuser, this embodiment relates to a rectangular diffuser system, in which the central region 70 which comprises the mixing subcompartment of the housing is rectangular when seen in plan view (FIG. 19A), and the lateral region comprising the filter subcompartment 72 fully surrounds the central region, as seen in particular in FIG. 19A. The barrier 66 comprises a structure which is rectangular in plan view, in order to divide the housing interior into the central rectangular region 70 which is fully encircled by the outer subcompartment 72. The ejector air flow is shown channelled in two opposing directions by the vanes. These vane directions are adjustable. UV lights 94 are shown mounted within the entrainment chambers to purify the incoming ambient air.

Figure 20A:
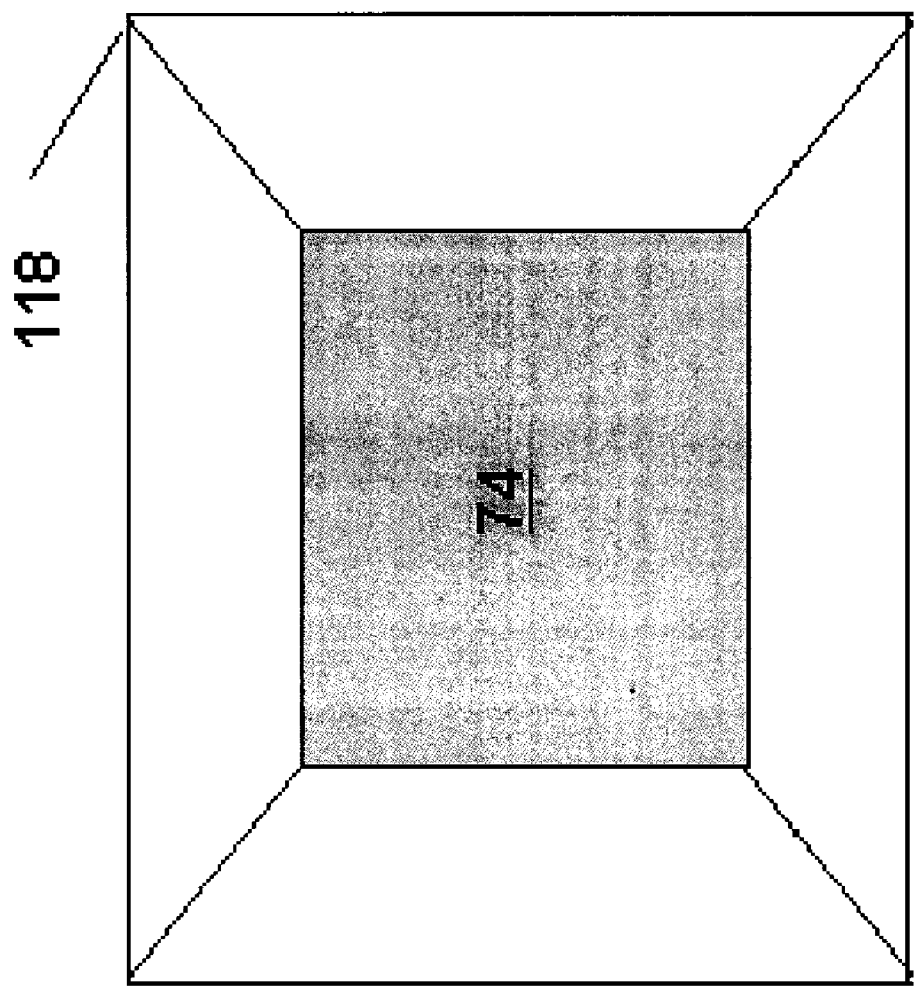

FIGS. 20A and 20B illustrate a further embodiment of an air treatment system 118 for a building. This embodiment relates to a rectangular ceiling diffuser, of a type similar to that shown in FIG. 19. In this version, entrainment of ambient air occurs within an exterior region of the housing while filtration occurs within a central region. The ventilation air duct enters into a substantially pyramid-shaped louvered housing 42, the walls of which optionally flare outwardly, as shown in FIG. 20B. The housing includes an internal barrier 66 spaced apart from and extending fully around the outer wall. The barrier effectively divides the interior of the housing into a central region which is rectangular in plan view and a fully surrounding external region which communicates with the central region. The barrier leaves an upper gap 68 between the barrier and the other housing components to permit the internal and external regions to communicate to permit air flow therebetween. A central baffle 130 is provided in the air flow of the incoming air duct, with the baffle being substantially cone-shaped so as to direct the air flow outwardly towards the outside region. It will be seen that the baffle 130 is sufficiently wide to effectively channel substantially the entire primary air stream into the external region. The barrier 66 extends upwardly towards the baffle 130, but does not contact it so as to permit air to pass between the internal and external regions. As the air flows past the gap 68, a suction effect is produced within the entrainment section 72. This suction or lower pressure entrains ambient air drawing it through the filter 74 as illustrated by the arrows in FIG. 20B.

The combined air flows, consisting of the primary ventilation air and the secondary entrained ambient air, then flow generally downwardly through the outside compartment 70, where it is believed they mix together, and exit the open base 44 thereof, which comprises a rectangular louver-like structure as shown in FIG. 20A. The floor of the inner region is perforated, and is covered by a filter, in the manner described above such that incoming ambient air drawn upwardly into this compartment passes through the filter for treatment. It will be seen that although this and the previous embodiments are shown as being generally rectangular, other geometric configurations may be provided, such as oval or circular, by way of example.

Figure 21:
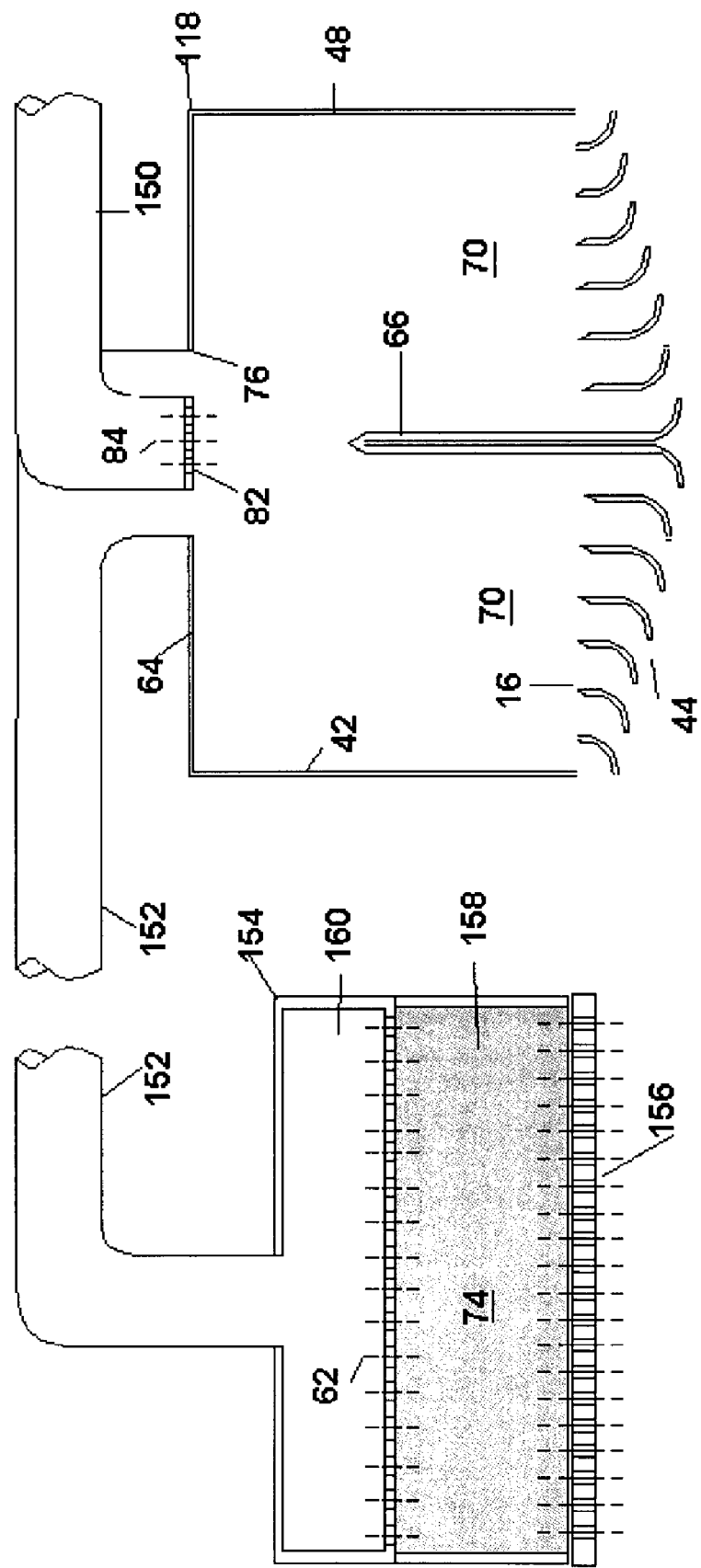
FIG. 21 is a schematic cross sectional view of a diffuser for a building according to a twelfth embodiment of the invention.

A further embodiment of a square louver ejector diffuser apparatus 118 for use in a building is illustrated in FIG. 21, this time with a separated entrainment filter. This embodiment relates to a rectangular diffuser of the type which may be mounted in a ceiling or other surface. In this embodiment, ambient air may be drawn from a location remote from the diffuser. This embodiment has particular use in applications where contaminants may be generated at a location which is remote from the preferred diffuser location, for example in a conference room where human-generated contaminants may be concentrated around a conference table, or where a larger filter area is desirable for enhanced filtration and entrainment performance, while the preferred location for a diffuser may be at a different location. In this embodiment, a diffuser comprises a housing 42 having side walls, a top 64, and an open base 44. An internal barrier 66 divides the interior of the housing into two regions, in which air flow between the regions is permitted, but is partially obstructed by the barrier 66. A primary stream of supply air enters the housing 42, via a supply air duct 150 mounted to the top 64 of the housing 42 and communicating with the interior of the housing through an opening 76. The supply air duct is partially obstructed by a disk 82, having multiple jets or openings 84 to direct multiple high velocity air streams downwardly into the housing interior. The primary air flow from the supply duct is generally evenly distributed between the two regions, and flows downwardly through the chamber. Ambient air is entrained within these multiple air streams. It is believed that entrainment occurs at the boundaries of the multiple streams of supply air, while mixing of the combined streams occurs further downstream within the interior of the divided regions. The combined air flow, containing supply air and ambient air, exits the chamber through the open base 44. Directional vanes 16 at the housing base provide a horizontal vector to the exiting air flow.

Ambient air enters the housing through an ambient air duct 152, the intake end of which communicates with a remote entrainment/filter compartment 154, the location of which when installed in a building is a matter of design choice. The entrainment/filter compartment 154 is substantially enclosed, having a perforated wall 156 (conveniently, this may comprise the floor of the compartment 154, in the case of a ceiling-mounted compartment). The compartment 154 includes two internal sub-compartments, a lower compartment 158 containing a filter medium 74 through which the incoming ambient air passes, and an upper compartment 160 in fluid communication with the lower compartment through openings 62. The ambient air duct 152 communicates with the upper compartment 160. It will be seen that any convenient filter medium 74 or other air treatment means may be provided within the entrainment/filter compartment, in order to provide a suitable air treatment.

Figure 22A:
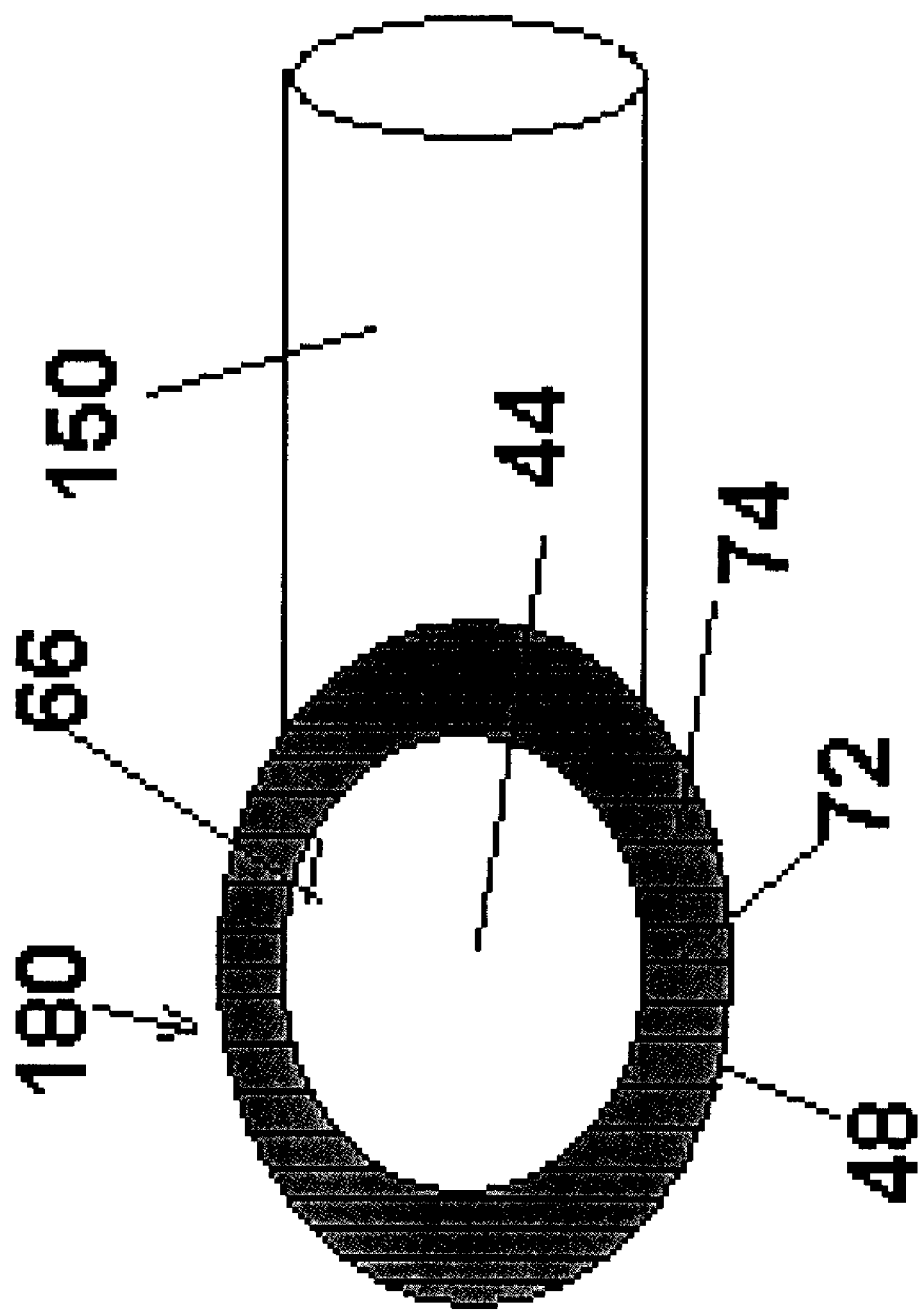
FIGS. 22A and 22B are schematic plan and cross sectional views of a diffuser for a building according to a thirteenth embodiment of the invention.
Figure 22B:
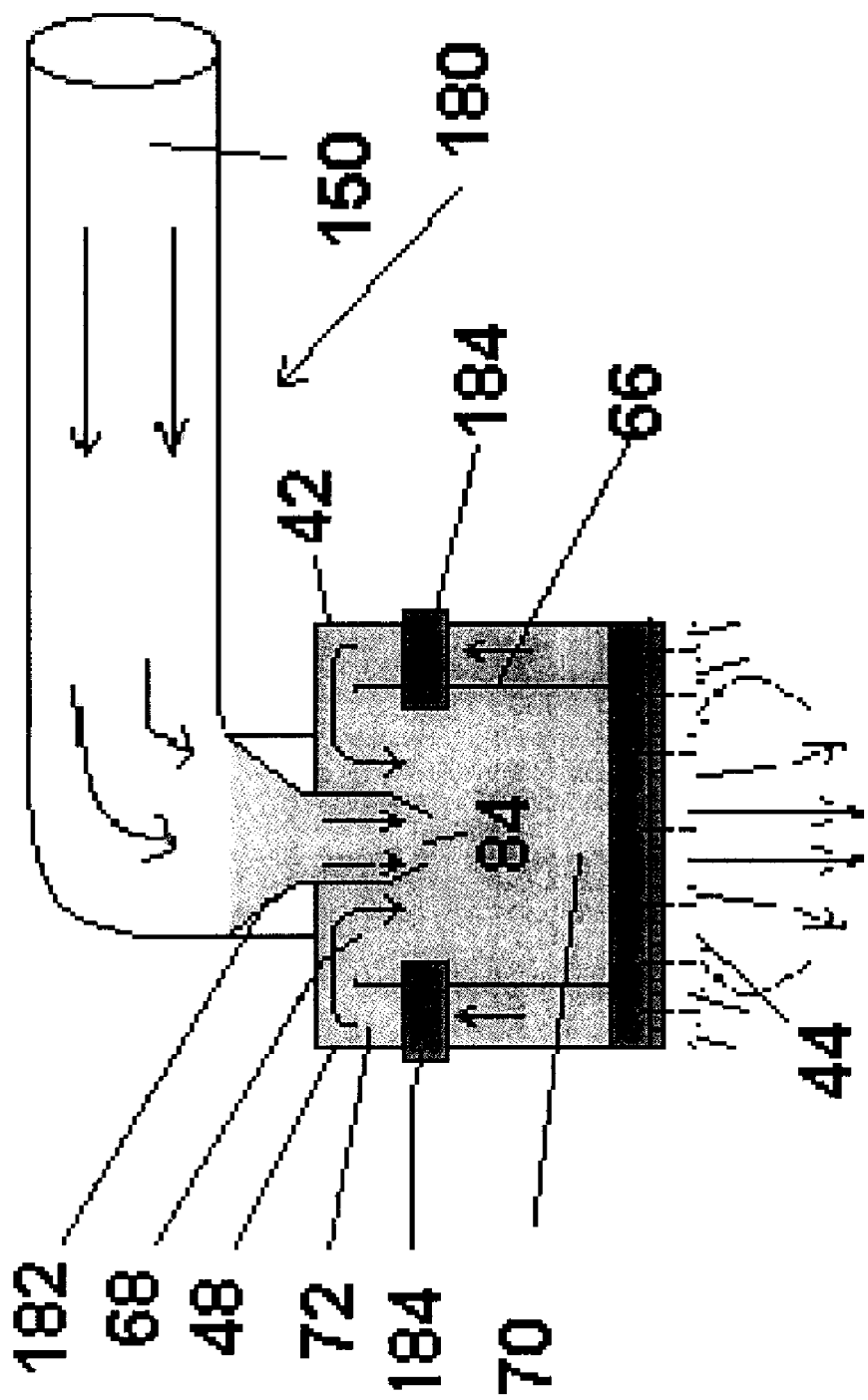

FIGS. 22A and 22B illustrate a further embodiment of the invention, suitable for application in a building or other structure. According to this embodiment, a generally cylindrical ejector diffuser 180 is provided, for mounting within a ceiling or other surface. The diffuser may have a circular or oval cross sectional shape, or any other convenient shape. An air inlet duct 150 enters the housing, to supply the primary air stream. The inlet duct terminates in a narrowed nozzle or jet 84, entering the upper wall of the housing at a generally central position. The base 44 of the housing 42 is open or substantially open, to permit discharge of air into the building interior. The housing includes a cylindrical or generally cylindrical outer wall 48, and an inner barrier 66 spaced apart therefrom so as to provide a central cavity or subcompartment 70 surrounded by an annular cavity or subcompartment 72 within the housing interior. The base of the annular cavity is open to permit the intake of ambient air. A primary filter 74 is mounted at or near the base, such that ambient air drawn into the annular cavity 72 passes through the primary filter 74. A secondary air treatment means 184 is mounted within the annular cavity, which may consist of a second filter or other air treatment means, such that air travelling upwardly through the cavity passes through the secondary treatment. The barrier 66 terminates before contacting the upper wall of the housing, thereby leaving a gap 68 at the upper end of the annular cavity 72 open to the central subcompartment 70 so as to permit air flowing upwardly through the annular cavity to pass into the subcompartment 70. In operation, a primary air stream discharged through the primary air duct is jetted into the central portion of the housing, through the nozzle 182, in a downward direction towards the open bottom of the housing 42. As the primary air flow passes through the housing interior, ambient air is entrained in the primary flow, in the same manner as described above. The combined air flow, consisting of the primary air flow and entrained ambient air, is believed to undergo mixing as it passes through the central subcompartment 70 and then exits through the open base 44. The depressurization of the entrainment section by the high velocity air stream passage entrains ambient air through the annular cavity and through the treatment means described above.

Figure 23B:
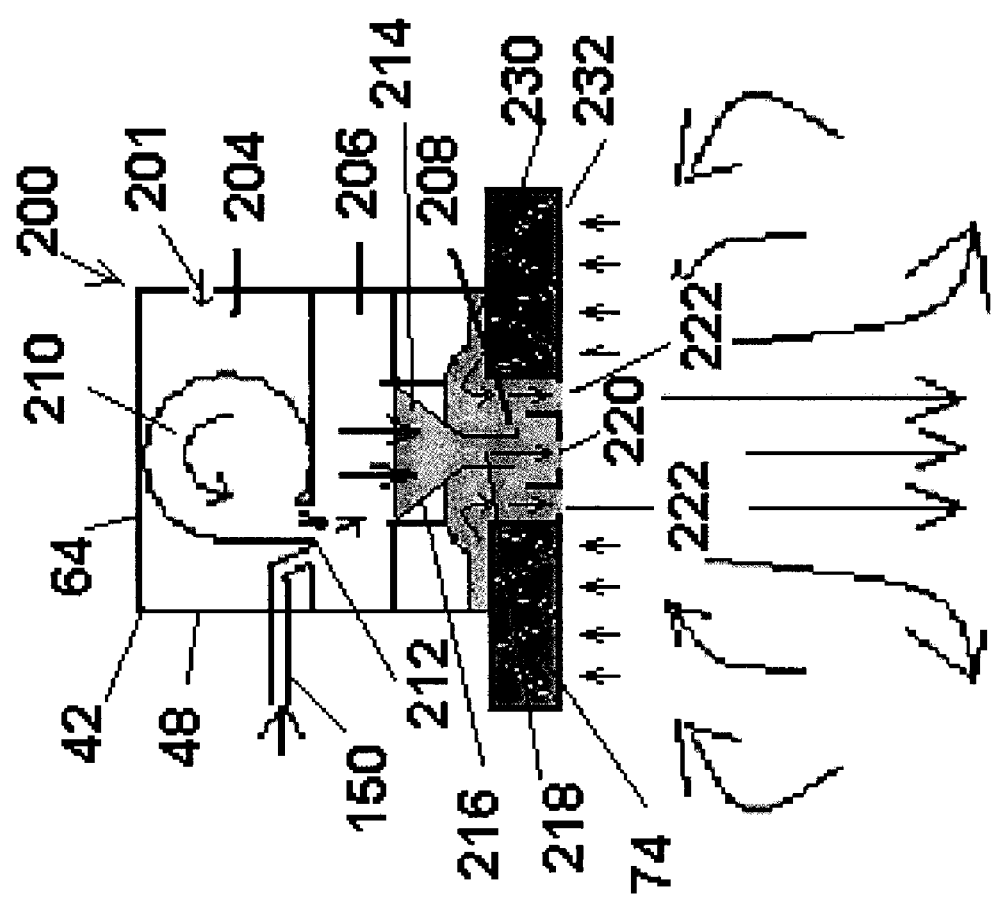

FIGS. 23A and 23B illustrate a further embodiment of the invention. This embodiment comprises a slot diffuser 200, for generating an air curtain, of the type typically used in commercial establishments such as retail stores, warehouses and other such facilities. This embodiment is believed to be useful in that it may improve air curtain performance so as to reduce air movement between spaces, and it may capture insects that might otherwise pass through the barrier. The device provides a sheet-like downwardly directed air stream, from a source of air such as an HVAC system which provides a pressurized primary air flow. The diffuser has its own blower to create the air curtain and optionally receives pressurized air from a source and combines that air flow with ambient air drawn in by the blower for a combined discharge from a slot. The primary air flow is provided by a blower 210, possibly supplemented by a secondary pressurized air supply through air duct 150. An elongate housing 42 is provided, which may be mounted within the ceiling or other building surface. The housing comprises side walls 48 and a top 64, defining an interior space. The housing is divided horizontally into internal sub-compartments, comprising an upper blower compartment 204, an intermediate sub-compartment comprising a plenum 206, and a lower entrainment and mixing compartment 208. The incoming primary air stream enters the blower compartment 204 through one or more primary inlet ducts 150 and one or more openings 201 through the side wall 48. A blower 210 pressurizes the primary air stream and sends it into the plenum 206 through an opening 212 within the base of the blower compartment. Within the plenum and extending downwardly from its base is an elongate hopper-shaped discharge slot 214, which directs pressurized air downwardly from the plenum 206, into the entrainment and mixing compartment 208 beneath the plenum. The hopper 214 comprises inwardly tapering upper walls 216, which meet with a parallel slotted discharge region 218, which funnels a relatively high speed air flow downwardly through the lower entrainment and mixing compartment.

The entrainment and mixing compartment 208 includes multiple elongate channels extending along the length of the housing 42, comprising a middle channel 220 directly beneath the open lower end of the hopper 214 and side channels 222 on either side of the middle channel. Alternately there could be one slot outlet only. Air exiting the hopper 214 may flow primarily through the middle channel 220. The lower end of the hopper is spaced apart from the channel 220, so as to promote entrainment and mixing of ambient air, in the manner described above. That is, a high speed primary stream of air exiting the discharge end of the hopper entrains and mixes ambient air before it exits through the open base of the middle channel. The entrained ambient air, combined with the primary air flow, exits the middle slot, with additional ambient air being downwardly drawn by the high speed air flow, this additional air flow exiting the opposing lateral side slots 222.

The negative pressure created by the high velocity jet entrains ambient air within the entrainment and mixing compartment 208. Outside air is drawn in through a pair of entrainment/filter compartment 230 at the base of the housing 42, which includes openings 232 therein so as to permit outside air to flow through the entrainment/filter compartment 230, and subsequently into the interior of the entrainment and mixing compartment 208. The entrainment/filter compartments 230 are provided internally with a filter medium 74, or other air treatment means, in a manner known to the art.

The diffuser 200 may be mounted at an overhead location where it is desired to provide an air curtain, with the slot facing generally downwardly. Alternative orientations are also contemplated.

Figure 24:
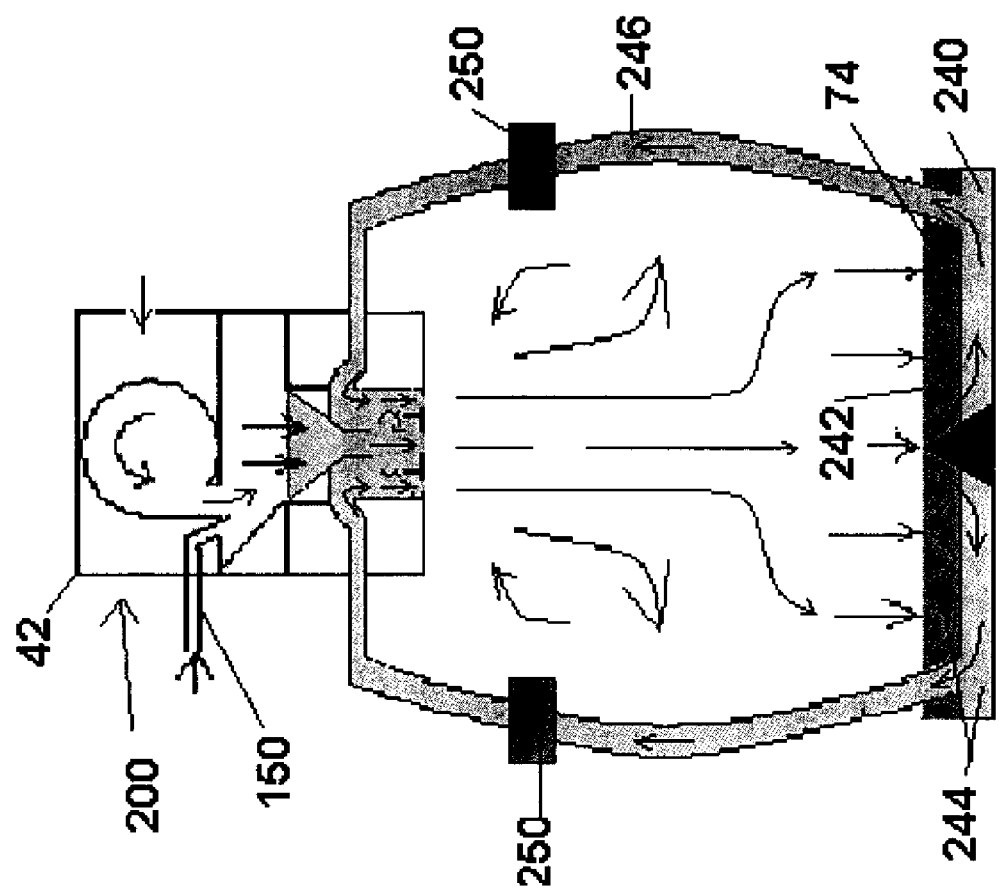
FIG. 24 is a schematic cross sectional view of an air curtain system according to the fourteenth embodiment of the invention.

A further embodiment is illustrated in FIG. 24, which comprises an air curtain system. The air curtain system comprises a slot diffuser 200 as generally as described above in connection with FIGS. 23A and 23B. Ambient air enters the entrainment housing 42 directly through openings and via dedicated ducting 150. In this version, the diffuser 200 is located in a ceiling of a structure, with the curtain air flow being directed downwardly towards the floor of the structure, for example an entryway of a commercial building. The spent airflow from the curtain reaches the floor of the structure and is drawn into a lower plenum 240. The lower plenum has a top 242, flush-mounted with the floor of the structure, which comprises a grating or other flooring which permits an air flow to pass therethrough. The downwardly directed air passes through the grate 242, and passes through a primary filter 74 to carry out an initial filtration of the downward air flow. This trapping of contaminants at the base of the air curtain may assist in capturing air contaminants emitted from the person of those who walk through the air curtain. This latter is useful for chemical trapping and analysis in airport security screening for terrorists. This system might also be useful for prevent flying insect entry into aircraft cargo bays during loading and unloading. After passing through the filter, housed within an entrainment/filter compartment 244, the air enters into the lower plenum 240. One or more entrainment air ducts 246 lead from the lower plenum 240 upwardly towards the air diffuser system 200, optionally passing through a secondary air treatment means 250, which may be the same or different as the primary air treatment means. The entrainment air ducts then enter the entrainment chamber of the discharge unit, which otherwise has the same or similar design as the embodiment of FIGS. 23A and B. Optionally, the spent air curtain may be chemically analyzed, for example when used in association with a security system for detection of explosive related or drug related chemicals.

Figure 25:
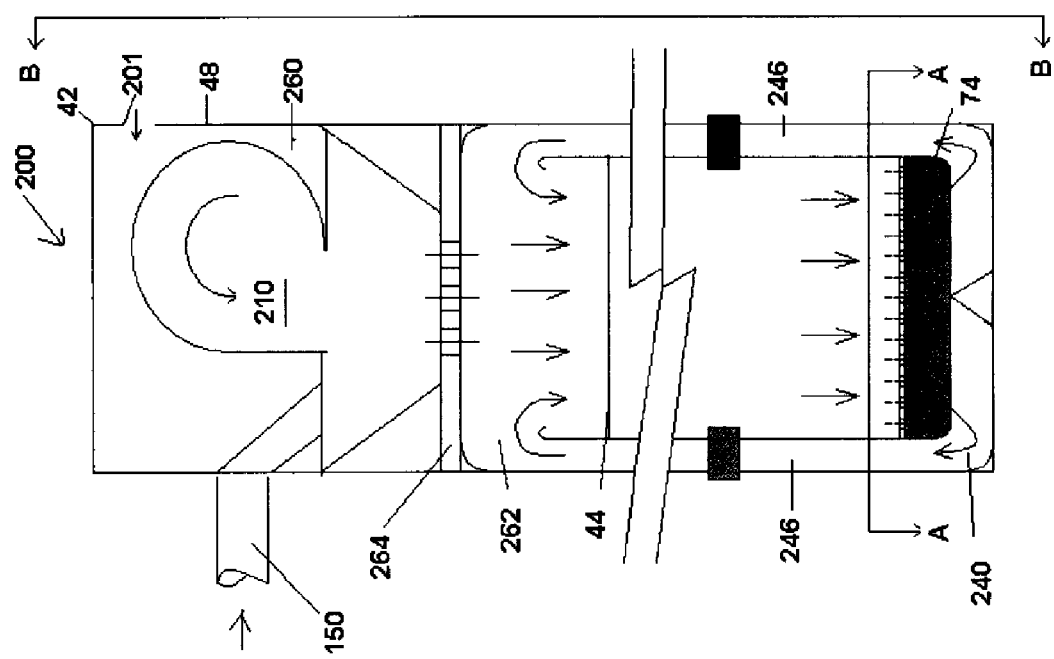
FIG. 25 is a schematic cross sectional view of an air curtain system according to the fifteenth embodiment of the invention.
Figure 25A:
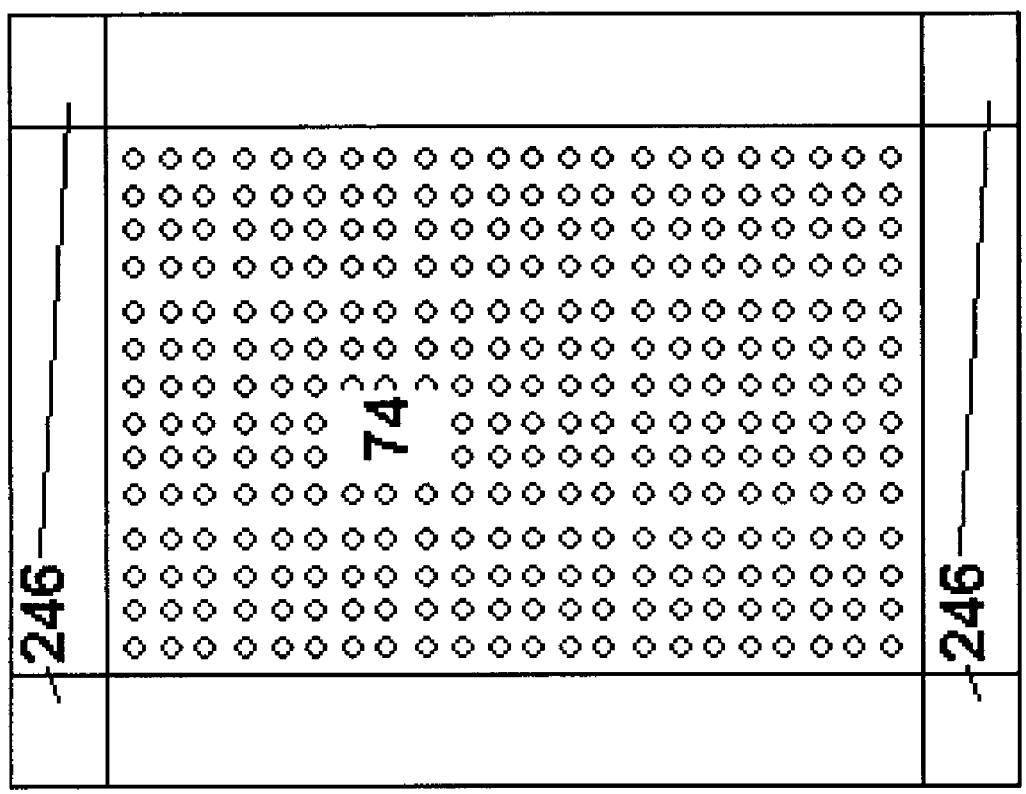
FIG. 25A is a plan view of a portion of the embodiment of FIG. 25, viewed from line A-A of FIG. 25.

FIG. 25 illustrates a similar embodiment to that described in FIGS. 24A and 24B for a diffuser 200 for an air curtain system. According to this embodiment, a housing 42 is provided which comprises two horizontally divided compartments consisting an upper blower compartment 260 and a lower entrainment/mixing compartment 262. A wall 264 separates the two compartments with an array of openings through the wall to permit multiple primary air streams to flow from the upper compartment into the lower compartment. Outside air enters the blower compartment via a duct 150 and openings 201 within the housing wall 48, and is further pressurized by the blower 210. Within the lower compartment 262, the downwardly directed streams of primary air entrain and then mix ambient air, with the combined streams then exiting the base 44 of the housing. As in the previous embodiment, the spent air is recycled via a lower plenum 240 and entrainment air ducts 246 which feed the ambient air back into the entrainment/mixing compartment. FIG. 25A shows the floor of the device where air curtain air is captured and recirculated with filter grille and filter 74 below arrangement, with riser ducts 246. FIG. 25B shows a side view of the assembly.

Figure 26A:
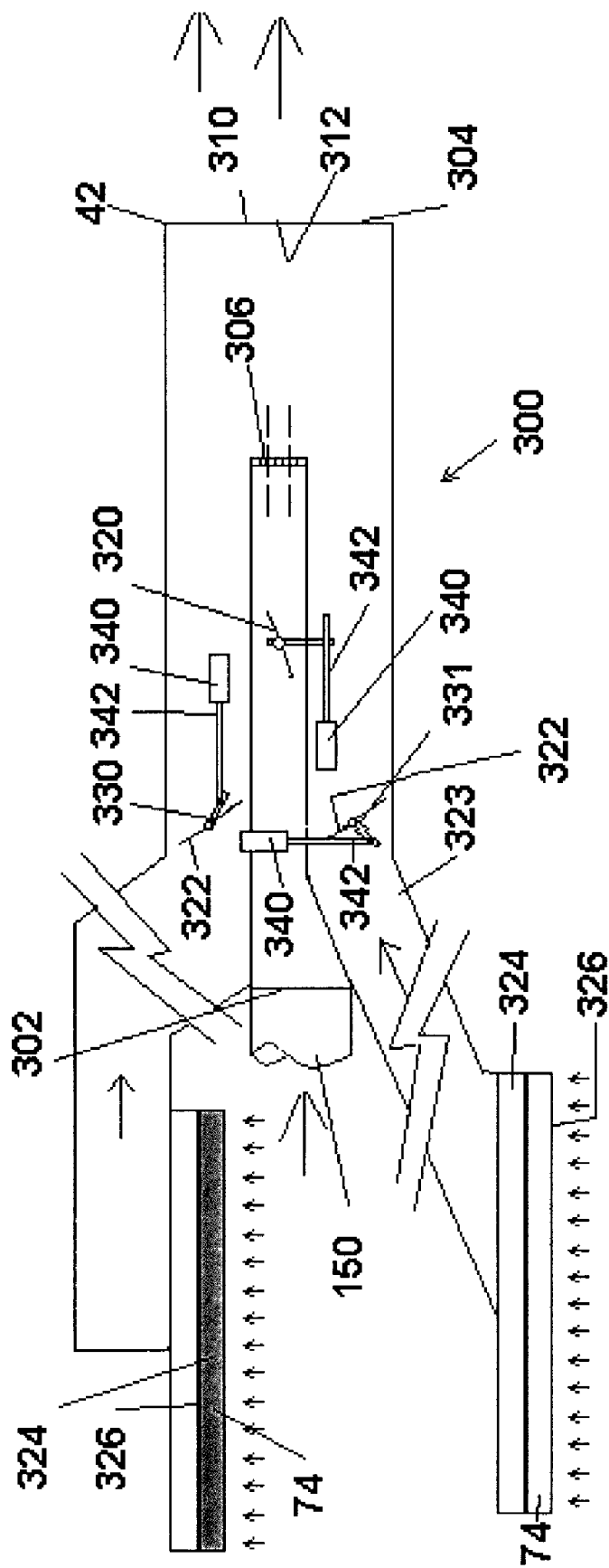

FIGS. 26A and 26B illustrate a further embodiment relating to a building ventilation system 300, comprising a variable air volume (VAV) ejector entrainment and filtration flow control box. In this device, ambient air is entrained and filtered using primary flow air from a remote source. The entrained air can be taken from the ceiling cavity or the room interior. The filters are sufficient size to facilitate entrainment at air supply pressures of 1"wc. The delivery pressure from the mix tube to ducting leading to outlet diffusers is sufficient to enable standard diffusers to operate normally. The primary air flow still reduces with load, which assists with energy savings, while entrained air, optionally filtered, can be increased so as to maintain a relatively constant filtered, cleaned and/or purified air supply to the building interior. This provides potentially improved air quality and greater circulation than the primary airflow alone. As well, the primary air may be supplied at a substantially higher temperature than the ambient room temperature for further energy savings. According to this embodiment, a housing 42 is provided with first and second opposing ends 302 and 310. The housing 42 is preferably elongate and may be cylindrical, rectangular or any other convenient shape. An inlet conduit 150 enters the housing 42 at the first end, the inlet conduit providing a primary airflow delivered under pressure. The inlet conduit terminates within the housing interior to deliver the primary airflow into the housing interior. The conduit terminates at a position spaced apart from the second end of the housing so as to provide a region for mixing and entrainment of ambient air. The conduit is capped with a multi-jet nozzle 306 to deliver multiple narrow airstreams into the housing interior.

An opening 312 at the second end of the housing mix tube permits discharge of the airflow via ducting branches leading to outlet diffusers. The mix tube may be parallelepiped in shape. It may also be a truncated cone or truncated pyramid in shape to minimize mix tube length while maintaining entrainment characteristics. The primary airflow through the inlet conduit is controlled by a motorized VAV damper 320. The damper 320 consists of a prior art motorized damper which is controlled in response to thermal demand and/or primary flow rate change.

The primary airflow entrains ambient air from the housing interior as it flows at relatively high velocity through the housing 42 after discharge from the nozzle 306. It is believed that at least some of the entrained air is also mixed into the primary airflow before entry into the discharge conduit. Additional ambient air enters the housing through an inlet 322, which opens to an ambient air conduit 323. The inlet is located on the housing wall 48 partway between the position of the nozzle and the second end. The ambient air conduit 323 is in fluid communication with an entrainment/filter compartment 324, which may be installed within the room at a position remote from the housing 42. The entrainment/filter compartment 324 includes openings 326 to admit ambient air and air treatment means to treat the air before passage into the conduit and housing. A preferred treatment is a filter 74, but this may be supplemented or replaced by any combination of purifiers, sorbants, or oxidizers.

The incoming ambient airflow is controlled by actuator driven entrainment dampers 330 and 331 responding to multiple space temperature demand. The entrainment dampers and VAV primary air damper are each driven independently by an actuator or other motorized mechanism and controlled in a coordinated fashion by a controller to optimize air quality and thermal comfort demands The dampers 320, 330 and 331 are independent from each other and are each separately actuated by a dedicated linear actuator 340, which is linked to the corresponding damper by a mechanical linkage 342. Each damper is controlled for independent movement in order to provide optimal control over operation of the unit. As such, the sources and quantities of each source of ambient ceiling cavity air and room air being introduced into the unit may be selected, as well as the overall flow rate and percentages of ambient air and primary airflow. If desired, dampers 331 and 330 can be linked electrically or mechanically so that as one increases the other decreases, for example.

The primary air can also be a constant volume source. In this case there is no damper on the primary air supply. The unit can operate in this case passively without dampers adjusting of the multiple entrainment flow source rates. Or the entrainment dampers can be motorized and flows from the multiple sources adjusted relatively one to another based upon room sensors of air quality, temperature, humidity or other parameters. The importance of the filters is that ceiling cavity can be entrained and supplied to the room after filtering without air quality problems occurring. This ceiling cavity air might be warmed by lighting units and be used for terminal reheat to allow higher flows of cooled primary air to go to the room which has no demand for cooling. Alternatively, if there is a demand for cooling in the room being served, then the ceiling cavity entrainment would be stopped.

Figure 27:
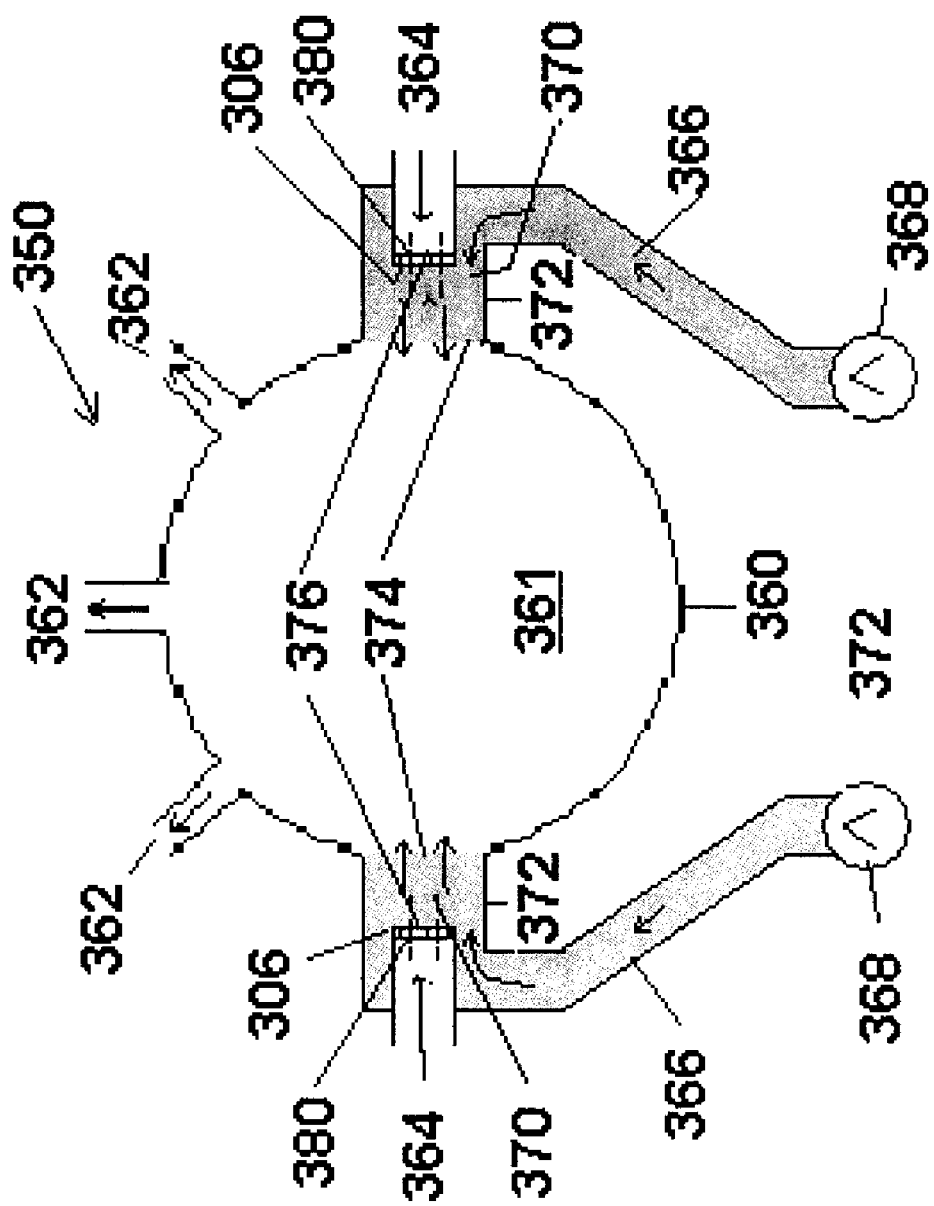
FIG. 27 is a schematic cross sectional view of an air recirculation apparatus according to a seventeenth embodiment of the invention.

A further embodiment is illustrated in FIG. 27. In this embodiment, a recirculation apparatus 350 is provided, to replace a conventional recirculation fan, for example for an aircraft passenger cabin. In this version, ambient cabin air is mixed with outside air for recirculation, preferably without the need for additional fans or blowers to draw in the ambient cabin air, except for one retained on standby as an emergency measure if both packs fail. In this embodiment, the existing mixed manifold 374 pressure must be met by the entrainment device. The mix manifold is typically pressurized relative to the cabin and multiple existing conduits 362 lead from the manifold 374 to various regions of the cabin to pressurize the cabin and to ventilate it by for example individual passenger gaspers, main cabin overhead and wall diffusers. Air is introduced into the manifold housing 360 from two sources. The first source is primary pressurized air stream from primary conduits 364 which may connect with an air conditioning pack or other source of pressurized outdoor air. The primary stream is pressurised by an external pressuriser such as an aircraft engine or compressor or fan, not shown. The second source of incoming air consists of cabin ambient air which is drawn by the ejector design shown. The ambient air is conducted through ambient air inlet conduits 366 to either inlet openings/filters 368 to admit ambient air, typically coming from the cargo bay where it is drawn from the cabin, all by the ejector entrainment depressurization. The location of the opening and whether there is filtration and other air cleaning devices installed here is a matter of design choice.

Typically there are two primary airstreams delivered from two air-conditioning packs. Each primary air stream is fitted with a nozzle 306 with one or more jet outlets. These jets of air enter the entrainment/mix chambers 370 at a relatively high velocity. Each chamber 370 consists of a housing wall 372. The chamber 370 is in fluid communication with the manifold 361 through an opening 374. The conduit 364 enters partway into the chamber 370 and terminates within the interior of the housing so as to direct a primary air stream into the chamber through a nozzle 376 at the end of the conduit 364. The nozzle 376 is directed towards the opening 374. The primary air stream entrains ambient air from within the interior of the chamber 370 as it passes through the chamber, causing a reduction in air pressure within the housing. Ambient air is drawn by the reduced pressure into the chamber 370 from the conduits 366, which communicate with the chamber 370 at openings 380 located adjacent to the nozzle 376. The combined air streams consisting of the primary air stream and the ambient air drawn from the conduits 366 enter into the manifold 360, there to be discharged through the openings 362. It will be seen that the system operates without any additional fans, blowers or pressurizers other than those required to pressurise the primary air stream. The system relies upon the momentum of the primary air stream to entrain the ambient air and then mix together the two air streams for discharge from the manifold, back into the cabin or to any other selected primary air stream. The system relies upon the momentum of the primary air stream to entrain the ambient air and then mix together the two air streams for discharge into conduits at pressure from the manifold, back into the cabin or to any other selected location.

Figure 28:
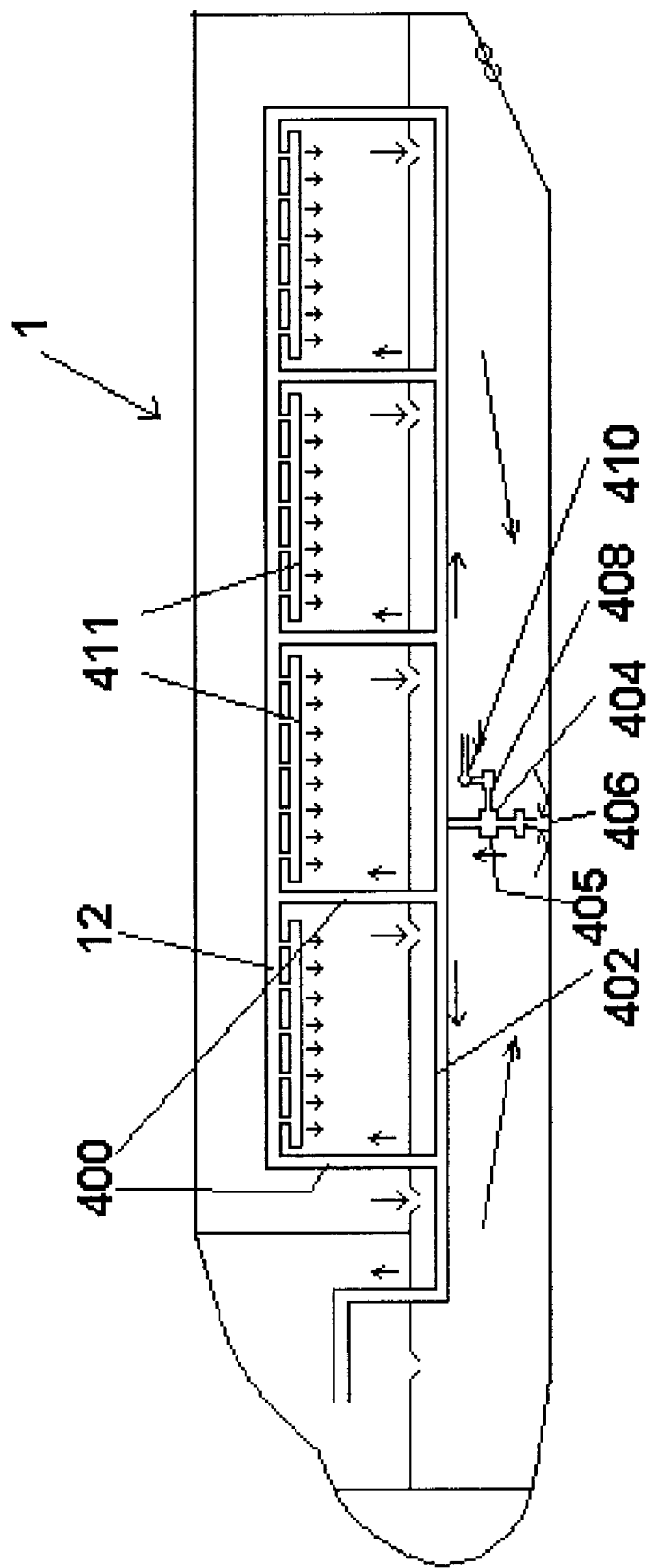
FIG. 28 is a schematic side sectional view of a prior art aircraft ventilation and air distribution system.
Figure 29:
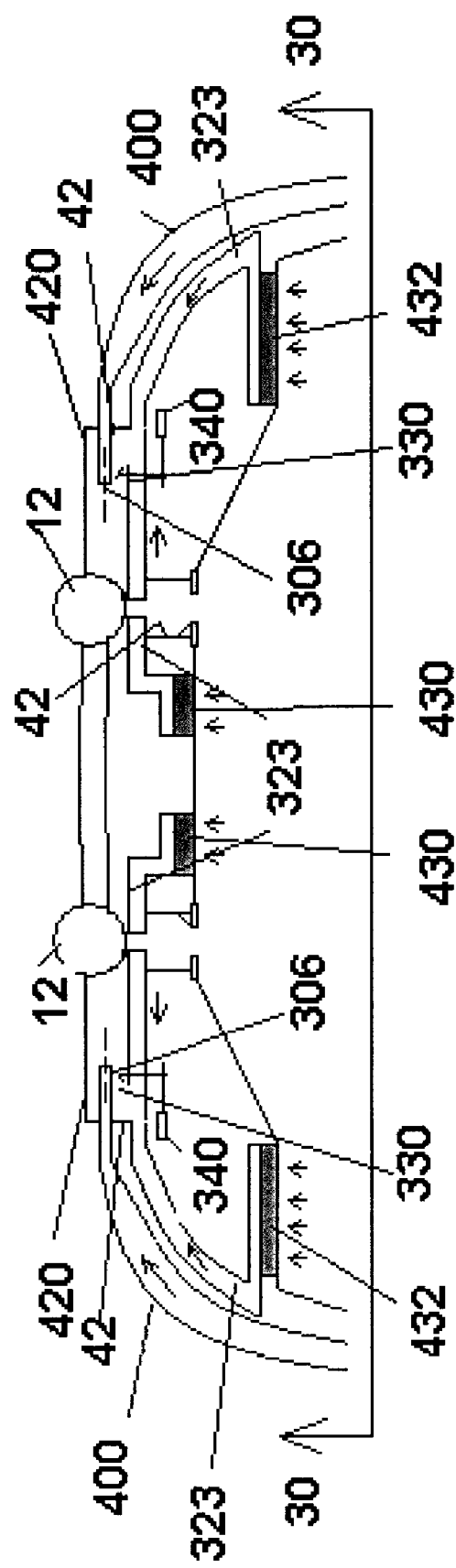
FIG. 29 is a schematic cross sectional view of an aircraft ventilation system according to a seventeenth embodiment of the invention.
Figure 30:
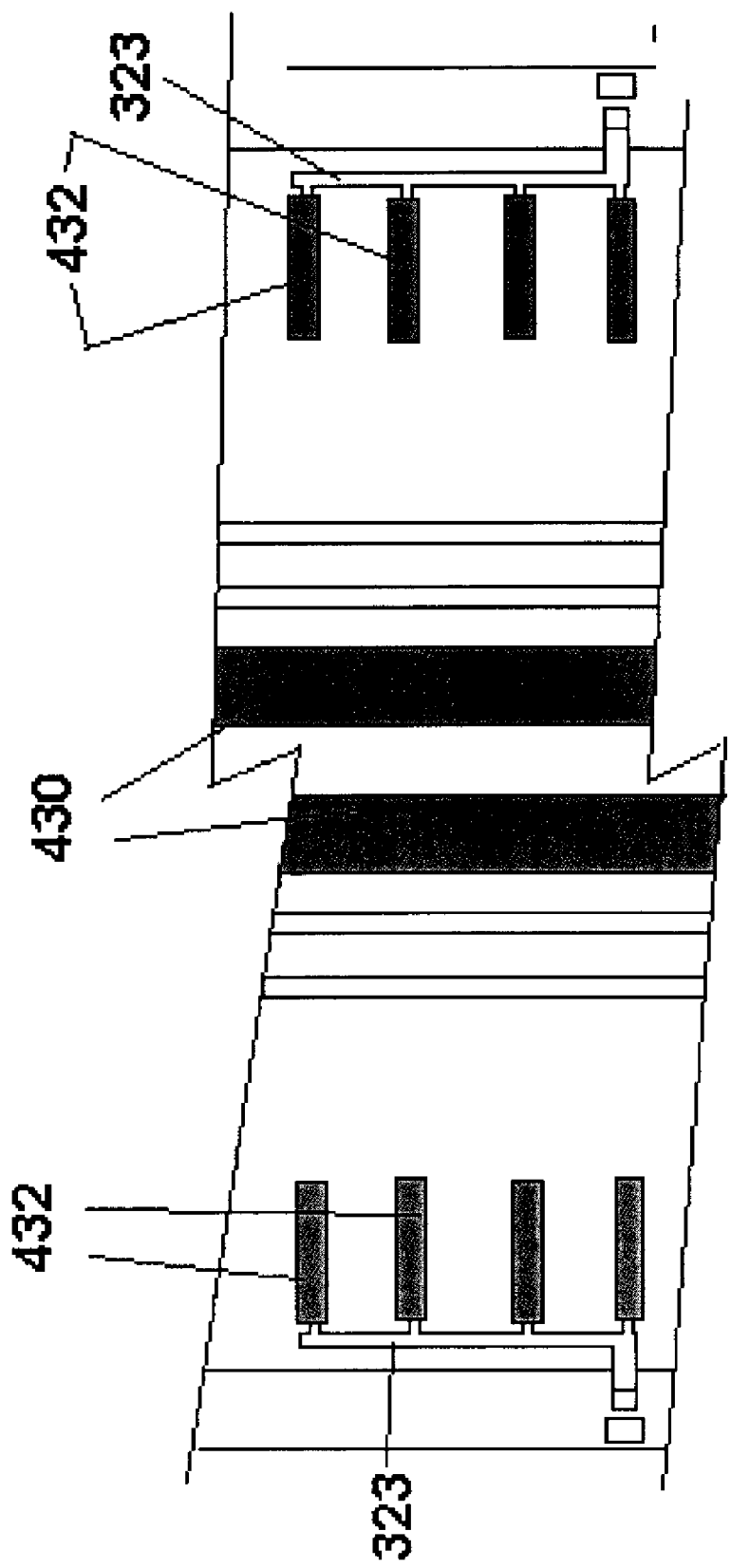
FIG. 30 is a plan view, along line 30-30 of FIG. 29, of the seventeenth embodiment.

FIGS. 28 through 30 relates to a further embodiment having particular application in aircraft, although not limited to this application. FIG. 28 shows a prior art system, in which the airflow direction is indicated by arrows. An aircraft is provided with an air distribution duct system, including a cabin air distribution duct 12 which receives a supply of air from a series of riser ducts 400, which in turn are fed by feeder ducts 402 in the belly of the fuselage. The feeder ducts receive an air supply from a mix manifold 404 which combines recirculated cabin air and outside air. A recirculation fan and filter unit 406 is associated with the manifold 404 as well as an air conditioning unit 408. An ozone converter 410 is shown with bleed air from the engine passing through it on its way to the pack 405 after various conditioning measures. Additional air bleed valves and other valving and ducting are provided in a manner known to the art. The distribution duct or ducts 12 feed an air supply to one or more slot diffusers 411 installed in the passenger compartment normally above the passenger heads but also on side walls near the stowage bins and at the floor near the feet. FIGS. 29 and 30 illustrate an embodiment consisting of an improved ventilation system which includes ejector flow control units as generally described above to supply an enhanced airflow within the cabin. One or more ejector flow control units 420 are installed into air supply ducts. These can include the cabin air supply riser ducts shown in this figure, floor vent ducts, gasper ducts, etc. The location chosen will likely require minimum additional ducting weights and sizes. In this application two ejector flow control units are shown installed adjacent to a cabin main air supply riser duct. The unit includes a housing 42. Each ejector flow control unit is supplied with a primary stream of pressurised air from a cabin air duct 400, which is located inside the housing 42 and delivers a high pressure stream through nozzle 306. A supply of ambient air from the cabin interior is introduced into the interior of the housing 42 by one or more ambient air conduits 323. The ambient air conduits receive ambient air from one or more an overhead filter unit 430 located over the cabin aisle and optionally a filter unit 432 over the passenger seats if there are no gasper entrainment filter devices installed (PCT patent application PCT/CA2007/000889. The unit combines the primary airflow with ambient air in the manner described above and discharges it into one or more ducts leading to diffusers such as the cabin diffusers 410 and the gasper outlets (not shown). The entrainment rate can be controlled with motorized dampers 330 so as to ensure that total ventilation remains relatively constant at any primary air supply rates. Supply rates vary when there is one air-conditioning pack is off or the packs are operating on low or medium rather than high settings, or any combination of these, for example. The damper is manipulated by an actuator 340 or other mechanism.

The number of ejector units might be one or two for the whole cabin or one per section between riser pipes or some other number. This will depend on ejector flow control unit and ducting weight and performance requirement considerations.

For this example an overhead slot diffuser system will be modified with this embodiment Mathematical Model An incompressible ejector equation can be used to predict the entrainment airflow according to the above embodiments:

$$(P_j - P_{amb})A_j + (P_1 - P_{amb})A_1 - (P_2 - P_{amb}) = \rho(A_2 V_2^2 - (A_j V_j^2 + A_2 V_2^2))$$

where
$P_j$, $A_j$, $V_j$=injector air exit static pressure, area and velocity, respectively
$P_{amb}$=ambient air static pressure
$P_1$, $A_1$, $V_1$=mixing chamber entrance static pressure, area and velocity, respectively
$P_2$, $A_2$, $V_2$=mixing chamber exit static pressure, area and velocity, respectively
$\rho$=air density Across the filter, air cleaner, and or air purifier:

$$P_{amb} - P_f = C_f V_f$$

where
$P_f$=pressure after the filter, inside the entrainment device
$V_f$=velocity at the filter face The mixing chamber entrance velocity is related to the filter face velocity by continuity:

$$A_f V_f = A_1 V_1$$

The mixing chamber entrance pressure, $P_1$ (and the injector exit pressure) is related to the internal filter, purifier and/or cleaner pressure, $P_f$, by Bernoulli's equation:

$$P_1 = = P_j = P_f - 0.5 \rho V_1^2$$

From continuity:

$$A_2 V_2 = A_1 V_1 + A_j V_j$$

The injector nozzle area (total of the plurality of nozzle openings or jets) is related to the injector flow and gauge pressure by:

$$A_j = Q_j (\rho/2P_g)^{0.5}$$

Where
$A_j$ Area of injector nozzle opening or openings
$Q_j$ Injector flow
$P_g$ Injector gauge pressure The following equations were all solved together for several representative example applications of the present invention. The following are based on mathematical calculations and are believed to be accurate but have not been tested in practice.

In one example, an ejector filtration, flow control unit produces 23 CFM/person at 0.2"wc from a 7.5 cfm/p primary airflow at 3" wc, with the 15 cfm/p of entrained air passing through a 100 SF filter (1 ft wide for a 100 ft long cabin) having a filter pressure loss coefficient of 0.15 lb.sec/ft$^3$. This total ventilation rate exceeds the current target ventilation rate for aircraft passenger cabins by 50%. As such there would be no need to recirculate air centrally, offering the potential for weight and energy savings while improving protection against pathogen spread. Such a flow multiplier also offers the opportunity to decrease this supply air by ⅓ when the aircraft is not flying full, while maintaining the 15 cfm/p target air circulation rate. A fivefold increase in filter pressure loss as it gets dirty has negligible impact on the flow multiplier. Increasing the supply pressure to the ejector flow control unit from 3" wc to 6" wc increases the flow multiplier from 3 to 4, while decreasing it to 2"wc reduces the flow multiplier to 2.5. Air density changes with altitude up to 8000 ft from sea level have negligible impact on the flow multiplier.

Providing a 2"wc air supply to an ejector slot diffuser extending the length of an aircraft cabin with the same filter parameters provides a flow multiplier of over 6 times.

For building applications, ejector flow controllers offer the advantage of filtered ejector entrainment multiples of two or more in buildings while still using regular diffusers. For example, providing a 1"wc 1,000 cfm air supply to an ejector flow control unit with an 8 SF filter and the same 0.15 filter pressure coefficient produces a 2,335 cfm flow at 0.1" wc pressure. Increasing the filter pressure coefficient 5 times results in a 10 percent flow reduction, yielding a total ejector flow control unit flow rate of 2,125 cfm, which is still over twice the primary flow rate.

In the above cases example, filter face velocities are an order of magnitude lower than typical of recirculation system filter velocities. This decrease can provide significant improvement in filter efficiency in trapping respirable sized particles over those for the same filter in typical higher velocity recirculation systems.

An 800 cfm flow at 0.25"wc through a three foot long slot produces a flow of 1,500 cfm for a 9 SF filter with this same pressure coefficient. If this is an air curtain flow and the filtered entrainment is placed opposite the nozzle jets, the curtain terminal face velocity at the filter is 221 fpm with 87% of the curtain air filtered and recirculated.

Delivery of air from central diffusers naturally promotes spread of pathogens from person to person because of lateral flow directions. Filters placed in the cabin or room near the occupant-breathing zone have a better possibility of mitigating pathogen cross contamination between the occupants than do filters in central recirculation systems. Personal air outlets such as gaspers equipped with ejector filtration units offer further possibility for avoiding pathogen cross contamination between occupants. With respect to gasper ejector filtration, a typical 2"wc, 3 cfm air supply provides a filtered airflow of over 15 cfm at the gasper outlet for a 0.25 SF filter and the same 0.15 filter pressure loss coefficient.

Diffuser ejector entrainment does not incur an appreciable energy cost. However, ejector filtration flow controllers with pressure supply requirements do. In general energy trade offs favor blowers over ejectors for higher (>2" wc) mix tube outlet supply pressures and higher air supply rates, while they favor ejectors for lower (<2" wc) mix tube outlet supply air pressures and lower supply rates. There are exceptions depending upon blower characteristics vs supply pressure and flow requirements. Each case should be analysed for specific fans versus the flow and pressure criteria.

Working Model

An experiment was performed in which a system similar to that illustrated described herein was set up to provide an assessment of device parameters on device performance, including:

Device air supply multiplier;
Filter surface area;
Filter particulate removal rate;
Single and multiple air supply jets;
2" long to 18" long mixing chambers;
Tubular and conical mixing chambers.
Air supply jets in front of the mixing chamber versus extending inside the mixing chamber.

This model can be applied in general to all the applications discussed above. When it is operated at pressures and flows typical of aircraft cabin gaspers and is combined with 86% filtration of 0.3 micron and larger particles (HEPA is 99.97% filtration of this particle size), it produced modified gasper airflow rates up to 6 times that of the original gasper flow rate.

Air was supplied at up to 10 inch WC pressure into a 1.625" i.d. chamber via one or multiple jets. These jets were created both with 20 holes (total area=0.075 sq. inches) through a flat plate and via a 0.25 inch dia. chamber. In the case of the flat plate jets, the plate was spaced away from the 1.625 inch i.d. secondary (mixing) chamber at various distances from ¼ inch to a few inches.

Three mixing chambers were used. Two were chambers, one 2 inches long and the other 18 inches long, both with an i.d. of 1.625 inches. The third was a cone was a truncated cone (frustum) with a 1.625 inch i.d. intake and 3.5 inch i.d. outlet.

Air was entrained through a commercial 1 inch thick pleated filter typically used in residential furnace forced air circulation systems. Filter areas were 16"×20" and 4"×5".

Entrainment air was conducted to the entrainment capsule via a 1.625" i.d. entrainment chamber.

Pressure differences were quantified between the air supply injector and ambient, and the entrainment chamber and ambient with a micromanometer to a 0.1 Pascal.[1] Velocities were measured with the micromanometer and a pitot chamber.

[1] Pressure difference: Air Neotronics™ MP20S micro manometer, resolution 0.1 Pa.

Respirable suspended particulate aerosol count concentrations were quantified by 0.3 micron and larger and one micron and larger mass median diameters using an electronic laser particle counter.[2]

[2] Air RSP: Met One model 227B™, laser particle counter, sample rate 0.1 CFM, coincidence error +/−5% at 2×10$^6$ particles/ft3; resolution 1 cpl; size fractions: >0.3 μm plus one of: >0.5, 1, 3 or 5 μm.

Experimental Findings Flow multipliers up to 6 times were created with flow supply pressures up to 9.4"wc. Single jet air supplies created the lowest entrainment rates in the shorter 2" long conical and tubular mixing chambers. The 20 jet supply performed the best in the short mixing chambers, (better with the conical mixing chamber than the cylindrical mixing chamber) creating entrainment rates there comparable to those measured with the 18" long mixing chamber.

The filter pressure drop constant was measured in a furnace system as between 0.15 (new filter) and 0.18 lb.sec/ft^3 (used filter) at filter face velocities of 700 to 780 fpm. A 20 square inch filter surface did not retard entrainment significantly. In the furnace situation, this filter removed between 22 and 24% of 0.3 micron diameter and larger airborne particles, and 72 and 73% of 1 micron diameter and larger airborne particles. In contrast the new 20 square inch entrainment filter removed 86% of the 0.3 micron diameter and larger airborne particles, and 99% of the 1 micron diameter and larger airborne particles. The efficiency of the filter used was significantly higher for this particle size range than is typical for its efficiency in the house furnace filter application where the impingement velocity on the filter is some 10 times higher. This points out the advantage provided by the filter entrainment system where the filter area can be relatively much larger per occupant area served locally than can normally be practically implemented with a central filter system serving many occupants.

DESCRIBED EMBODIMENTS DO NOT LIMIT SCOPE OF INVENTION

The present invention has been described herein by way of detailed descriptions of various embodiments. It is not intended that this description limits the scope of the invention; rather, they are intended merely to illustrate certain aspects of the invention and to assist the reader to make an example of the invention. The full scope of the invention is set out in the specification as a whole including the claims of this application as may be amended from time to time, and including any functional equivalents of any components or elements described in this specification.

What is claimed is:

1. A heating, ventilating and air-conditioning (HVAC)/Environmental Control System (ECS) ejector air treatment apparatus for connection to a source of pressurized air, comprising a housing, a mix chamber within said housing having open first and second opposed ends, a nozzle with one or more jet or orifice outlets configured to discharge a pressurized primary stream of air from said source of pressurized air into the first end of said mix chamber, at least one air entrainment chamber in fluid communication with the first end of said mix chamber, said entrainment chamber having an inlet to admit ambient air and air treatment means within said entrainment chamber, wherein said mix chamber is configured to entrain ambient air from said entrainment chamber through the air treatment means as a secondary stream within said primary stream and discharge an HVAC/ECS air stream comprising said primary and secondary streams from said second end.

2. An apparatus as defined in claim 1, wherein said mix chamber comprises side walls which diverge away from each other towards said second end.

3. An apparatus as defined in claim 1 wherein said air treatment means comprises one or more of a media filter, an electronic filter, an air purifier, an air cleaner or an oxidizer.

4. An apparatus as defined in claim 1 wherein said at least one air entrainment chamber is remote from said housing.

5. An apparatus as defined in claim 1 wherein said at least one air entrainment chamber is within or integral with said housing.

6. An apparatus as defined in claim 1 configured as a diffuser wherein said second end of said mix chamber forms a diffuser outlet.

7. An apparatus as defined in claim 6 adapted for overhead, wall or floor mount.

8. An apparatus as defined in claim 6 configured to form a linear elongate structure, a rectangular structure or an oval structure.

9. An apparatus as defined in claim 6 wherein said source of pressurized air comprises a plurality of regularly spaced take off ducts to transmit said pressurized air from an air supply duct into said housing.

10. An apparatus as defined in claim 6 adapted for use in an aircraft, a vehicle, a spacecraft, a watercraft, a building, a mine, or other stationary use.

11. An apparatus as defined in claim 6 further comprising at least one directional vane for directing the outflow of air from said diffuser outlet.

12. An apparatus as defined in claim 6 wherein said diffuser outlet comprises at least two adjacent slots in side by side relation, said apparatus further comprising at least one airflow diverter adjacent to the second end of said mix chamber for splitting the airflow exiting said mix chamber into multiple streams directed to said at least two slots.

13. An apparatus as defined in claim 1 adapted for use as a variable air volume flow controller wherein said pressurized air source comprises a ventilation system air supply and said second end of said mix chamber is configured to be connected to at least one duct or diffuser, said apparatus further comprising at least one adjustable damper positioned in the path of one or both of said primary stream or said secondary stream, and an actuator to adjust said at least one damper to control the flow of one or both of the primary or secondary air streams.

14. An apparatus as defined in claim 13 comprising at least two adjustable dampers and actuators, adapted to adjust the proportions of secondary air taken from at least two secondary air streams.

15. An apparatus as defined in claim 13 wherein said actuators are controlled to entrain more or less air so as to maintain a constant flow rate from said second end of said mix chamber.

16. An apparatus as defined in claim 13 wherein said actuators are controlled to entrain warm or cool air so as to thermally condition the air flow from said second end of said mix chamber.

17. An apparatus as defined in claim 13 adapted for use in an aircraft, a vehicle, a spacecraft, a watercraft, a building, a mine, or other stationary use.

18. An apparatus as defined in claim 1 adapted for use in an air curtain system, said mix chamber outlet configured to supply an airflow as an air curtain, wherein said entrainment chamber is opposed to and spaced apart from said mix chamber outlet to receive the spent air from said air curtain.

19. An apparatus as defined in claim 18 further comprising a blower to increase the velocity of said primary air stream.

20. An apparatus as defined in claim 18 wherein said air treatment means comprises a filter for trapping particulate, explosive, dust, insect, pathogenic, and/or chemical air contaminants.

21. An apparatus as defined in claim 18 further comprising means to chemically sample said ambient air entering said entrainment chamber for the presence of explosive or drug-related chemicals.

22. An apparatus as defined in claim 1 adapted for use as an air recirculation device, wherein said entrainment chamber connects to the ambient air drawn from conduits and passing through any air cleaning system, said pressurized supply air is a pressurized outdoor air supply, and said mix chamber mixes the entrained air and outdoor air, and said mix chamber outlet discharges into conduits at pressure back to the ambient space.

23. An apparatus as defined in claim 22 comprising a housing, the interior of said housing comprising an air mix manifold, a first inlet for communication with a source of pressurized air forming a primary stream, a second inlet for communication with a source of ambient air forming a secondary stream, at least one outlet for discharging air from said manifold wherein said discharged air is composed of air from said primary and secondary streams, an entrainment/mix chamber having a first open end in fluid communication with said first and second inlets and an opposed second open end in fluid communication with said manifold, and a nozzle associated with said first inlet configured to direct said pressurized primary stream into said first end of said entrainment/mix chamber, wherein said secondary stream is entrained with said primary stream and thereby draws said secondary stream into said manifold.

24. An apparatus as defined in claim 23 adapted for use in an aircraft, a vehicle, a spacecraft, a watercraft, a building, a mine, or other stationary use.

25. An apparatus as defined in claim 22 adapted for use in an aircraft, wherein said primary stream comprises a source of pressurized external air, and said ambient air is drawn from within the interior of said aircraft.

* * * * *